United States Patent
Shimezawa et al.

(10) Patent No.: US 8,693,560 B2
(45) Date of Patent: Apr. 8, 2014

(54) TRANSMISSION APPARATUS, TRANSMISSION METHOD, COMMUNICATION SYSTEM, AND COMMUNICATION METHOD

(75) Inventors: Kazuyuki Shimezawa, Osaka (JP); Toshizo Nogami, Osaka (JP); Takashi Yoshimoto, Osaka (JP); Ryota Yamada, Osaka (JP); Katsuya Kato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 267 days.

(21) Appl. No.: 13/143,281

(22) PCT Filed: Jan. 7, 2010

(86) PCT No.: PCT/JP2010/000070
§ 371 (c)(1),
(2), (4) Date: Jul. 5, 2011

(87) PCT Pub. No.: WO2010/079757
PCT Pub. Date: Jul. 15, 2010

(65) Prior Publication Data
US 2011/0305286 A1    Dec. 15, 2011

(30) Foreign Application Priority Data

Jan. 8, 2009 (JP) ................................. 2009-002693
Jan. 8, 2009 (JP) ................................. 2009-002694

(51) Int. Cl.
*H04L 27/28* (2006.01)

(52) U.S. Cl.
USPC ........... 375/260; 375/295; 375/259; 375/219; 375/298; 375/300; 375/302

(58) Field of Classification Search
USPC .......... 375/260, 295, 259, 219, 298, 300, 302
See application file for complete search history.

(56) References Cited

U.S. PATENT DOCUMENTS 8,149,782 B2 * 4/2012 Noh et al. ................... 370/330
8,165,580 B1 * 4/2012 Kawasaki ................. 455/432.3
(Continued)

FOREIGN PATENT DOCUMENTS

JP    2005-110014 A    4/2005
JP    2007-67821 A     3/2007
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.3.0 (May 2008), pp. 1-77.
(Continued)

*Primary Examiner* — Kenneth Lam
(74) *Attorney, Agent, or Firm* — Birch, Stewart, Kolasch & Birch, LLP

(57) ABSTRACT

In a transmission apparatus which multicarrier-modulates and transmits symbols, which are basic units of digital signals, a subcarrier in which a symbol is arranged in a first multicarrier symbol having a first guard interval and a subcarrier in which a symbol is arranged in a second multicarrier symbol having a second guard interval longer than the first guard interval are scattered among a plurality of subcarriers constituting a multicarrier at the same time. Therefore, it is possible to improve the resistance to inter-symbol interference without substantially degrading transmission efficiency.

18 Claims, 51 Drawing Sheets

(56) References Cited

U.S. PATENT DOCUMENTS

| | | | |
|---|---|---|---|
| 8,325,594 B2* | 12/2012 | Cho et al. | 370/210 |
| 8,447,253 B2* | 5/2013 | Furukawa | 455/168.1 |
| 2005/0073971 A1 | 4/2005 | Mukai | |
| 2007/0133701 A1* | 6/2007 | Iwami | 375/260 |
| 2007/0254693 A1* | 11/2007 | Furukawa | 455/553.1 |
| 2007/0258358 A1* | 11/2007 | Cho et al. | 370/208 |
| 2008/0293398 A1* | 11/2008 | Seyama et al. | 455/422.1 |
| 2009/0004971 A1* | 1/2009 | Dateki et al. | 455/62 |
| 2009/0010196 A1* | 1/2009 | Bui et al. | 370/312 |
| 2009/0046787 A1 | 2/2009 | Uesugi et al. | |
| 2009/0141818 A1* | 6/2009 | Hiramatsu et al. | 375/260 |
| 2009/0245399 A1* | 10/2009 | Lee et al. | 375/260 |
| 2009/0245413 A1* | 10/2009 | Miyoshi et al. | 375/295 |
| 2009/0323642 A1* | 12/2009 | Tanno et al. | 370/336 |
| 2010/0135257 A1* | 6/2010 | Higuchi et al. | 370/336 |

FOREIGN PATENT DOCUMENTS

| | | |
|---|---|---|
| JP | 2007-159066 A | 6/2007 |
| JP | 2007-335973 A | 12/2007 |
| JP | 2008-28818 A | 2/2008 |
| WO | WO 2006/077729 A1 | 7/2006 |
| WO | WO 2007/007795 A1 | 1/2007 |
| WO | WO 2007/069329 A1 | 6/2007 |

OTHER PUBLICATIONS

International Search Report, PCT/JP2010/000070, Feb. 9, 2010
Lin et al., "A new tranceiver system for the OFDMA/OQAM modulation with cyclic prefix", PIMRC2008, Sep. 2008, 5 pages.

* cited by examiner

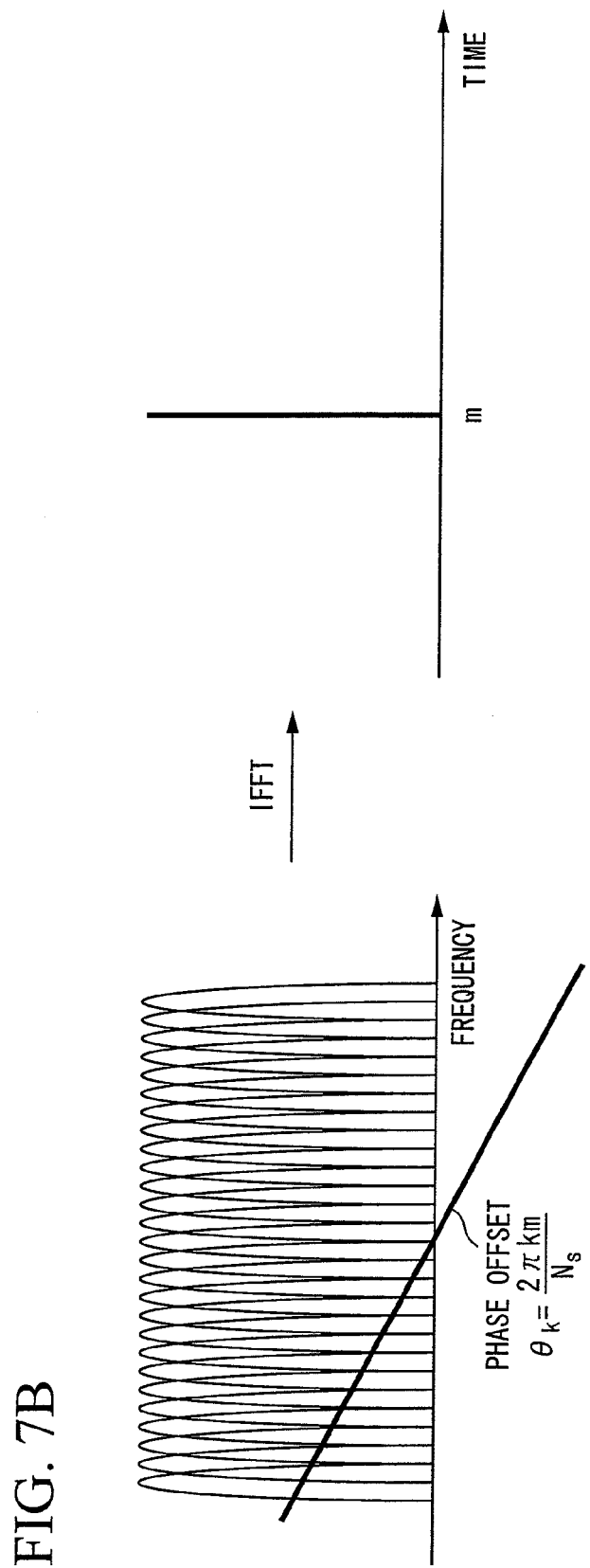

TRANSMISSION APPARATUS, TRANSMISSION METHOD, COMMUNICATION SYSTEM, AND COMMUNICATION METHOD

TECHNICAL FIELD

The present invention relates to a transmission apparatus, a transmission method, a communication system, and a communication method.

This application claims priority to and the benefits of Japanese Patent Application Nos. 2009-002693 and 2009-002694 filed on Jan. 8, 2009, the disclosure of which is incorporated herein by reference.

BACKGROUND ART

In wireless communication such as mobile communication or fixed communication, a transmission signal is subjected to various interferences by the influence of reflection waves due to obstacles in a propagation channel, and the like and communication quality is degraded by fading in which a level of a reception signal is changed.

For example, the influence of multipath fading (multipath interference) is reduced by adding a guard interval (GI) (length) based on a cyclic prefix (CP) to a transmission signal transmitted by a transmission apparatus in multicarrier transmission such as orthogonal frequency division multiplexing (OFDM), orthogonal frequency division multiple access (OFDMA), or multi carrier-code division multiplexing (MC-CDM).

In a reception apparatus, an amplitude or phase change of a propagation channel is estimated by inserting a signal known between the transmission apparatus and the reception apparatus as a pilot signal into part of a transmission signal in order to compensate for an amplitude or phase change of the transmission signal due to multipath fading or the like. It is preferable to estimate the propagation channel with high accuracy.

In particular, it is preferable to follow an amplitude or phase change of a transmission signal in a frequency direction and a time direction in a broadband transmission or high-speed mobile environment. As a method of estimating a time change and a frequency change, there is a method of scattering and arranging pilot signals in the frequency direction and the time direction. For example, a method using scattered pilot symbols is shown in Non-Patent Document 1.

An example of the method using the scattered and arranged pilot symbols (hereinafter referred to as "scattered pilot symbols") shown in Non-Patent Document 1 will be described using FIG. 52.

FIG. 52 shows a frame constituted by 8 subcarriers and 12 OFDM symbols. In FIG. 52, the horizontal axis represents time, the vertical axis represents frequency, one row of the frequency (vertical axis) direction represents a subcarrier, and one column of the time (horizontal axis) direction represents an OFDM symbol. In the frame, a pilot symbol is arranged every fourth subcarrier in the frequency direction and every other OFDM symbol in the time direction. Furthermore, in terms of an OFDM symbol including the pilot symbol, the pilot symbol is shifted in the frequency direction every OFDM symbol. Thereby, it is possible to follow the estimation of a time change and a frequency change in an amplitude and a phase by the scattered pilot symbol.

On the other hand, an example in which an arrival wave exceeding a GI exists in multicarrier transmission of OFDM or the like and serves as a factor that degrades communication quality will be described using FIGS. 53 and 54. FIG. 53 shows the case where a channel impulse response value of a 12-wave multipath model is shown, first 4 waves of a reception signal are within a GI, and the other 8 waves exceed the GI. If there is a delay wave exceeding the GI as described above, inter-symbol interference (ISI) is caused by the head of a GI added to a previous OFDM symbol, that is, a data interval of the previous OFDM symbol, which enters an interval of a fast Fourier transform (FFT) to be performed to demodulate a received signal, as shown in FIG. 54. The ISI becomes a factor that degrades the accuracy of propagation channel estimation and degrades communication quality.

As a method of eliminating the influence by the ISI, for example, a GI of each OFDM symbol longer than a normal GI in a subframe (frame or slot) is shown in Non-Patent Document 1.

Non-Patent Document 1: "3rd Generation Partnership Project; Technical Specification Group Radio Access Network; Evolved Universal Terrestrial Radio Access (EU-TRA); Physical Channels and Modulation (Release 8)" 3GPP TS 36.211 V8.3.0 (2008-05).

DISCLOSURE OF INVENTION

Problem to be Solved by the Invention

However, all GIs of the same subframe are lengthened even when one GI is intended to be lengthened because the GI to be added to each subframe is set in Non-Patent Document 1. That is, a redundant interval is increased in wireless communication because the GI is also lengthened for all OFDM symbols other than a scattered pilot symbol of the same subframe including the scattered pilot symbol intended to lengthen the GI. Consequently, in Non-Patent Document 1, interference between the OFDM symbols is reduced, but transmission efficiency is degraded.

Likewise, there is a problem of ISI, for example, even when a signal of any subcarrier within the same OFDM symbol is recovered with high accuracy, outside the scattered pilot symbol for estimating a propagation channel as described above.

The present invention has been made in view of the above-described problems, and an object of the invention is to provide a transmission apparatus, a transmission method, a communication system, and a communication method that improve the resistance to ISI without substantially degrading transmission efficiency in an environment where an arrival wave exceeding a normal GI due to a propagation channel arrives.

Means for Solving the Problem (1) The present invention is made to solve the above-described problems. In a first aspect of the present invention, there is provided a transmission apparatus which multicarrier-modulates and transmits symbols, which are basic units of digital signals, wherein a subcarrier in which a symbol is arranged in a first multicarrier symbol having a first guard interval and a subcarrier in which a symbol is arranged in a second multicarrier symbol having a second guard interval longer than the first guard interval are scattered among a plurality of subcarriers constituting a multicarrier at the same time.

(2) In the first aspect of the present invention, the transmission apparatus may include: a phase control section which phase-rotates some symbols to which the second guard interval longer than the first guard interval is added, and generates a symbol that is arranged one before in a time direction of the same subcarriers as those of the some symbols and constitutes part of the second guard interval added to the some symbols; a multiplexing section which multiplexes a symbol to which the first guard interval is added, the symbols to which the second guard interval is added, and the symbol generated by the phase rotating section in a frequency domain; an inverse Fourier transform section which performs transformation into a time domain signal by inverse-Fourier-transforming the symbols multiplexed by the multiplexing section; and a guard interval inserting section which adds a guard interval longer than the first guard interval to the time domain signal into which the transformation is performed by the inverse Fourier transform section, wherein the first multicarrier symbol and the second multicarrier symbol may be generated.

(3) In the transmission apparatus according to the first aspect of the present invention, the phase control section may control a phase rotation amount when a phase rotation is performed based on a length of the first guard interval.

(4) In the transmission apparatus according to the first aspect of the present invention, an effective symbol interval of the second multicarrier symbol may be consistent with any effective symbol interval of the first multicarrier symbol in a time direction.

(5) In the first aspect of the present invention, the transmission apparatus may further include: a symbol storage section which stores the second multicarrier symbol.

(6) In the transmission apparatus according to the first aspect of the present invention, the second multicarrier symbol may be a pilot symbol including a pilot signal known between the transmission apparatus and a reception apparatus that communicates therewith.

(7) In the transmission apparatus according to the first aspect of the present invention, the second multicarrier symbol may be a control data symbol including a control signal for a reception apparatus that communicates with the transmission apparatus.

(8) In the transmission apparatus according to the first aspect of the present invention, the first multicarrier symbol may be an information data symbol including information data for a reception apparatus that communicates with the transmission apparatus.

(9) In the transmission apparatus according to the first aspect of the present invention, the first multicarrier symbol may be an information data symbol including information data for a reception apparatus that communicates with the transmission apparatus and a control data symbol including a control signal for the reception apparatus that communicates with the transmission apparatus.

(10) In the transmission apparatus according to the first aspect of the present invention, the first multicarrier symbol, which is the control data symbol, may be arranged in a subcarrier adjacent to a subcarrier in which the second multicarrier symbol is arranged.

(11) In the first aspect of the present invention, the transmission apparatus may include: a plurality of transmission processing sections each including the phase control section, the multiplexing section, the inverse Fourier transform section, and the guard interval inserting section, wherein the second multicarrier symbol within one transmission processing section may be mutually spatially independent of another transmission processing section.

(12) In the first aspect of the present invention, the transmission apparatus may include: a first multicarrier symbol generating section which generates the first multicarrier symbol by adding the first guard interval to some symbols; a second multicarrier symbol generating section which generates the second multicarrier symbol by adding the second guard interval to other symbols; and a multiplexing section which multiplexes the first multicarrier symbol and the second multicarrier symbol in a time domain.

(13) In the transmission apparatus according to the first aspect of the present invention, the first multicarrier symbol generating section may arrange each of the some symbols in any one of regions including a time and a frequency having predetermined widths and generate a time domain signal of the first multicarrier symbol to which the first guard interval is added, and the second multicarrier symbol generating section may arrange each of the other symbols in any one of regions, excluding regions where the some symbols are arranged, that includes a time and a frequency having predetermined widths, and generate a time domain signal of the second multicarrier symbol to which the second guard interval is added.

(14) In a second aspect of the present invention, there is provided a communication system including a transmission apparatus which multicarrier-modulates and transmits symbols, which are basic units of digital signals, and a reception apparatus, wherein the transmission apparatus transmits a multicarrier signal in which a subcarrier in which a symbol is arranged in a first multicarrier symbol having a first guard interval and a subcarrier in which a symbol is arranged in a second multicarrier symbol having a second guard interval longer than the first guard interval are scattered among a plurality of subcarriers constituting a multicarrier at the same time, and the reception apparatus separates the plurality of subcarriers by multicarrier-demodulating the multicarrier signal transmitted from the transmission apparatus, and extracts the first symbol and the second symbol.

(15) In the communication system according to the second aspect of the present invention, the reception apparatus may receive the multicarrier signal transmitted from the transmission apparatus, and the reception apparatus may include: a first guard interval removing section which removes the first guard interval included in the received multicarrier signal; and a second guard interval removing section which removes the second guard interval included in the received multicarrier signal.

(16) In the communication system according to the second aspect of the present invention, the reception apparatus may receive the multicarrier signal transmitted from the transmission apparatus, and the reception apparatus may include: a first guard interval removing section which removes the first guard interval included in the received multicarrier signal; and a symbol extracting section which extracts the second multicarrier symbol included in the multicarrier signal from the multicarrier signal from which the first guard interval removing section removes the first guard interval.

(17) In the communication system according to the second aspect of the present invention, an effective symbol interval extracted by the symbol extracting section may be an effective symbol interval of the second multicarrier symbol.

(18) In a third aspect of the present invention, there is provided a transmission method of a transmission apparatus which multicarrier-modulates and transmits symbols, which are basic units of digital signals, wherein a subcarrier in which a symbol is arranged in a first multicarrier symbol having a first guard interval and a subcarrier in which a symbol is arranged in a second multicarrier symbol having a second guard interval longer than the first guard interval are scattered among a plurality of subcarriers constituting a multicarrier at the same time.

(19) In the third aspect of the present invention, the transmission method may include: phase-rotating some symbols to which the second guard interval longer than the first guard interval is added, and generating a symbol that is arranged one before in a time direction of the same subcarriers as those of the some symbols and constitutes part of the second guard interval added to the some symbols; multiplexing the symbol to which the first guard interval is added, the symbols to which the second guard interval is added, and the generated symbol; performing transformation into a time domain signal by inverse-Fourier-transforming the multiplexed symbols; and adding a guard interval longer than the first guard interval to the time domain signal into which the transformation is performed, wherein the first multicarrier symbol and the second multicarrier symbol may be generated.

(20) In the transmission method according to the third aspect of the present invention, which is a transmission method in a transmission apparatus which multicarrier-modulates and transmits symbols, which are basic units of digital signals, the transmission method may include: generating, by the transmission apparatus, the first multicarrier symbol by adding the first guard interval to some symbols; generating, by the transmission apparatus, the second multicarrier symbol by adding the second guard interval to other symbols; and multiplexing, by the transmission apparatus, the first multicarrier symbol and the second multicarrier symbol in a time domain.

(21) In a fourth aspect of the present invention, there is provided a communication method including a transmission method of multicarrier-modulating and transmitting symbols, which are basic units of digital signals, and a reception method, wherein the transmission method includes transmitting a multicarrier signal in which a subcarrier in which a symbol is arranged in a first multicarrier symbol having a first guard interval and a subcarrier in which a symbol is arranged in a second multicarrier symbol having a second guard interval longer than the first guard interval are scattered among a plurality of subcarriers constituting a multicarrier at the same time, and the reception method includes separating the plurality of subcarriers by multicarrier-demodulating the transmitted multicarrier signal, and extracting the first symbol and the second symbol.

(22) In the communication method according to the fourth aspect of the present invention, the reception method may include receiving the transmitted multicarrier signal, and the reception method further include: removing the first guard interval included in the received multicarrier signal; and removing the second guard interval included in the received multicarrier signal.

(23) In the communication method according to the fourth aspect of the present invention, the reception method may include receiving the transmitted multicarrier signal, and the reception method further may include: removing the first guard interval included in the received multicarrier signal; and extracting the second symbol included in the multicarrier signal from the multicarrier signal from which the first guard interval was removed.

Effect of the Invention

According to the present invention, it is possible to improve the resistance to ISI without substantially degrading transmission efficiency because a first OFDM symbol and a second OFDM symbol can be generated, first and second GIs having different lengths can be added to the first and second OFDM symbols (wherein the length of the second GI is longer than that of the first GI), and transmission signals scattered and arranged among a plurality of subcarriers constituting a multicarrier can be transmitted at the same time, in an environment where an arrival wave exceeding a normal GI due to a propagation channel arrives.

BRIEF DESCRIPTION OF THE DRAWINGS

FIG. 7B is a diagram showing a result of IFFT processing of subcarriers for which a phase rotation is performed in the first embodiment of the present invention.

BEST MODE FOR CARRYING OUT THE INVENTION

Hereinafter, embodiments of the present invention will be described with reference to the drawings. In the embodiments of the present invention, a usual GI is referred to as a normal GI, and a GI longer than the usual GI is referred to as a long GI.

First Embodiment

Figure 1:
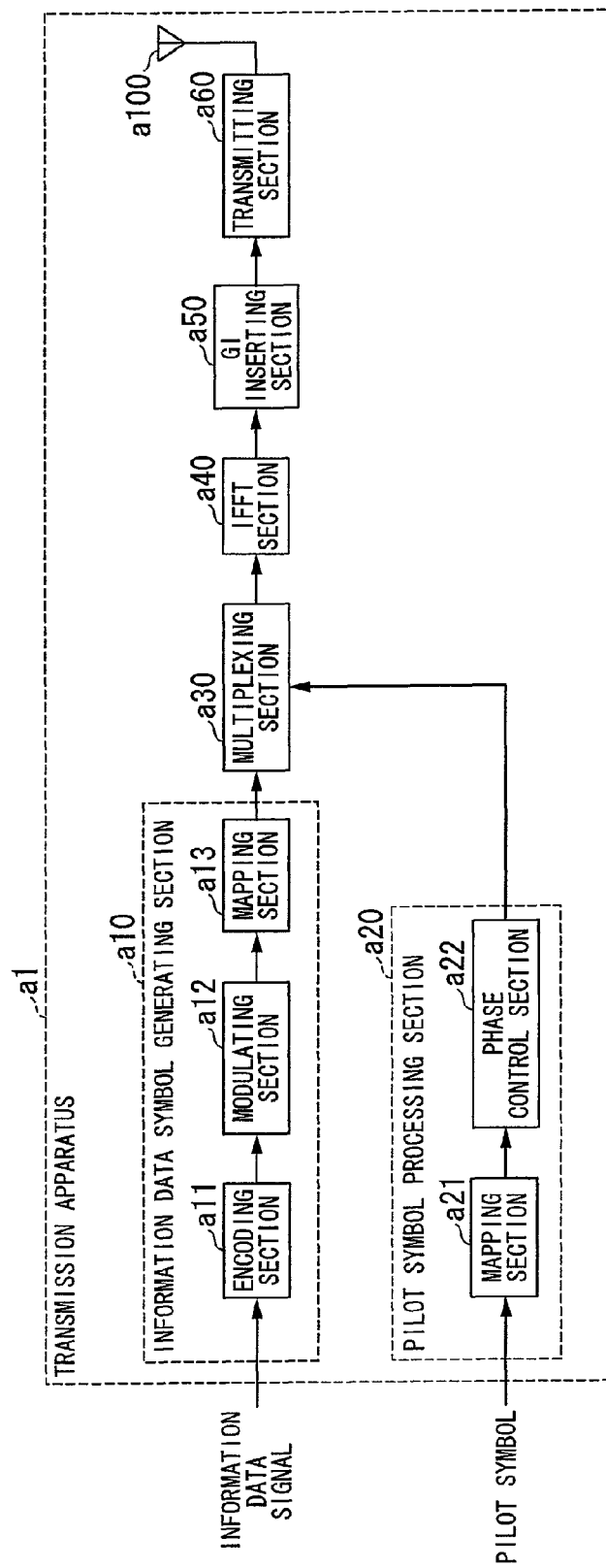
FIG. 1 is a schematic block diagram showing a configuration of a transmission apparatus according to a first embodiment of the present invention.

Hereinafter, the first embodiment of the present invention will be described. A communication system according to the first embodiment includes a transmission apparatus and a reception apparatus. FIG. 1 is a schematic block diagram showing a configuration of the transmission apparatus according to the first embodiment of the present invention. In FIG. 1, a transmission apparatus a1 includes an information data symbol generating section a10 (a normal GI symbol generating section), a pilot symbol processing section a20 (a long GI symbol generating section), a multiplexing section a30, an IFFT (inverse fast Fourier transform) section a40, a GI inserting section a50, a transmitting section a60 (a radio transmitting section), and a transmission antenna a100.

The information data symbol generating section a10 arranges (maps) an information data symbol obtained by encoding and modulating an information data signal (transmission data) to be transmitted, which is input from an upper layer processing apparatus (not shown) for the transmission apparatus a1, to a resource element, and outputs the arranged information data symbol to the multiplexing section a30. The information data symbol generating section a10 includes an encoding section a11, a modulating section a12, and a mapping section a13.

The encoding section a11 performs error-correction coding based on a convolutional code, a turbo code, or the like for the input information data signal, and outputs the error-correction coded information data signal to the modulating section a12.

The modulating section a1t modulates the error-correction coded information data signal input from the encoding section a11, for example, by a modulation scheme such as quadrature phase shift keying (QPSK) or quadrature amplitude modulation (QAM), generates an information data symbol, which is a modulation symbol of the information data signal, and outputs the information data symbol to the mapping section a13.

The mapping section a13 maps the information data symbol input from the modulating section a12 to a predetermined resource element, other than a resource element into which a scattered pilot symbol or the like is inserted by the pilot symbol processing section a20, and outputs the resource element to the multiplexing section a30 as an output of the information data symbol generating section a10.

Here, the resource element is a region including a frequency and a time having predetermined widths, and one symbol is arranged therein.

The pilot symbol processing section a20 maps a pilot symbol input from the upper layer processing apparatus (not shown) for the transmission apparatus a1 to a resource element distributed in a frequency direction and a time direction as a scattered pilot symbol, further maps a scattered pilot symbol obtained by phase controlling a mapped scattered pilot symbol to a previous resource element in the time direction, that is, maps a phase-controlled pilot symbol to be part of a long GI later, and outputs the symbols to the multiplexing section a30. Next, this point will be described in detail. The pilot symbol processing section a20 includes a mapping section a21 and a phase control section a22.

The mapping section a21 maps the input pilot symbol to a predetermined time and subcarrier (resource element) scattered in the frequency direction and the time direction as the scattered pilot symbol, and outputs a mapping result to the phase control section a22. If a pilot symbol to which a long GI is added (hereinafter referred to as a "long GI pilot symbol") is generated by two OFDM symbols, the mapping section a21 copies a pilot symbol when mapping the pilot symbol, and maps the copied pilot symbol to the previous resource element in the time direction of the resource element to which the original pilot symbol is mapped so that the copied pilot symbol serves as part of the long GI later.

The phase control section a22 performs phase control for the pilot symbol serving as the part of the long GI within the scattered pilot symbol input from the mapping section a21 according to a length of a normal GI and a subcarrier position (number), and outputs all pilot symbols including the phase-controlled pilot symbol to the multiplexing section a30 as an output of the pilot symbol processing section a20.

The multiplexing section a30 superimposes (multiplexes) the mapped information data symbol input from the information data symbol generating section a10, the mapped pilot symbol input from the pilot symbol processing section a20, and the phase-controlled pilot symbol in a frequency domain, and outputs a superimposing (multiplexing) result to the IFFT section a40.

The IFFT section a40 transforms a multiplexed symbol input from the multiplexing section a30, which is a frequency domain signal, from the frequency domain signal into a time domain signal by IFFT processing, and outputs the time domain signal to the GI inserting section a50.

The GI inserting section a50 generates an OFDM symbol by adding a GI having a predetermined length to the time domain signal input from the IFFT section a50, and outputs the OFDM symbol to the transmitting section a60. A detailed description regarding the GI addition processing will be given later.

As described above, a method of distributing and modulating symbols in a number of subcarriers is referred to as multicarrier modulation. For example, in OFDM and OFDMA, modulation symbols correspond to the above-described symbols, the modulation symbols are distributed and arranged in the subcarriers as the multicarrier modulation, and OFDM modulation is performed to add a GI after an inverse Fourier transform. The OFDM modulation is an example of multicarrier modulation. In this case, it is possible to narrow an occupied bandwidth because a number of subcarriers are orthogonal while being superimposed. In MC-CDM, MC-CDM modulation in which chips correspond to the above-described symbols, chips generated by multiplying spreading codes by modulation symbols are distributed and arranged in subcarriers as multicarrier modulation, and a GI is added after an inverse Fourier transform is performed. In discrete Fourier transform-spread-OFDM (DFT-S-OFDM), DFT-S-OFDM modulation in which discrete spectra correspond to the above-described symbols, discrete spectra generated by performing a Fourier transform on a plurality of symbols are distributed and arranged in subcarriers, and a GI is added after an inverse Fourier transform is performed. As described above, one time unit of a multicarrier-modulated signal is referred to as a multicarrier symbol. For example, in OFDM and OFDMA, a signal of an interval formed by combining a one-effective-symbol interval and a previously added GI corresponds thereto and is referred to as an OFDM symbol.

The transmitting section a60 performs digital-analog conversion, frequency conversion, and the like for the OFDM symbol input from the GI inserting section a50, and transmits a conversion result via the transmission antenna a100.

Figure 2:
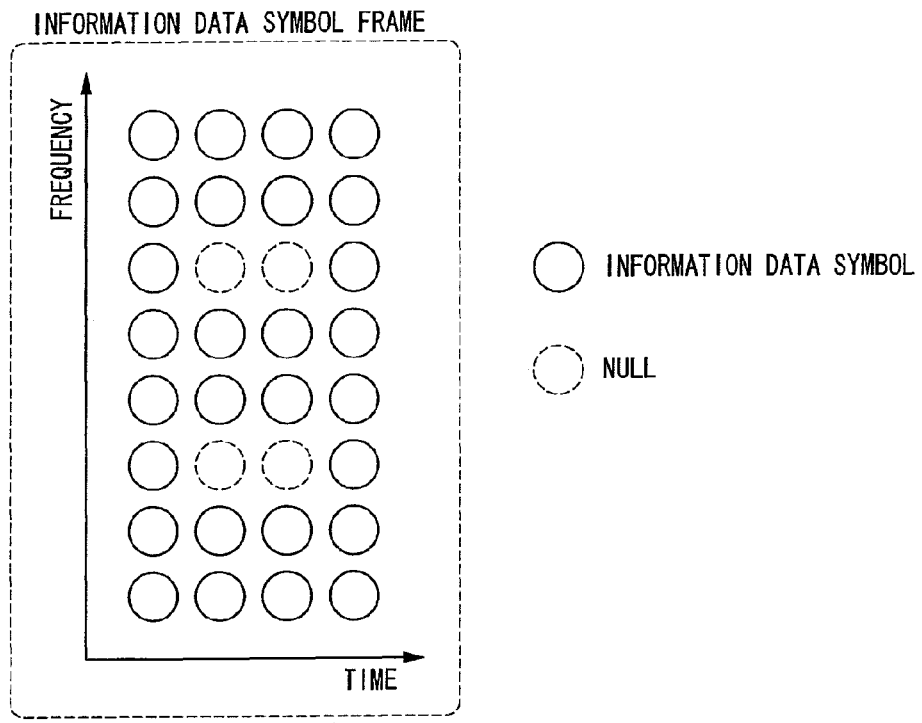
FIG. 2 is a diagram showing an example of an information data symbol frame according to the first embodiment of the present invention.

Next, the transmission processing of the transmission apparatus a1 according to the first embodiment will be described. FIG. 2 is a diagram showing an example of an information data symbol frame in which an input information data signal is mapped in the mapping section a13. In FIG. 2, the horizontal axis represents time, the vertical axis represents frequency, one row represents a subcarrier, and one column represents a symbol mapped to an OFDM symbol.

The example of the information data symbol frame shown in FIG. 2 includes four OFDM symbols and eight subcarriers, and shows the case where scattered pilot symbols are respectively mapped to a third OFDM symbol of third and sixth subcarriers.

In this case, the mapping section a13 maps an information data symbol modulated by the modulating section a12 to a resource element indicated by the solid line excluding a position mapped to a scattered pilot symbol and a previous position in the time direction as shown in FIG. 2. The mapping section a13 maps zero (null) to the position mapped to the scattered pilot symbol and the previous position in the time direction (a position indicated by the dotted line).

On the other hand, if the pilot symbol is input to the pilot symbol processing section a20, the mapping section a21 first maps a scattered pilot symbol to the input pilot symbol (wherein a symbol of the pilot symbol may be a symbol modulated by a modulation scheme such as QPSK or QAM like the information data symbol) in the pilot symbol processing section a20. For example, if a pilot symbol to which one long GI is added is generated using two OFDM symbols during mapping, the same pilot symbol is mapped to two continuous OFDM symbols in the same subcarrier. Subsequently, the phase control section a22 performs phase control. Thereby, for example, two pilot symbols are mapped as one long GI so that the long GI is added, and phase-controlled frequency domain pilot symbols are output to the multiplexing section a30.

Figure 3:
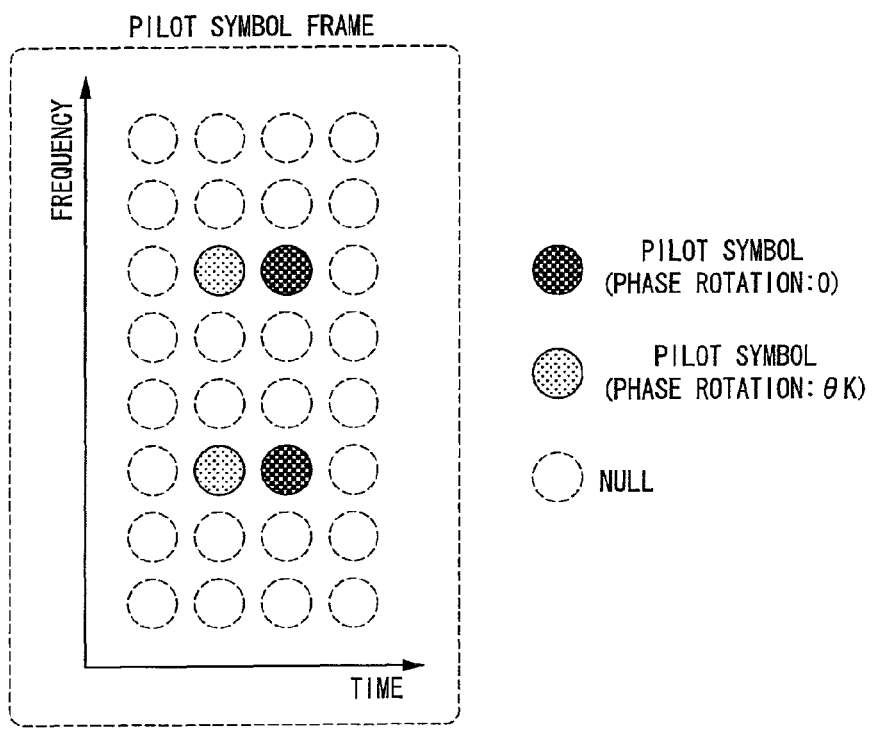
FIG. 3 is a diagram showing an example of a pilot symbol frame according to the first embodiment of the present invention.

FIG. 3 is a diagram showing an example of a pilot symbol frame in which scattered pilot symbols corresponding to an information data symbol frame shown in FIG. 2 are mapped. In FIG. 3, the horizontal axis represents time, the vertical axis represents frequency, one row represents a subcarrier, and one column represents a symbol mapped to an OFDM symbol as in FIG. 2. In the example of the pilot symbol frame shown in FIG. 3, the case where one long GI pilot symbol is set using positions mapped to scattered pilot symbols indicated by the dotted line in FIG. 2, that is, using two second and third OFDM symbols for third and sixth subcarriers, is shown.

In this case, the phase control section a22 performs phase control by rotating a phase of the pilot symbol mapped to the second OFDM symbol by a rotation amount=$\theta_k$ corresponding to a length of the normal GI and a subcarrier position (number) without rotating a phase of the pilot symbol mapped to the third OFDM symbol. A detailed description regarding the phase control corresponding to the length of the normal GI and the subcarrier position (number) will be given later. The mapping section a21 maps zero (null) to a position into which an information data symbol is inserted.

Subsequently, the multiplexing section a30 multiplexes the mapped information data symbol output from the information data symbol generating section a10 and the pilot symbol output from the pilot symbol processing section a20 in the frequency domain. Subsequently, the IFFT section a40 performs transformation from a frequency domain signal to a time domain signal by IFFT processing. Subsequently, the GI inserting section a50 generates an OFDM symbol by inserting a GI into the time domain signal.

Figure 4A:
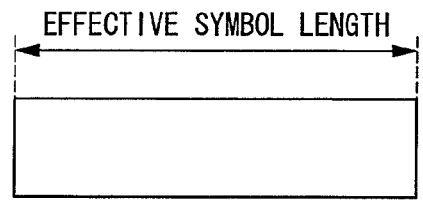
FIG. 4A is a first diagram showing a method of generating a normal GI according to the first embodiment of the present invention.
Figure 4B:
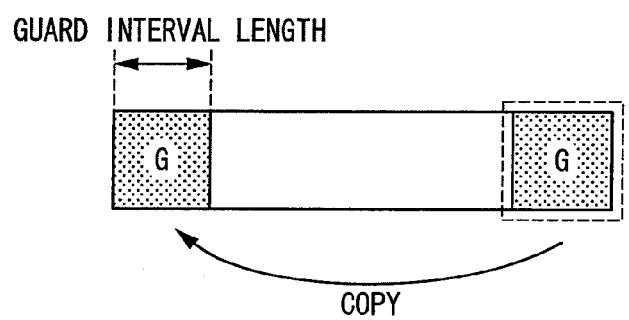
FIG. 4B is a second diagram showing a method of generating a normal GI according to the first embodiment of the present invention.
Figure 4C:
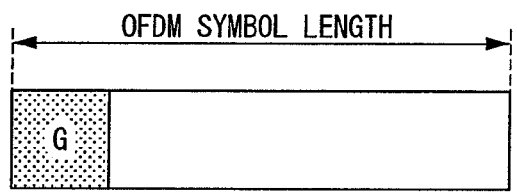
FIG. 4C is a third diagram showing a method of generating a normal GI according to the first embodiment of the present invention.

Here, the processing of inserting the GI by the GI inserting section a50 will be described. FIGS. 4A to 4C are diagrams showing a method of generating a normal GI by the GI inserting section a50. Part of a rear end as shown in FIG. 4B (a signal G having a predetermined GI length) is copied from the time domain signal input from the IFFT section a40, for example, a time domain signal having an effective symbol length shown in FIG. 4A, and is inserted into the front of an effective symbol. A symbol shown in FIG. 4C generated by inserting the signal G is an OFDM symbol. The signal G having the predetermined length copied and inserted into the front is the normal GI, the length of the signal G is a GI length of the normal GI (hereinafter referred to as a "normal GI length"), and a length formed by combining the effective symbol length and the normal GI length is a length of a normal GI symbol (hereinafter referred to as an "OFDM symbol length").

The processing of inserting the GI is the same as the processing of inserting a GI (normal GI) to be usually performed in communication of the OFDM scheme.

Subsequently, the transmitting section a60 performs digital-analog conversion, frequency conversion, and the like for the OFDM symbol output from the GI inserting section a50, and transmits a conversion result via the transmission antenna a100.

Next, a frame to be transmitted in the transmission apparatus of the first embodiment will be described.

Figure 5:
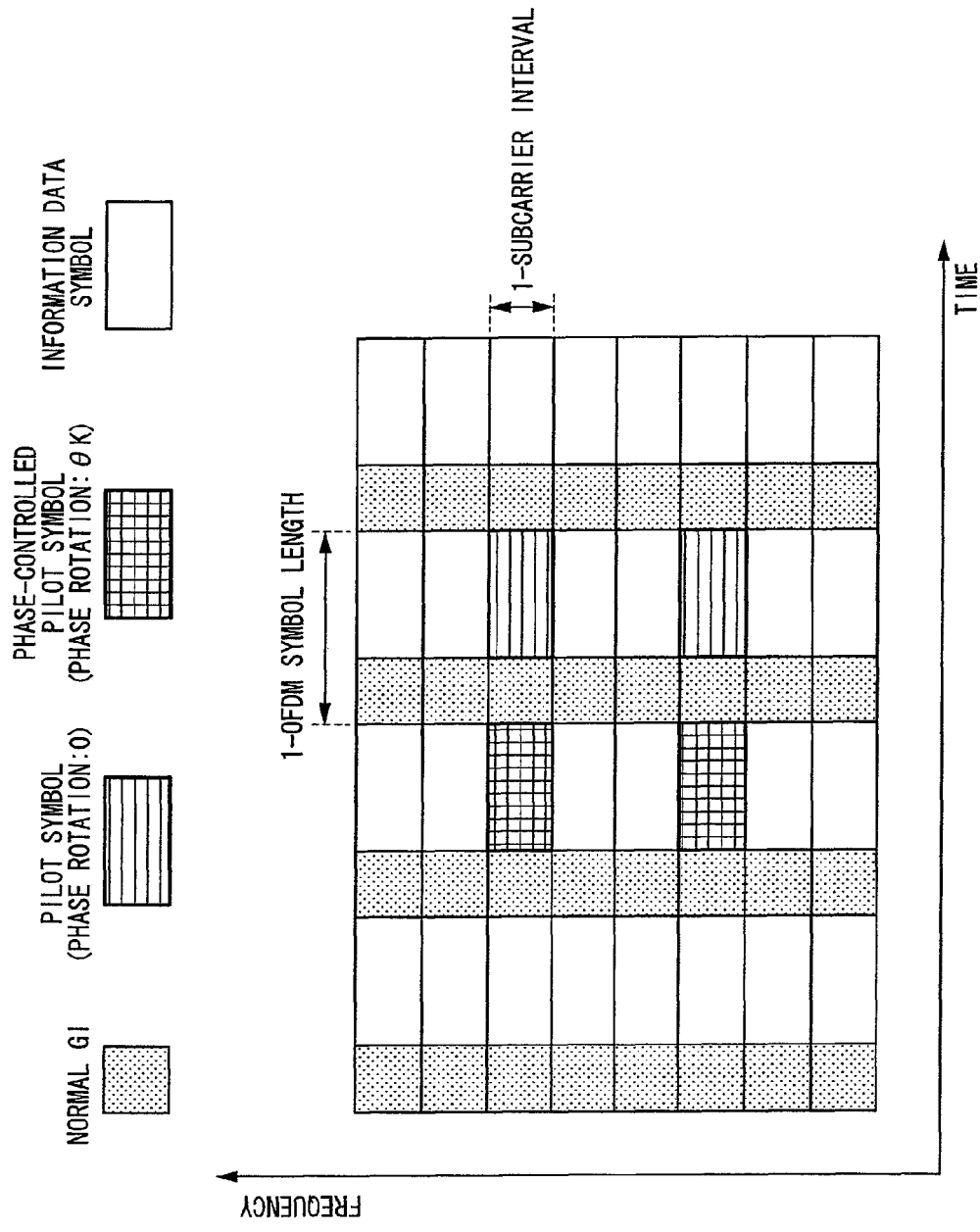
FIG. 5 is a diagram showing an example of a frame into which an information data symbol frame and a pilot symbol frame are multiplexed in the first embodiment of the present invention.
Figure 6:
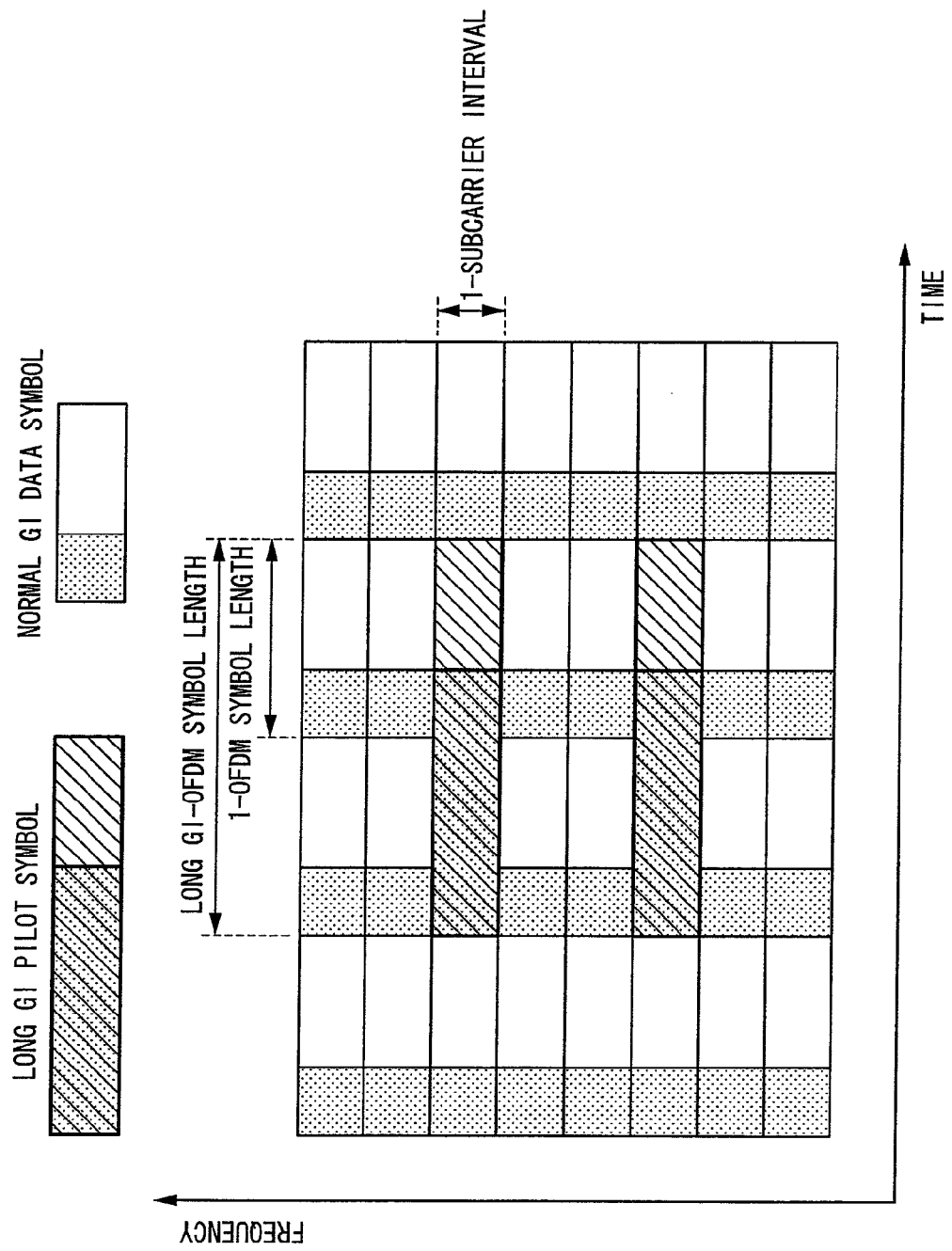
FIG. 6 is a diagram showing an example of a frame in which a normal GI information data symbol and a long GI pilot symbol are mixed among subcarriers in the first embodiment of the present invention.

FIG. 5 is a diagram showing an example of a frame in which the example of the information data symbol frame shown in FIG. 2 and the example of the pilot symbol frame shown in FIG. 3 are multiplexed by the multiplexing section a30 and a normal GI is added to a multiplexed signal by the GI inserting section a50 by a frequency component and a time component. In this case, an OFDM symbol is generated in which the normal GI symbol and the pilot symbol to which the long GI is added are mixed among subcarriers as shown in FIG. 6 because phase control corresponding to the normal GI length is performed for symbols mapped to third and sixth subcarriers of a second OFDM symbol by the phase control section a22 in FIG. 5. In FIG. 6, because the long GI pilot symbol is mapped as a symbol to which one long GI is added using two OFDM symbols, the one long GI has a significantly long GI length as compared with the normal GI. In FIGS. 5 and 6, the horizontal axis represents time, the vertical axis represents frequency, one row represents a subcarrier, and one column represents an OFDM symbol.

By multiplexing the information data symbol frame and the phase-controlled pilot symbol frame as described above, the subsequent processing can generate an OFDM symbol in which the normal GI and the long GI are mixed among subcarriers (FIG. 6) by performing each of the normal IFFT processing in communication of the OFDM scheme and the processing of adding the normal GI once (FIG. 5).

Because an effective symbol interval in an OFDM symbol to which the long GI is added (hereinafter referred to as a "long GI-OFDM symbol") is consistent with an effective symbol interval of a third OFDM symbol to which the normal GI is added in the time direction, the reception apparatus receiving the frame can set the FFT interval as in the related art. A detailed description regarding the FFT interval in the reception apparatus will be given later.

Next, phase control to be performed by the phase control section a22 for an OFDM symbol signal in which the same subcarrier is continuous in the transmission apparatus of the first embodiment will be described. That is, phase control for a symbol mapped to the second OFDM symbol of the third and sixth subcarriers of FIG. 3 will be described.

Figure 7A:
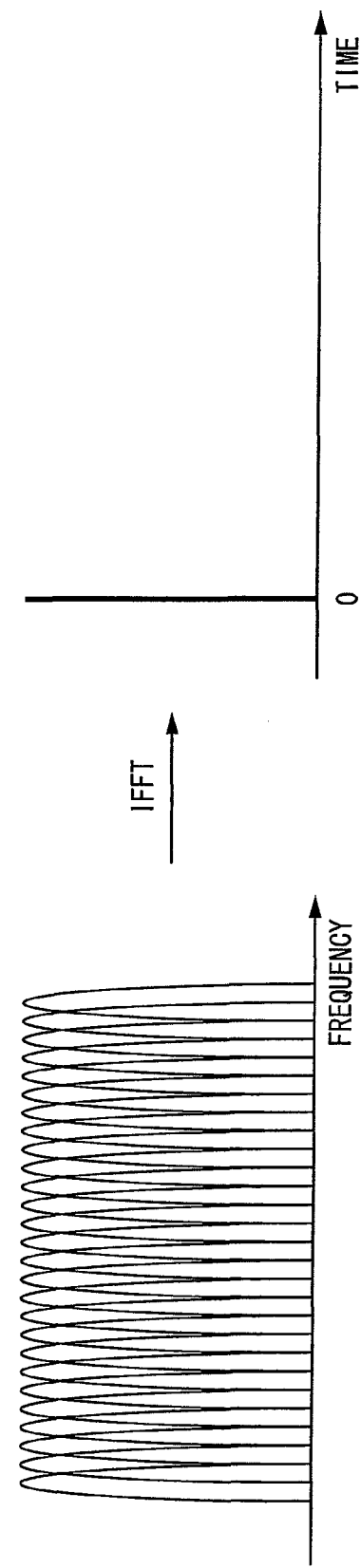
FIG. 7A is a diagram showing a result of IFFT processing of subcarriers without performing a phase rotation in the first embodiment of the present invention.

First, an effect obtained by phase-rotating a signal of each subcarrier in multicarrier transmission will be described. FIGS. 7A and 7B are diagrams showing results of IFFT processing of subcarriers.

If a phase rotation (phase offset) is not applied to each subcarrier, a time domain signal x(n), which is a result of IFFT processing of a modulation symbol X(k) of a k-th subcarrier (k=0, 1, . . . , $N_s$–1: $N_s$ is the number of subcarriers), which is a frequency domain signal, is shown in the following Equation (1). That is, the result of IFFT processing without performing the phase rotation is not shifted in the time direction as shown in FIG. 7A.

$$x(n) = \frac{1}{N_s} \sum_{k=0}^{N_s-1} X(k)\exp\left(\frac{2\pi i k n}{N_s}\right) \quad (1)$$

In the above Equation (1), n (n=0, 1, . . . , $N_s$–1) denotes a time, i denotes an imaginary unit, and exp( ) denotes an exponential function.

On the other hand, if the phase rotation is applied to a signal of each subcarrier, a phase rotation of a rotation amount $\theta_k = 2\pi k m/N_s$ is performed to a modulation symbol of a k-th subcarrier and a time domain signal x'(n), which is a result of IFFT processing, is shown in the following Equation (2). In the following Equation (2), the right side is modified and x(n+m) is further obtained from the above Equation (1). Accordingly, x'(n)=x(n+m).

This shows that a phase rotation of a rotation amount $\theta_k = 2\pi k m/N_s$ is applied to a modulation symbol of a k-th subcarrier and x'(n), which is a result of IFFT processing for k=0 to $N_s$–1, becomes x(n+m) obtained by shifting x(n) by m points in the time direction as shown in FIG. 7B.

$$x'(n) = \frac{1}{N_s} \sum_{k=0}^{N_s-1} \left\{X(k)\exp\left(\frac{2\pi i k m}{N_s}\right)\right\}\exp\left(\frac{2\pi i k m}{N_s}\right) \quad (2)$$

$$= \frac{1}{N_s} \sum_{k=0}^{N_s-1} X(k)\exp\left(\frac{2\pi i k (n+m)}{N_s}\right)$$

$$= x(n+m)$$

Subsequently, an operation of generating a long GI-OFDM symbol when the phase control section a22 performs phase control on an effective symbol of a continuous OFDM symbol will be described. FIGS. 8A to 8E are diagrams showing a method of generating one long GI from two OFDM symbols.

Figure 8A:
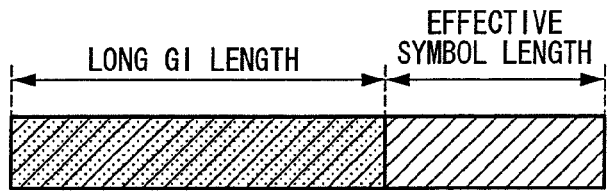
FIG. 8A is a first diagram showing a method of generating a long GI according to the first embodiment of the present invention.
Figure 8B:
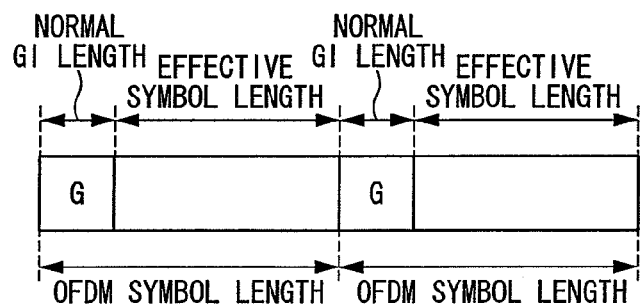
FIG. 8B is a second diagram showing a method of generating a long GI according to the first embodiment of the present invention.
Figure 8C:
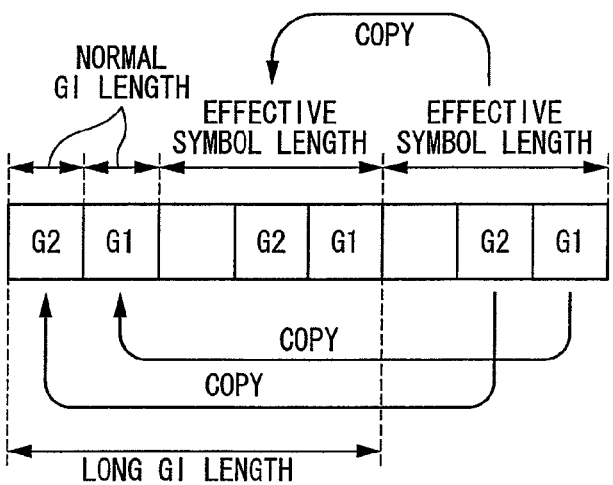
FIG. 8C is a third diagram showing a method of generating a long GI according to the first embodiment of the present invention.

FIG. 8A shows one subcarrier symbol to which a long GI is added (hereinafter referred to as a "long GI symbol"). Its symbol length is formed by combining two normal GI symbols each having an OFDM symbol length as shown in FIG. 8B. If the long GI is usually added as shown in FIG. 8A, one effective symbol length and a length of two normal GI lengths predetermined in the effective symbol length are iteratively copied and become a long GI as shown in FIG. 8C. For example, if intervals of two normal GI lengths from the right end of the effective symbol of FIG. 8A are G1 and G2, respectively, an interval of the long GI length from the left end is set as shown in FIG. 8C. That is, the interval of the long GI length is generated by first copying the effective symbol length including G1 and G2, further copying G1 and G2, and inserting the copied G1 and G2 into the front of the previously copied effective symbol length.

If the point of view of the long GI symbol in which a GI having a long GI length shown in FIG. 8C is generated is changed, it can be seen as OFDM symbols to which two normal GIs are added. That is, a rear (right) symbol of FIG. 8D becomes an OFDM symbol to which a signal G1 having the normal GI length is added, and a front (left) symbol becomes an OFDM symbol to which a signal G2 having the normal GI length is added.

Figure 8D:
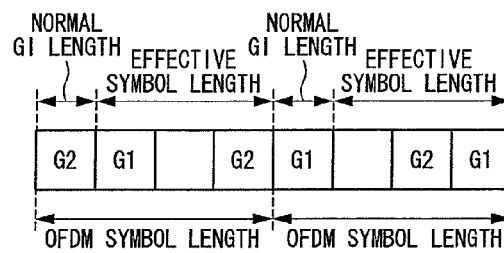
FIG. 8D is a fourth diagram showing a method of generating a long GI according to the first embodiment of the present invention.

At this time, if the effective symbol of the rear (right) OFDM symbol is compared with the effective symbol of the front (left) OFDM symbol in FIG. 8D, it can be seen that the rear (right) effective symbol is the same as the original effective symbol, but the front (left) effective symbol is the rear (right) effective symbol, that is, the original effective symbol, shifted by the normal GI length. In the embodiment, unlike the method shown in FIG. 8C, the long GI symbol as shown in FIG. 8A is generated by performing a shift corresponding to the normal GI length for the original effective symbol in terms of the effective symbol of the front (left) OFDM symbol without shifting the original effective symbol in terms of the effective symbol of the rear (right) OFDM symbol.

Next, the shift shown in FIG. 8D will be described. As described above, the effective symbol of the OFDM symbol to be shifted is the front (left) OFDM symbol, and the effective symbol is shifted by the normal GI length. At this time, the normal GI length is g and a time domain signal x(n–g) obtained by shifting a time domain signal x(n) by the normal GI length g is shown in the following Equation (3).

$$x(n-g) = \frac{1}{N_s} \sum_{k=0}^{N_s-1} X(k)\exp\left(\frac{2\pi i k (n-g)}{N_s}\right) \quad (3)$$

$$= \frac{1}{N_s} \sum_{k=0}^{N_s-1} \left\{X(k)\exp\left(-\frac{2\pi i k g}{N_s}\right)\right\}\exp\left(\frac{2\pi i k n}{N_s}\right)$$

$$= \frac{1}{N_s} \sum_{k=0}^{N_s-1} \{X(k)\exp(i\theta_k)\}\exp\left(\frac{2\pi i k n}{N_s}\right)$$

Figure 8E:
FIG. 8E is a diagram showing a method of generating a long GI according to the first embodiment of the present invention.

This shows that the time domain signal x(n) is shifted by the normal GI length g by the phase control section a22 that performs a phase rotation on the modulation symbol (pilot symbol) of the front (left) OFDM symbol, that is, the pilot symbol copied by the mapping section a21, by a phase rotation amount $\theta_k = -2\pi k g/N_s$ corresponding to the normal GI length as shown in FIG. 8E. The phase rotation is also varied by a subcarrier position k.

A method of generating one long GI symbol using two normal GI symbols each having the OFDM symbol length has been described above, but the case where a long GI symbol having three or more OFDM symbol lengths is generated can also be applied.

For example, FIGS. 9A to 9E are diagrams showing the case where one long GI symbol is generated using three normal GI symbols each having the OFDM symbol length.

Figure 9A:
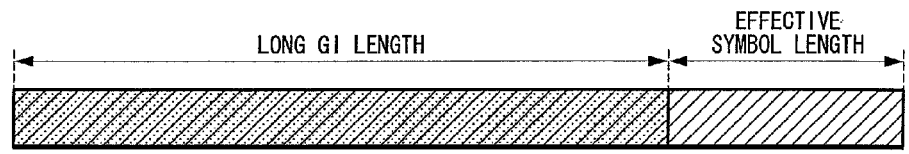
FIG. 9A is a first diagram showing another example of a method of generating a long GI according to the first embodiment of the present invention.
Figure 9B:
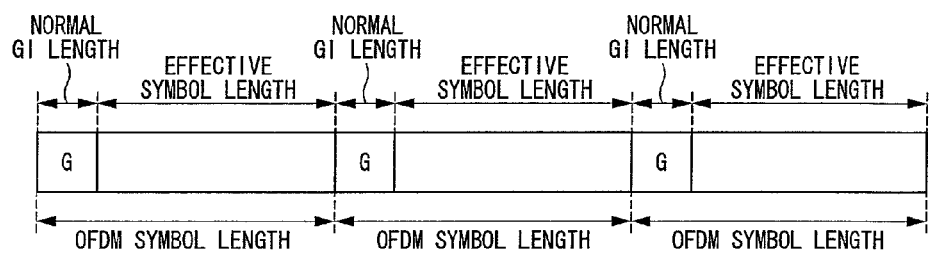
FIG. 9B is a second diagram showing another example of a method of generating a long GI according to the first embodiment of the present invention.
Figure 9C:
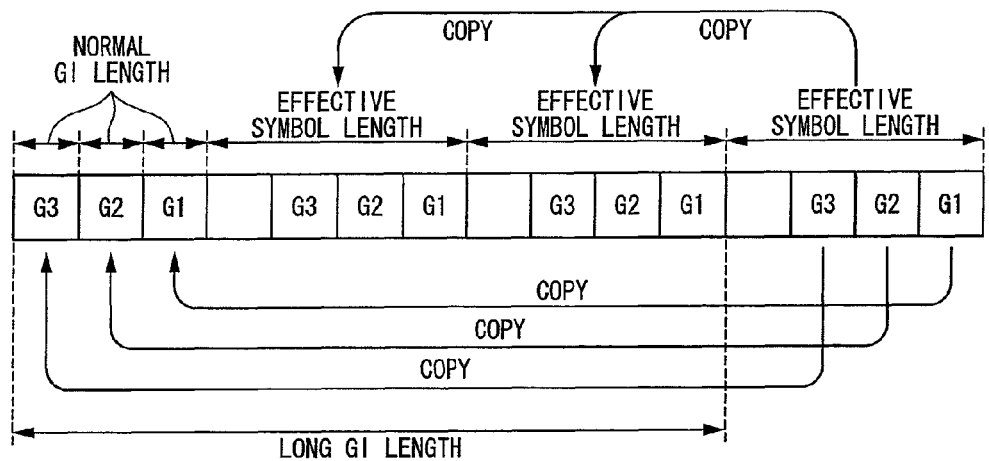
FIG. 9C is a third diagram showing another example of a method of generating a long GI according to the first embodiment of the present invention.

FIG. 9A shows a long GI symbol having three OFDM symbol lengths. In FIG. 9A, the symbol length is formed by combining three normal symbols each having the OFDM symbol length as shown in FIG. 9B. Usually, if the long GI as shown in FIG. 9A is added, two effective symbol lengths and a length of three normal GI lengths predetermined in the effective symbol lengths are iteratively copied and become a long GI as shown in FIG. 9C. For example, if intervals of three normal GI lengths from the right end of the effective symbol of FIG. 9A are G1, G2, and G3, respectively, an interval of the long GI length from the left end is set as shown in FIG. 9C. That is, the interval of the long GI length is generated by first copying the effective symbol length including G1, G2, and G3 twice, further copying G1, G2, and G3, and inserting the copied G1, G2, and G3 into the front of the previously copied effective symbol length.

Figure 9D:
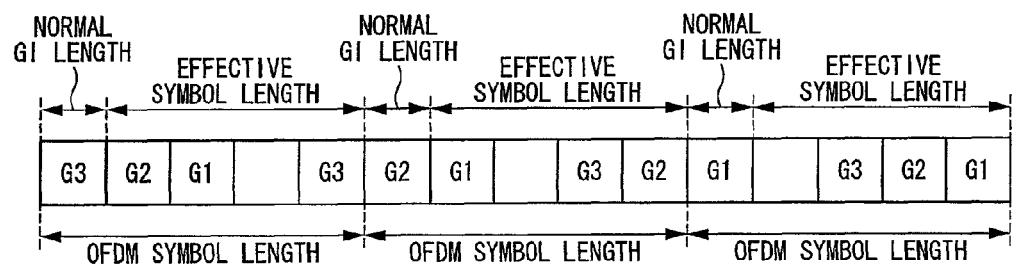
FIG. 9D is a fourth diagram showing another example of a method of generating a long GI according to the first embodiment of the present invention.
Figure 9E:
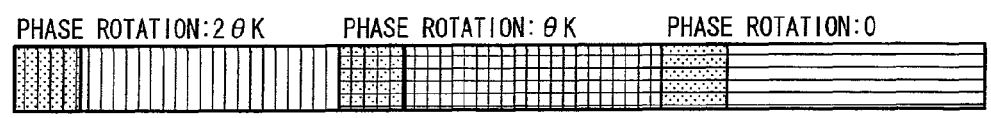
FIG. 9E is a fifth diagram showing another example of a method of generating a long GI according to the first embodiment of the present invention.

If the point of view of the long GI symbol generated by iteratively copying the effective symbol, G1, G2, and G3 is changed, it can be seen as OFDM symbols to which three normal GIs are added as shown in FIG. 9D. That is, a rear (right) symbol of FIG. 9D becomes an OFDM symbol to which a signal G1 having the normal GI length is added, a center symbol becomes an OFDM symbol to which a signal G2 having the normal GI normal length is added, and a front (left) symbol becomes an OFDM symbol to which a signal G3 having the normal GI length is added.

At this time, if the effective symbol of the rear (right) OFDM symbol, the effective symbol of the center OFDM symbol, and the effective symbol of the front (left) OFDM symbol in FIG. 9D are compared, it can be seen that the rear (right) effective symbol is the same as the original effective symbol, but the central effective symbol is the rear (right) effective symbol, that is, the original effective symbol, shifted by one normal GI length. It can be seen that the front (left) effective symbol is the rear (right) effective symbol, that is, the original effective symbol, shifted by two normal GI lengths. In the embodiment, unlike the method shown in FIG. 9C, the long GI symbol as shown in FIG. 9A is generated by performing a shift corresponding to the normal GI length for the original effective symbol in terms of the effective symbols of the center and front (left) OFDM symbols without performing a shift in terms of the effective symbol of the rear (right) OFDM symbol.

Next, the shift shown in FIG. 9D will be described. Because the shift for the central effective symbol in FIG. 9D is the same as shown in FIG. 8, the shift for the front (left) effective symbol in FIG. 9D will be described here.

The shift for the front (left) effective symbol is made by an amount corresponding to the shift of the effective symbol by two normal GI lengths. At this time, if the normal GI length is g and a phase rotation amount $\theta_k$ is $\theta_k = -2\pi kg/N_s$, a time domain signal $x(n-2g)$ is shown in the following Equation (4).

$$x(n-2g) = \frac{1}{N_s} \sum_{k=0}^{N_s-1} X(k)\exp\left(\frac{2\pi i k(n-2g)}{N_s}\right) \quad (4)$$

-continued $$= \frac{1}{N_s} \sum_{k=0}^{N_s-1} \left\{X(k)\exp\left(-\frac{2\pi i k \cdot 2g}{N_s}\right)\right\}\exp\left(\frac{2\pi i k n}{N_s}\right)$$

$$= \frac{1}{N_s} \sum_{k=0}^{N_s-1} \{X(k)\exp(i \cdot 2\theta_k)\}\exp\left(\frac{2\pi i k n}{N_s}\right)$$

This shows that it is preferable that the phase control section a22 perform a phase rotation of $2\theta_k$ on the effective symbol of the front (left) OFDM symbol for the effective symbol of the rear (right) OFDM symbol in FIG. 9D. The phase rotation is also varied by a subcarrier position k as shown in FIGS. 8A to 8E.

Hereinafter, likewise, even when a long GI symbol having four or more OFDM symbol lengths is generated, it can be generated by a phase rotation on each effective symbol at $3\theta_k$, $4\theta_k$, ..., $(n-1)\theta_k$ (n is the number of OFDM symbol lengths included in a long GI symbol).

The long GI can be generated by adding (copying) a signal having a predetermined length of the rear end of the effective symbol to the front thereof as described above, but the OFDM symbol length to which the long GI is added may be insufficient even when all effective symbols are copied to the front thereof. In this case, a signal having a predetermined length of the rear end of the effective symbol is further added to the front thereof. That is, it is possible to generate the long GI by iterating processing of copying to the front thereof again in order from a signal first added to the front thereof. In this case, the phase control section a22 generates the long GI symbol by performing a phase rotation corresponding to the number of copied normal GI length intervals.

Figure 10:
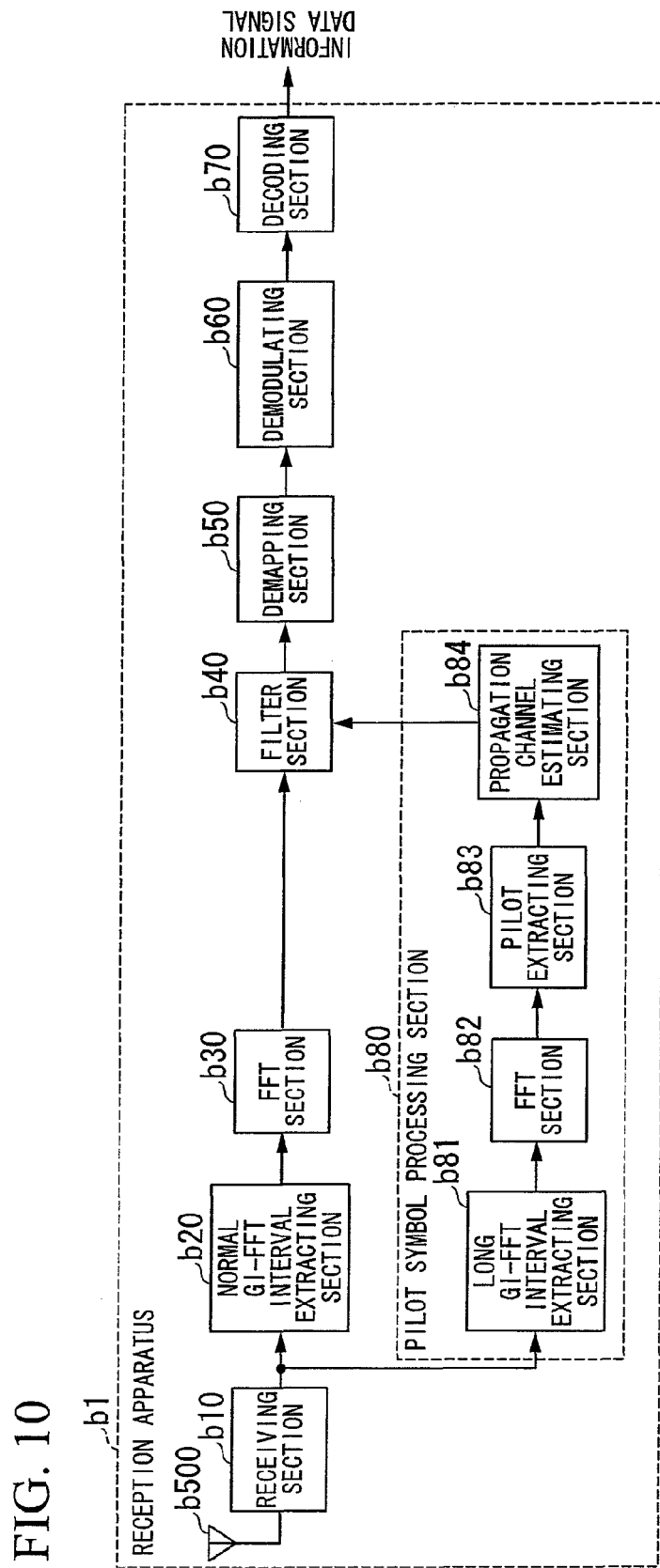
FIG. 10 is a schematic block diagram showing a configuration of a reception apparatus according to the first embodiment of the present invention.

Next, the reception apparatus according to the first embodiment for receiving a signal transmitted by the transmission apparatus a1 will be described. FIG. 10 is a schematic block diagram showing a configuration of the reception apparatus according to the first embodiment of the present invention. In FIG. 10, a reception apparatus b1 includes a reception antenna b500, a receiving section b10, a normal GI-FFT interval extracting section b20 (a first GI removing section), an FFT section b30, a filter section b40, a demapping section b50, a demodulating section b60, a decoding section b70, and a pilot symbol processing section b80.

The receiving section b10 outputs a baseband signal to the normal GI-FFT interval extracting section b20 and the pilot symbol processing section b80 by performing processing such as frequency conversion and analog-digital conversion for a reception signal received from the reception antenna b500.

The normal GI-FFT interval extracting section b20 removes an interval other than an FFT interval, that is, a normal GI interval, by extracting the FFT interval from the baseband signal input from the receiving section b10. The normal GI-FFT interval extracting section b20 removes the normal GI added to the OFDM symbol, that is, the normal GI outside the FFT interval of an information data symbol to which the normal GI is added shown in FIG. 11, in order to recover an information data signal included in the baseband signal, and outputs a time domain signal from which the normal GI is removed to the FFT section b30.

Figure 11:
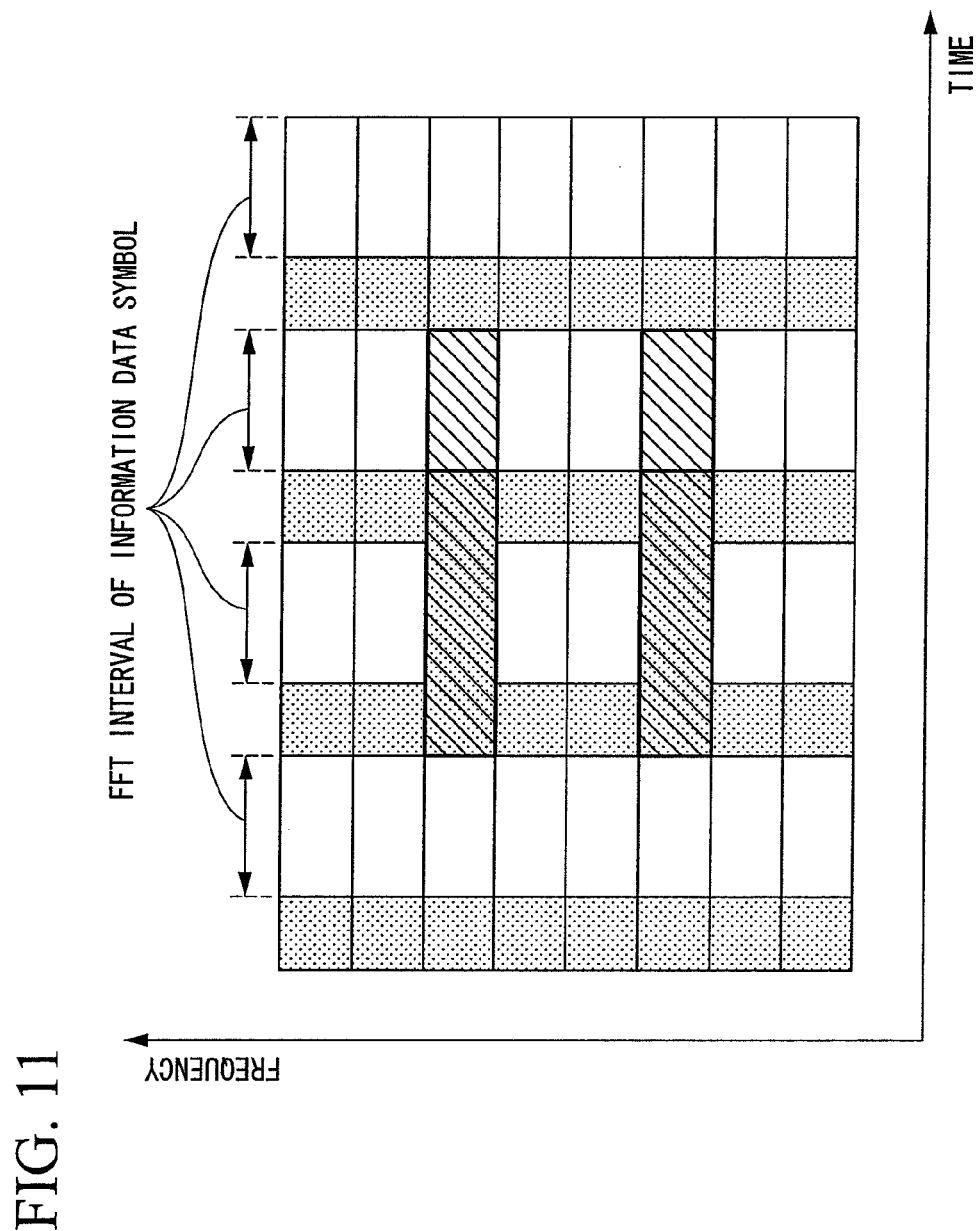
FIG. 11 is a diagram showing an FFT interval of an information data signal to which a normal GI is added according to the first embodiment of the present invention.

The FFT section b30 performs FFT processing of the FFT interval of the information data symbol to which the normal GI is added shown in FIG. 11 for the time domain signal input from the normal GI-FFT interval extracting section b20, performs conversion from the time domain signal into a frequency domain signal, and outputs a conversion result to the filter section b40. In FIG. 11, the horizontal axis represents time, the vertical axis represents frequency, one row represents a subcarrier, and one column represents an OFDM symbol.

The pilot symbol processing section b80 performs propagation channel estimation by a pilot symbol of the baseband signal input from the receiving section b10, and outputs a result of propagation channel estimation to the filter section b40. Next, this point will be described in detail. The pilot symbol processing section b80 includes a long GI-FFT interval extracting section b81 (a second GI removing section), an FFT section b82, a pilot extracting section b83 (a symbol extracting section), and a propagation channel estimating section b84.

The long GI-FFT interval extracting section b81 removes an interval other than an FFT interval, that is, a long GI, by extracting the FFT interval from the baseband signal input from the receiving section b10. The long GI-FFT interval extracting section b81 removes the long GI added to a scattered pilot symbol, that is, the long GI outside the FFT interval of a pilot symbol to which the long GI is added shown in FIG. 12, in order to recover the pilot symbol included in the baseband signal, and outputs a time domain signal obtained by removing the long GI from the baseband signal to the FFT section b82.

Figure 12:
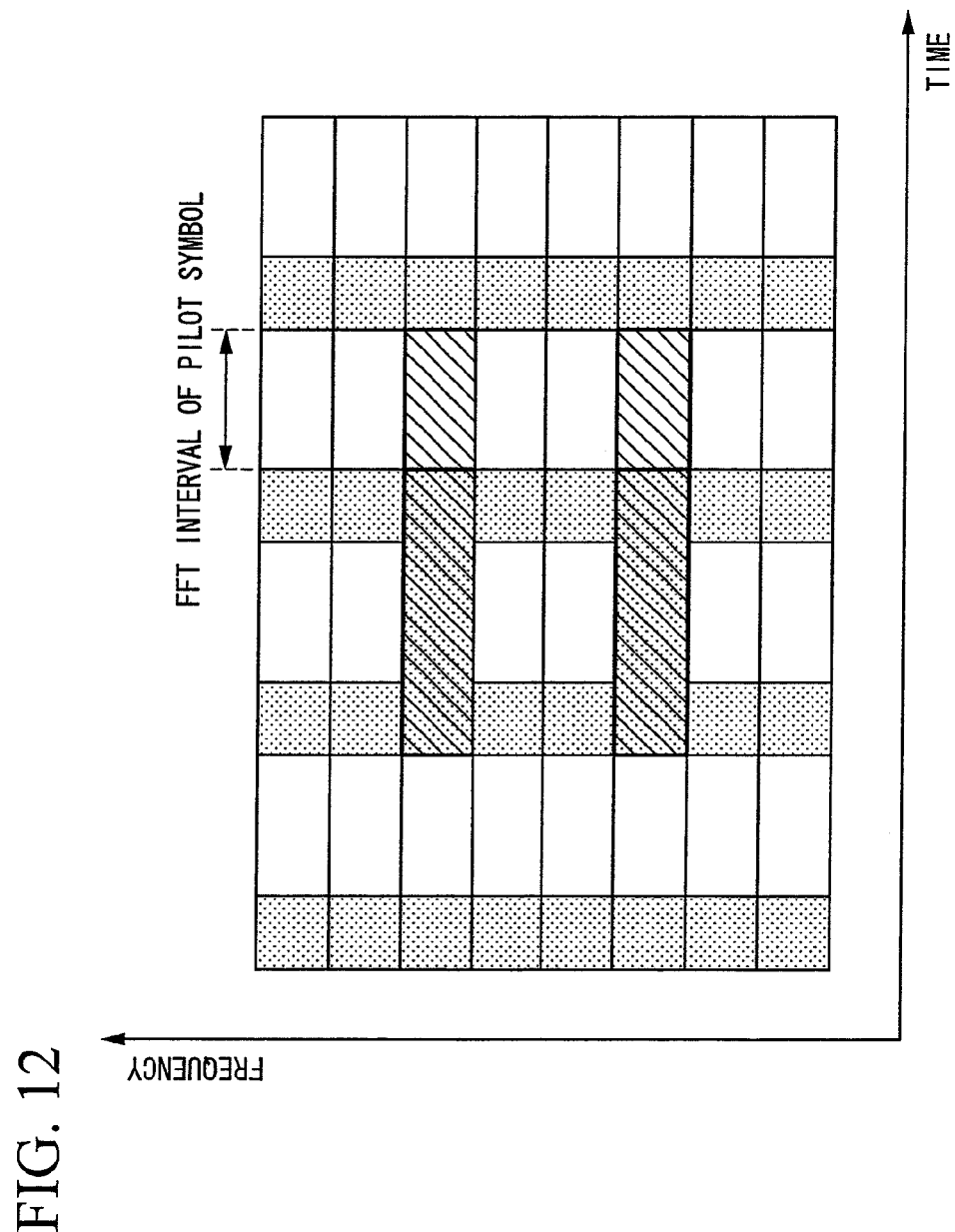
FIG. 12 is a diagram showing an FFT interval of a pilot symbol to which a long GI is added according to the first embodiment of the present invention.

The FFT section b82 performs FFT processing of the FFT interval of the pilot symbol to which the long GI is added shown in FIG. 12 for the time domain signal from which the long GI is removed, input from the long GI-FFT interval extracting section b81, performs conversion from the time domain signal from which the long GI is removed into a frequency domain signal, and outputs a conversion result to the pilot extracting section b83. In FIG. 12, the horizontal axis represents time, the vertical axis represents frequency, one row represents a subcarrier, and one column represents an OFDM symbol.

The pilot extracting section b83 extracts a scattered pilot symbol by extracting a signal of a resource element mapped to the pilot symbol, which is a predetermined time and subcarrier (resource element), from the frequency domain signal from which the long GI is removed input from the FFT section b82, and outputs the extracted scattered pilot symbol to the propagation channel estimating section b84.

The propagation channel estimation section b84 estimates amplitude and phase changes of a transmission signal due to a propagation channel by multipath fading or the like using a scattered pilot symbol extracted by the pilot extracting section b83 (propagation channel estimation), and outputs a result of propagation channel estimation to the filter section b40. As a method of estimating a propagation channel for a resource element other than a resource element mapped to a scattered pilot symbol, various methods such as well-known linear interpolation and FFT interpolation can be used.

A method of performing propagation channel estimation using a pilot symbol in which a long GI is removed from a long GI pilot symbol, that is, a scattered pilot symbol, which is an effective symbol interval of a pilot symbol extracted by the pilot extracting section b83, has been described above, but the propagation channel estimation method is not limited thereto. The propagation channel estimation can be performed using part of the long GI within the long GI pilot symbol. For example, the long GI having the same length as the effective symbol length from the rear end of the long GI is set as the pilot symbol. It is possible to improve the accuracy of propagation channel estimation by averaging the pilot symbol.

The mapping section b40 calculates a weight coefficient of each subcarrier, for example, using a zero forcing (ZF) criterion, a minimum mean square error (MMSE) criterion, or the like, based on a propagation channel estimation value (propagation channel estimation result) estimated by the propagation channel estimating section b84 of the pilot symbol processing section b80, compensates a frequency domain signal input from the FFT section b30 for signal amplitude and phase changes (propagation channel compensation), and outputs the propagation channel-compensated frequency domain signal to the demapping section b50.

The demapping section b50 performs demapping processing of extracting an information data symbol by extracting a signal of a resource element mapped to the information data symbol, which is a predetermined time and subcarrier (resource element), from the frequency domain signal of which the propagation channel is compensated by the filter section b40, and outputs the extracted information data symbol to the demodulating section b60.

The demodulating section b60 demodulates the information data symbol (for example, modulated by a modulation scheme such as QPSK or QAM) input from the demapping section b50, and outputs an error-correction coded information data signal to the decoding section b70.

The decoding section b70 decodes the demodulated error-correction coded information data signal input from the demodulating section b60 (for example, error-correction coded by a convolutional code, a turbo code, or the like) using maximum likelihood decoding (MLD), maximum a posteriori probability (MAP), long-MAP, max-log-MAP, soft output Viterbi algorithm (SOVA), or the like, and outputs the information data signal (reception data) to an upper layer processing apparatus (not shown) for the reception apparatus b1.

Figure 13A:
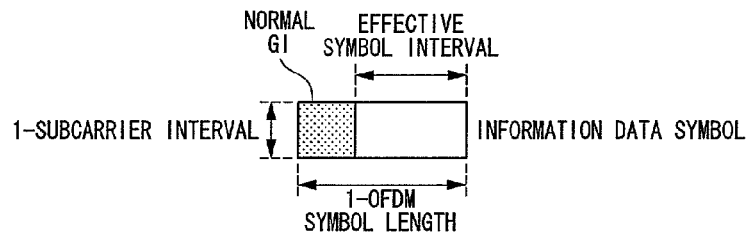
FIG. 13A is a diagram showing a signal of a normal GI according to the first embodiment of the present invention.
Figure 13B:
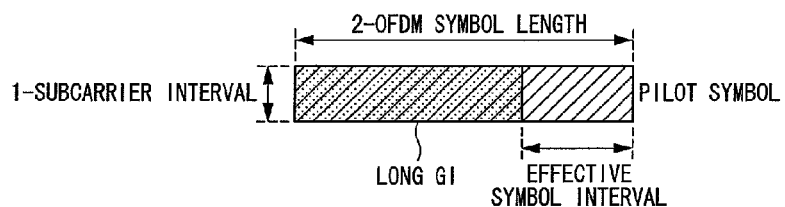
FIG. 13B is a diagram showing a signal of a long GI according to the first embodiment of the present invention.

Next, the resistance to ISI of a normal GI symbol and a long GI symbol according to the first embodiment will be described. FIGS. 13A and 13B are diagrams showing the normal GI symbol and the long GI symbol. FIG. 13A shows a normal GI symbol, which is a GI-added symbol of an information data signal (hereinafter referred to as a "normal GI information data symbol"), and FIG. 13B shows a long GI symbol, which is a GI-added symbol of a pilot symbol (a long GI pilot symbol). The long GI symbol shown in FIG. 13B has twice the length of the normal GI symbol shown in FIG. 13A. Because the effective symbol length of the long GI symbol is also the same as that of the normal GI symbol, an interval other than the effective symbol in the long GI symbol shown in FIG. 13B is all within a GI.

Figure 14:
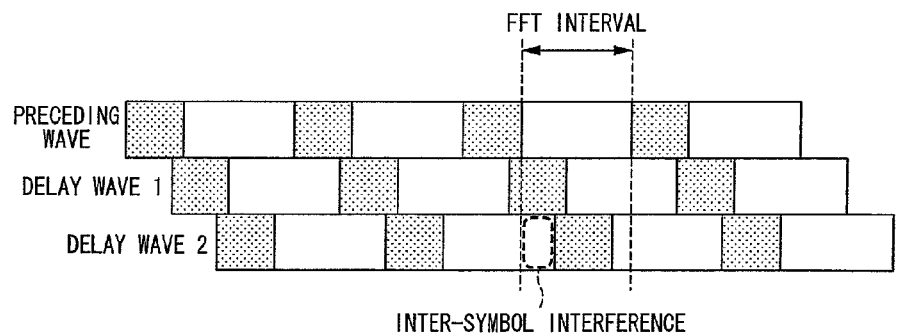
FIG. 14 is a diagram showing an example in which a signal constituted by only a normal GI is received in the first embodiment of the present invention.

FIG. 14 is a diagram showing an example in which a signal constituted by only a normal GI symbol is received. FIG. 14 shows the case where a signal constituted by only a normal GI symbol arrives as a preceding wave and two delay waves and FFT processing for a third OFDM symbol is performed. At this time, an FFT interval is set to an effective symbol interval of a first arriving preceding wave.

In FIG. 14, because a second OFDM symbol of a second arriving delay wave 1 (an OFDM symbol previous to the third OFDM symbol for which this FFT processing is performed) is not included in the set FFT interval, FFT processing can be normally performed.

In FIG. 14, a second OFDM symbol of a third arriving delay wave 2 (an OFDM symbol previous to the third OFDM symbol for which this FFT processing is performed) exceeds a GI of the preceding wave serving as a standard. That is, in the FFT processing of the third OFDM symbol, the second OFDM symbol of the delay wave 2 is included in the FFT interval. Thereby, ISI occurs in the third OFDM symbol of the preceding wave and the second OFDM symbol of the delay wave 2 and an interference component is included in an FFT processing result.

Figure 15:
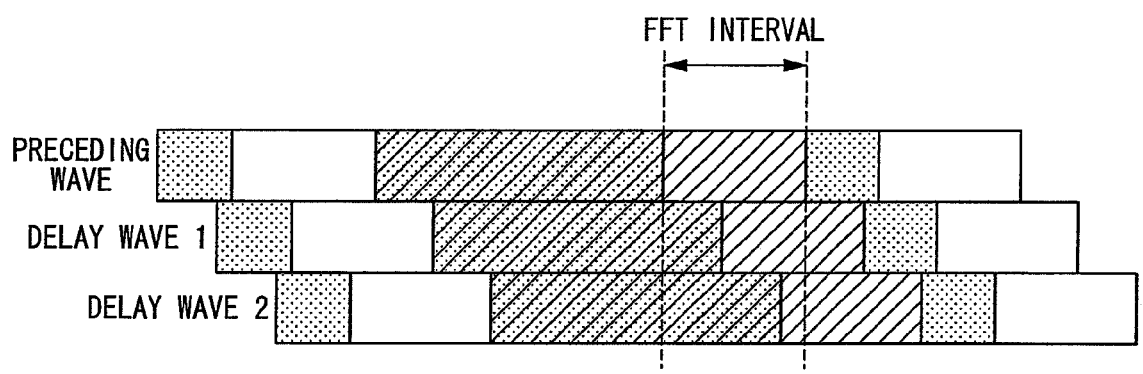
FIG. 15 is a diagram showing an example in which a signal constituted by a normal GI and a long GI is received in the first embodiment of the present invention.

On the other hand, FIG. 15 is a diagram showing an example in which a signal constituted by a normal GI symbol and a long GI symbol is received. FIG. 15 shows the case where a signal constituted by a normal GI symbol and a long GI symbol arrives as a preceding wave as in FIG. 14 and two delay waves and FFT processing is performed for an OFDM symbol in the same interval as that of FIG. 14. At this time, the FFT interval is set to an effective symbol interval of a first arriving preceding wave.

In FIG. 15, an OFDM symbol previous to an OFDM symbol for which this FFT processing is performed is a long GI symbol with a second arriving delay wave 1 and a third arriving delay wave 2. That is, if a signal constituted by only a normal GI symbol exceeds a GI of the preceding wave as shown in FIG. 14, it is possible to prevent the occurrence of ISI by the long GI symbol, for example, even in the case of the delay wave 2 of FIG. 14.

Thereby, it can be seen that a long GI symbol improves the resistance to ISI to a normal GI symbol.

According to the first embodiment of the present invention as described above, the reception apparatus can estimate a propagation channel with high accuracy without substantially degrading the entire transmission efficiency of communication because the resistance to ISI is improved by inserting a scattered pilot symbol into any subcarrier within the same OFDM symbol and setting a long GI longer than a normal GI for only the scattered pilot symbol in an environment where an arrival wave exceeding the normal GI due to a propagation channel arrives.

It is possible to perform highly accurate propagation channel estimation by adding a long GI even in an environment where an arriving wave exceeding a normal GI arrives, and accurately recover an information data signal by applying a result of propagation channel estimation obtained using the long GI to an information data symbol to which the normal GI is added. For example, it can be used in iterative processing such as interference cancellation or turbo equalization of removing ISI or the like using a recovery result.

Because a long GI can be formed by only mapping a scattered pilot symbol obtained by phase-controlling a mapped scattered pilot symbol to a previous resource element in the time direction, GI insertion processing can be performed like GI (normal GI) insertion processing that is usually performed in communication of the OFDM scheme.

An example in which two GI types of a normal GI and a long GI are provided has been described in the first embodiment, but the present invention is not limited thereto. The present invention can also apply three or more types of GIs to different signals. That is, a normal GI, which is a first GI, and long GIs, which are a plurality of types of second GIs, can be designated.

The pilot symbol processing section a20 may have the same functions as the encoding section a11 and the modulating section a12, and may receive a pilot signal by making a change to a pilot symbol, perform error-correction coding processing and modulation processing for the input pilot signal, and generate the pilot symbol.

The case where the long GI is added to all input pilot symbols has been described in the first embodiment, but the present invention is not limited thereto. For example, the long GI may be added only to some pilot symbols and the normal GI may be added to other pilot symbols.

Second Embodiment

Figure 16:
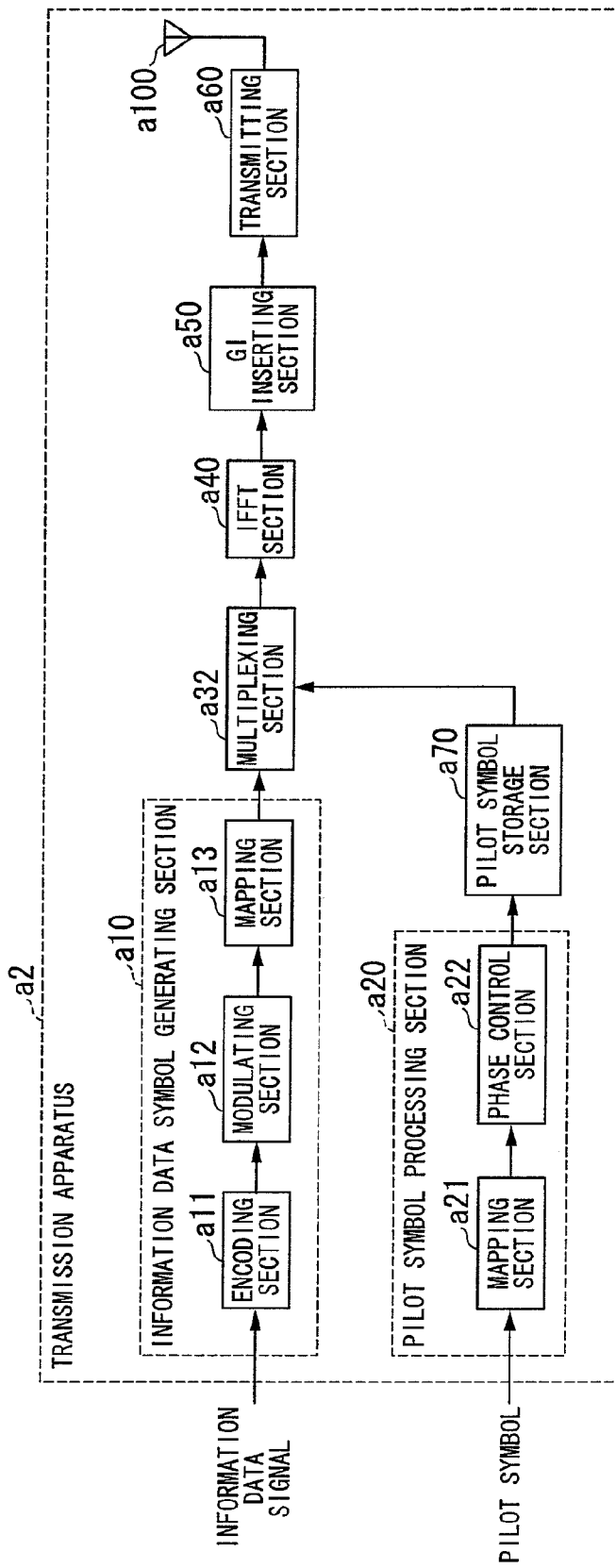
FIG. 16 is a schematic block diagram showing a configuration of a transmission apparatus according to a second embodiment of the present invention.

Next, the case where a generated pilot symbol is stored as the second embodiment of the present invention will be described. A communication system according to the second embodiment includes a transmission apparatus and a reception apparatus. FIG. 16 is a schematic block diagram showing a configuration of the transmission apparatus according to the second embodiment. In FIG. 16, a transmission apparatus a2 includes an information data symbol generating section a10, a pilot symbol processing section a20, a pilot symbol storage section a70 (a symbol storage section), a multiplexing section a32, an IFFT section a40, a GI inserting section a50, a transmitting section a60, and a transmission antenna a100.

In the configuration of the transmission apparatus a2 of FIG. 16, a difference from the transmission apparatus a1 according to the first embodiment shown in FIG. 1 is that the pilot symbol storage section a70 is added after the pilot symbol processing section a20. The information data symbol generating section a10, the pilot symbol processing section a20, the IFFT section a40, the GI inserting section a50, the transmitting section a60, and the transmission antenna a100 in FIG. 16 have the same functions as those of the first embodiment shown in FIG. 1.

The reception apparatus according to the second embodiment is the same as the reception apparatus b1 (FIG. 10) shown in the first embodiment.

The information data symbol generating section a10 performs the same processing as described in the first embodiment for an information data signal (transmission data) input from an upper layer processing apparatus (not shown) for the transmission apparatus a2, and outputs a mapped information data symbol to the multiplexing section a32.

The pilot symbol processing section a20 performs the same processing as described in the first embodiment for a pilot symbol input from the upper layer processing apparatus (not shown) for the transmission apparatus a2, and outputs a mapped pilot symbol to the pilot symbol storage section a70.

The pilot symbol storage section a70 stores the mapped pilot symbol and a phase-controlled pilot symbol input from the pilot symbol processing section a20. The mapped pilot symbol and the phase-controlled pilot symbol stored in the pilot symbol storage section a70 are read by the multiplexing section a32.

The multiplexing section a32 multiplexes the mapped information data symbol input from the information data symbol generating section a10, the mapped pilot symbol read from the pilot symbol storage section a70, and the phase-controlled pilot symbol by performing the same processing as described in the first embodiment, and outputs a multiplexing result to the IFFT section a40.

Thereafter, the same processing as described in the first embodiment is performed, and hence an OFDM symbol is transmitted via the transmission antenna a100.

That is, it is possible to divert the mapped pilot symbol and the phase-controlled pilot symbol stored in the pilot symbol storage section a70 as long as a value of a scattered pilot symbol and its position are not changed. Thereby, the number of times of processing of the pilot symbol processing section a20 performed for each transmission in the first embodiment is reduced, that is, the entire calculation amount related to communication is reduced because the processing of the pilot symbol processing section a20 can be executed only when a value or position of a scattered pilot symbol is changed.

According to the second embodiment of the present invention as described above, a scattered pilot symbol is inserted into any subcarrier within the same OFDM symbol and a pilot symbol in which a long GI longer than a normal GI is set for only the scattered pilot symbol is pre-generated and pre-stored in an environment where an arrival wave exceeding the normal GI due to a propagation channel arrives. Thereafter, when the transmission apparatus transmits an information data signal, the pre-stored pilot symbol is multiplexed into the information data symbol to be transmitted if necessary. Thereby, it is possible to reduce the number of calculations for pilot symbol generation performed for each transmission in the first embodiment, and also implement propagation channel estimation with high accuracy in the reception apparatus without substantially degrading the entire transmission efficiency of communication because the resistance to ISI is improved.

The case where the transmission apparatus a2 includes the pilot symbol processing section a20 and the mapped pilot symbol and the phase-controlled pilot symbol are input to the pilot symbol storage section a70 has been described in the second embodiment, but the pilot symbol processing section a20 of the transmission apparatus a2 can be omitted. In this case, for example, a pre-created mapped pilot symbol and phase-controlled pilot symbol generated in the upper layer processing apparatus (not shown) for the transmission apparatus a2 are configured to be directly input to the pilot symbol storage section a70 of the transmission apparatus a2, instead of inputting the pilot symbol from the upper layer processing apparatus (not shown) for the transmission apparatus a2 to the transmission apparatus a2.

The case where the long GI is added to all input pilot symbols has been described in the second embodiment, but the present invention is not limited thereto. For example, the long GI may be added to some pilot symbols and the normal GI may be added to other pilot symbols.

Third Embodiment

Figure 17:
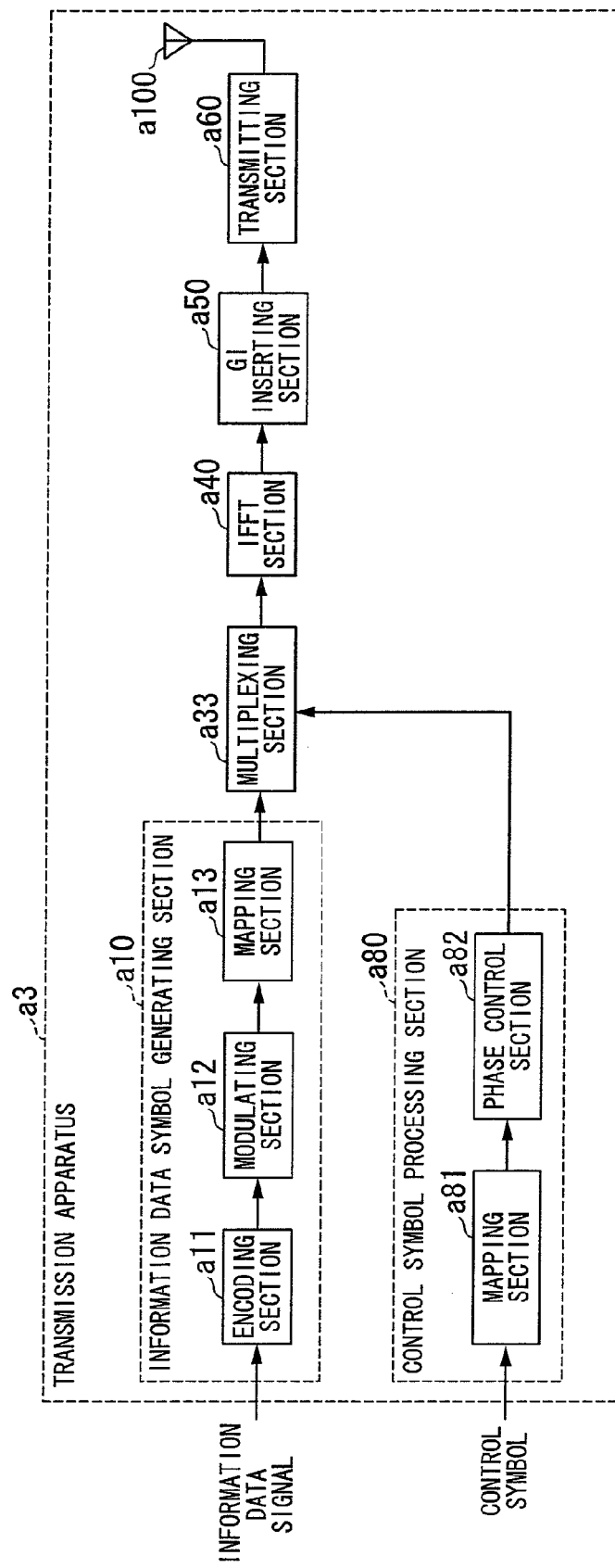
FIG. 17 is a schematic block diagram showing a configuration of a transmission apparatus according to a third embodiment of the present invention.

Next, the case where control data is transmitted will be described as the third embodiment of the present invention. A communication system according to the third embodiment includes a transmission apparatus and a reception apparatus. FIG. 17 is a schematic block diagram showing a configuration of the transmission apparatus according to the third embodiment. In FIG. 17, a transmission apparatus a3 includes an information data symbol generating section a10, a control symbol processing section a80, a multiplexing section a33, an IFFT section a40, a GI inserting section a50, a transmitting section a60, and a transmission antenna a100.

In the configuration of the transmission apparatus a3 of FIG. 17, a difference from the transmitter a1 according to the first embodiment shown in FIG. 1 is that the pilot symbol processing section a20 is replaced by the control symbol processing section a80. Instead of the pilot symbol input to the transmission apparatus a1 in the first embodiment, a control symbol is input from an upper layer processing apparatus (not shown) for the transmission apparatus a3. In FIG. 17, the information data symbol generating section a10, the IFFT section a40, the GI inserting section a50, the transmitting section a60, and the transmission antenna a100 of the transmission apparatus a3 have the same functions as those of the first embodiment shown in FIG. 1.

The reception apparatus according to the third embodiment is the same as the reception apparatus b1 (FIG. 10) shown in the first embodiment.

Here, the control symbol input from the upper layer processing apparatus (not shown) for the transmission apparatus a3 to the transmission apparatus a3 is information regarding a plurality of information data signals, and includes information necessary for receiving the plurality of information data signals, for example, such as a modulation scheme of adaptive modulation, a mapping method (resource allocation method), error-correction coding information (for example, a coding method, a coding rate, and a puncturing pattern), an interleaving method, a scrambling method, hybrid automatic repeat request (HARQ) control information (for example, packet reception notification information (an acknowledgement (ACK)), non-packet-reception notification information (a negative acknowledgement (NACK)), the number of retransmissions, or the like), a synchronization signal, spatial multiplexing technology (multiple input multiple output (MIMO)) control information (for example, the number of layers (the number of streams) or a precoding method), base station information, terminal information, format information of control information, format information of data information, feedback information (for example, a channel quality indicator (CQI) or the like), and transmission power control information, but the present invention is not limited thereto.

The information data symbol generating section a10 performs the same processing as described in the first embodiment for an information data signal (transmission data) to be transmitted, which is input from the upper layer processing apparatus (not shown) for the transmission apparatus a3, and outputs a mapped information data symbol to the multiplexing section a33.

The control symbol processing section a80 maps the control symbol input from the upper layer processing apparatus (not shown) for the transmission apparatus a3 as in processing of the pilot symbol processing section a20 described in the first embodiment, and further maps a control symbol obtained by phase-controlling the mapped control symbol to a previous resource element in the time direction, that is, maps a phase-controlled control symbol to serve as part of a long GI later, and outputs the symbols to the multiplexing section a33. Next, this point will be described in detail. The control symbol processing section a80 includes a mapping section a81 and a phase control section a82.

The mapping section a81 maps the input control symbol to a time and subcarrier (resource element) predetermined to be scattered in the frequency direction and the time direction as in processing of the mapping section a21 of the pilot symbol processing section a20 described in the first embodiment, and outputs a mapping result to the phase control section a82. If a control symbol to which a long GI is added (hereinafter referred to as a "long GI control symbol") is generated by two OFDM symbols, the mapping section a81 copies a control symbol when mapping the control symbol, and maps the copied control symbol to a previous resource element in the time direction of a resource element to which an original control symbol is mapped so that the copied control symbol serves as part of the long GI later.

The phase control section a82 performs phase control for the control symbol serving as the part of the long GI within the mapped control symbol input from the mapping section a81 according to a length of a normal GI and a subcarrier position (number) as in the processing of the phase control section a22 of the pilot symbol processing section a20 described in the first embodiment, and outputs all control symbols including the phase-controlled control symbol to the multiplexing section a33 as an output of the control symbol processing section a80. As described above, it is possible to generate a control symbol to which a long GI is added like the long GI pilot symbol according to the first embodiment by controlling a phase by the phase control section a82 and inserting a normal GI by the GI inserting section a50 later.

The multiplexing section a33 multiplexes the mapped information data symbol input from the information data symbol generating section a10, the mapped control symbol input from the control symbol processing section a80, and the phase-controlled control symbol by performing the same processing as described in the first embodiment, and outputs a multiplexing result to the IFFT section a40.

Thereafter, the same processing as described in the first embodiment is performed, and hence an OFDM symbol is transmitted via the transmission antenna a100.

Next, a frame to be transmitted from the transmission apparatus of the third embodiment will be described.

Figure 18:
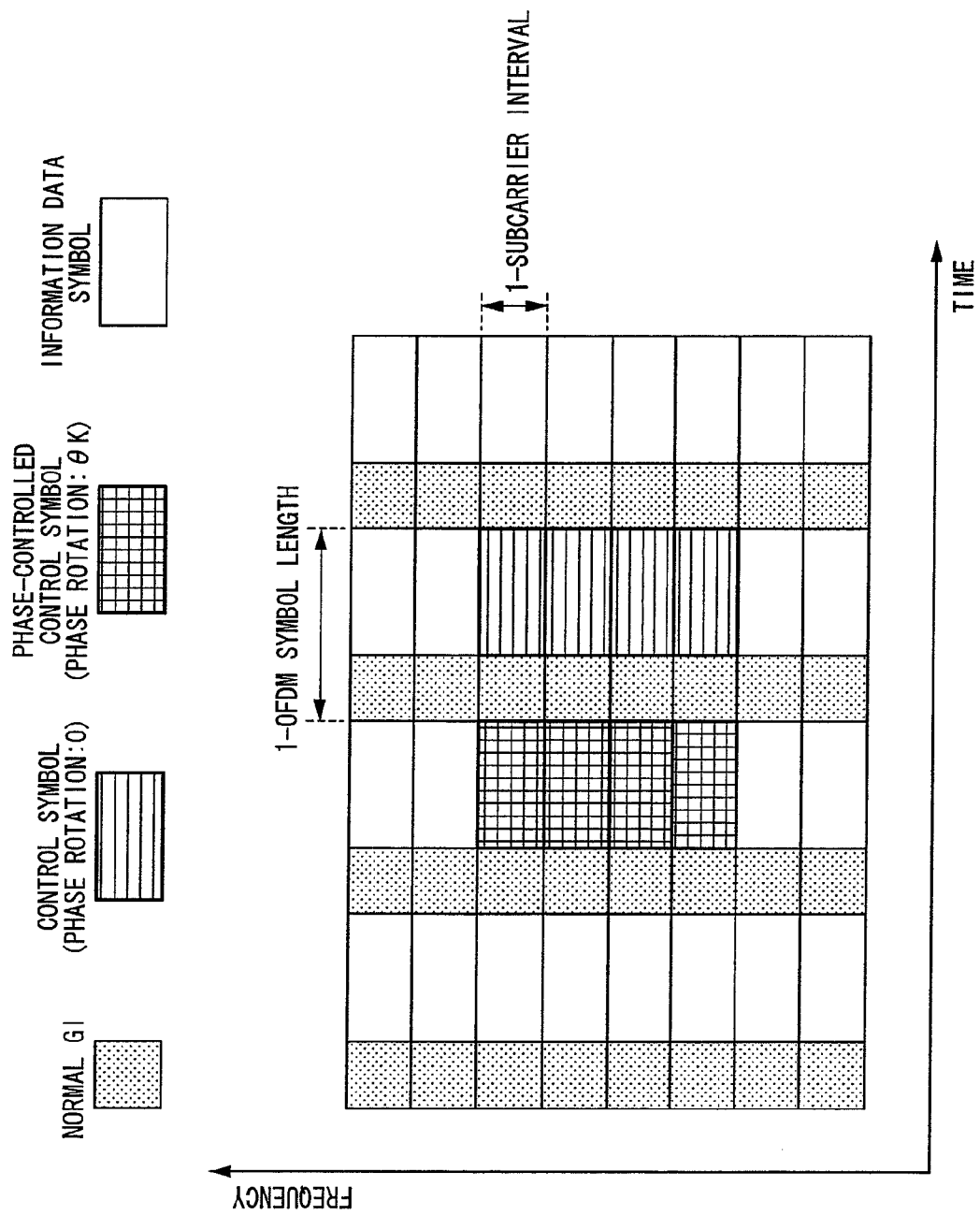
FIG. 18 is a diagram showing an example of an OFDM symbol into which a normal GI information data symbol and a long GI control symbol are multiplexed in the third embodiment of the present invention.
Figure 19:
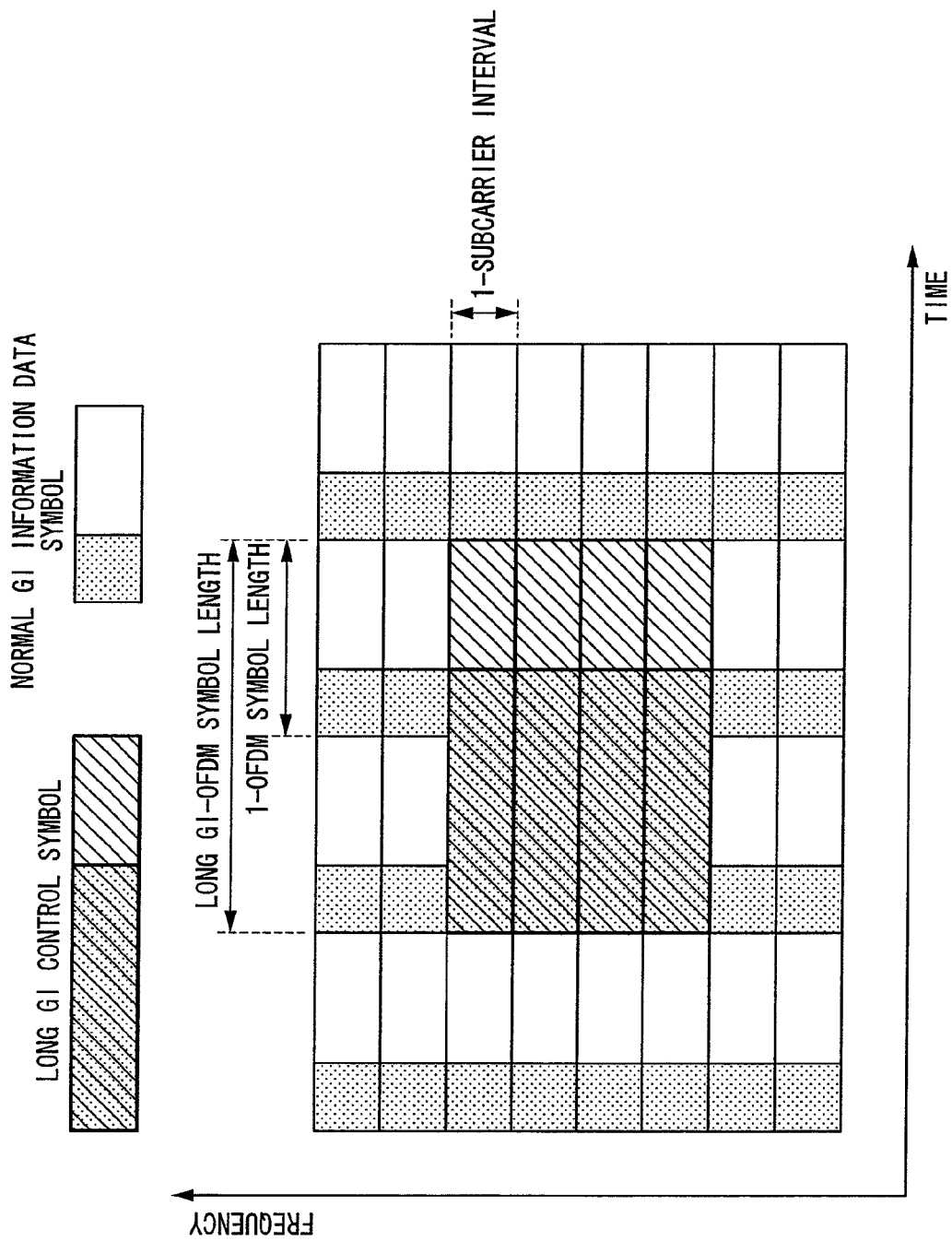
FIG. 19 is a diagram showing an example of an OFDM symbol in which a normal GI information data symbol and a long GI control symbol are mixed among subcarriers in the third embodiment of the present invention.

FIG. 18 is a diagram showing an example of a frame in which an information data symbol and a control symbol are multiplexed by the multiplexing section a33 and a normal GI is added to a multiplexed signal by the GI inserting section a50 by a frequency component and a time component. The frame in which the signal as shown in FIG. 18 is arranged can be seen as a frame in which a normal GI information data symbol and a long GI control symbol are mixed among subcarriers as shown in FIG. 19. In FIGS. 18 and 19, the horizontal axis represents time, the vertical axis represents frequency, one row represents a subcarrier, and one column represents an OFDM symbol.

In FIG. 19, the long GI control symbol is subjected to phase control corresponding to a normal GI length by the phase control section a82 for a front OFDM symbol within the control symbol, that is, a symbol mapped to third to sixth subcarriers of a second OFDM symbol, as described in the first embodiment. In FIG. 19, the long GI control symbol is mapped as a symbol to which one long GI is added using two OFDM symbols, and one long GI has a significantly long GI length as compared with the normal GI. Thereby, it is also possible to improve the resistance to ISI in the control symbol.

According to the third embodiment of the present invention as described above, a control signal is inserted into any subcarrier within the same OFDM symbol and a long GI longer than a normal GI is set for only the control signal. Thereby, the reception apparatus can recover a control signal with high accuracy without substantially degrading the entire transmission efficiency of communication because the resistance to ISI is improved in an environment where an arrival wave exceeding the normal GI due to a propagation channel arrives.

The case where a long GI is added to a control symbol has been described in the third embodiment, but the present invention is not limited thereto. The long GI can be added to a symbol of a signal having high importance within an information data signal. For example, the long GI can be added to an information data signal having high quality of service (QoS), an information data signal having high urgency, or the like.

The transmission apparatus 3a according to the third embodiment can be applied as the transmission apparatus according to the first and second embodiments by processing a control symbol input from the upper layer processing apparatus (not shown) for the transmission apparatus a3 as a pilot symbol. Even when a control symbol and a pilot symbol are input from the upper layer processing apparatus (not shown) for the transmission apparatus a3, it is possible to add the long GI to the two symbols by equally applying it.

The control symbol processing section a80 may have the same functions as the encoding section a11 and the modulating section a12, and may receive a control signal by making a change to a control symbol, perform error-correction coding processing and modulation processing for the input control signal, and generate the control symbol.

The case where the long GI is added to all input control symbols has been described in the third embodiment, but the present invention is not limited thereto. For example, it is possible to add the long GI to some control symbols and add the normal GI to other control symbols. In this case, it is preferable to add the long GI to a control symbol having high importance within the control symbols.

Fourth Embodiment

Figure 20:
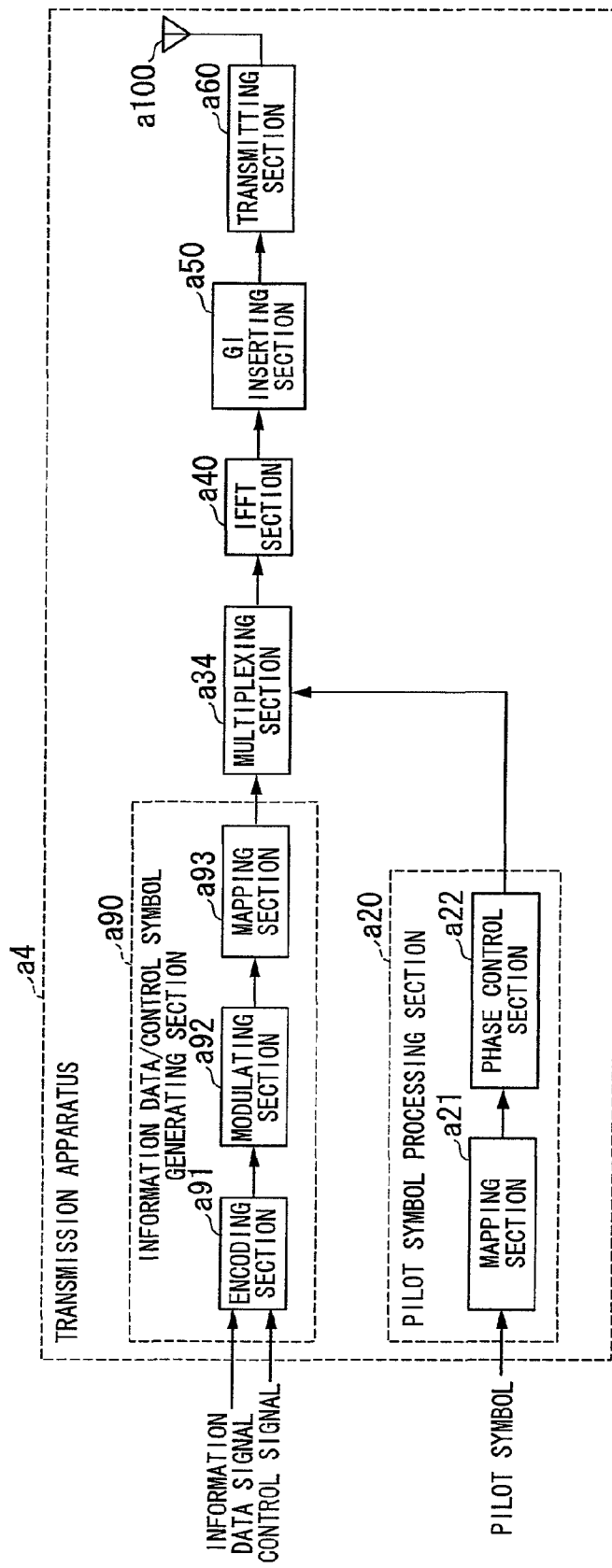
FIG. 20 is a schematic block diagram showing a configuration of a transmission apparatus according to a fourth embodiment of the present invention.

Next, the case where control data is transmitted will be described as the fourth embodiment of the present invention. A communication system according to the fourth embodiment includes a transmission apparatus and a reception apparatus. FIG. 20 is a schematic block diagram showing a configuration of the transmission apparatus according to the fourth embodiment. In FIG. 20, a transmission apparatus a4 includes an information data/control symbol generating section a90, a pilot symbol processing section a20, a multiplexing section a34, an IFFT section a40, a GI inserting section a50, a transmitting section a60, and a transmission antenna a100.

In the configuration of the transmission apparatus a4 of FIG. 20, a difference from the transmission apparatus a1 according to the first embodiment shown in FIG. 1 is that the information data symbol generating section a10 is replaced by the information data/control symbol generating section a90. In addition to the information data signal and the pilot symbol input to the transmission apparatus a1 in the first embodiment, a control symbol is also input from an upper layer processing apparatus (not shown) for the transmission apparatus a4. In FIG. 20, the pilot symbol processing section a20, the IFFT section a40, the GI inserting section a50, the transmitting section a60, and the transmission antenna a100 of the transmission apparatus a4 have the same functions as those of the first embodiment shown in FIG. 1.

The reception apparatus according to the fourth embodiment is the same as the reception apparatus b1 (FIG. 10) shown in the first embodiment.

Here, the control signal input from the upper layer processing apparatus (not shown) for the transmission apparatus a4 to the transmission apparatus a4 is information regarding a plurality of information data signals and includes information necessary for receiving the plurality of information data signals, for example, such as a modulation scheme of adaptive modulation, a mapping method (resource allocation method), error-correction coding information (for example, a coding method, a coding rate, and a puncturing pattern), an interleaving method, a scrambling method, HARQ control information (for example, packet reception notification information (an ACK), non-packet-reception notification information (an NACK), the number of retransmissions, or the like), a synchronization signal, spatial multiplexing technology (MIMO) control information (for example, the number of layers (the number of streams) or a precoding method), base station information, terminal information, format information of control information, format information of data information, feedback information (for example, a CQI or the like), and transmission power control information, but the present invention is not limited thereto.

The information data/control symbol generating section a90 maps an information data symbol and a control symbol obtained by encoding and modulating an information data signal (transmission signal) and a control signal (transmission signal) to be transmitted, which are input from the upper layer processing apparatus (not shown) for the transmission apparatus a4 to resource elements, and outputs the mapped information data symbol and control symbol to the multiplexing section a34. Next, this point will be described in detail. The information data/control symbol generating section a90 includes an encoding section a91, a modulating section a92, and a mapping section a93.

The encoding section a91 performs error-correction coding based on a convolutional code, a turbo code, or the like for the input information data signal and control signal, and outputs the error-correction coded information data signal and control signal to the modulating section a92.

The modulating section a92 modulates the error-correction coded information data signal and control signal input from the encoding section a91, for example, by a modulation scheme such as QPSK or QAM, generates an information data symbol, which is a modulation symbol of the information data signal, and a control symbol, which is a modulation symbol of the control signal, and outputs the information data symbol and the control symbol to the mapping section a93.

The mapping section a93 maps the information data symbol and the control symbol input from the modulating section a92 to predetermined resource elements, other than a resource element into which a scattered pilot symbol or the like is inserted by the pilot symbol processing section a20, and outputs the mapped information data symbol and control symbol, that is, frequency domain signals to which the normal GI is added later, to the multiplexing section a34 as an output of the information data/control symbol generating section a90.

Figure 21:
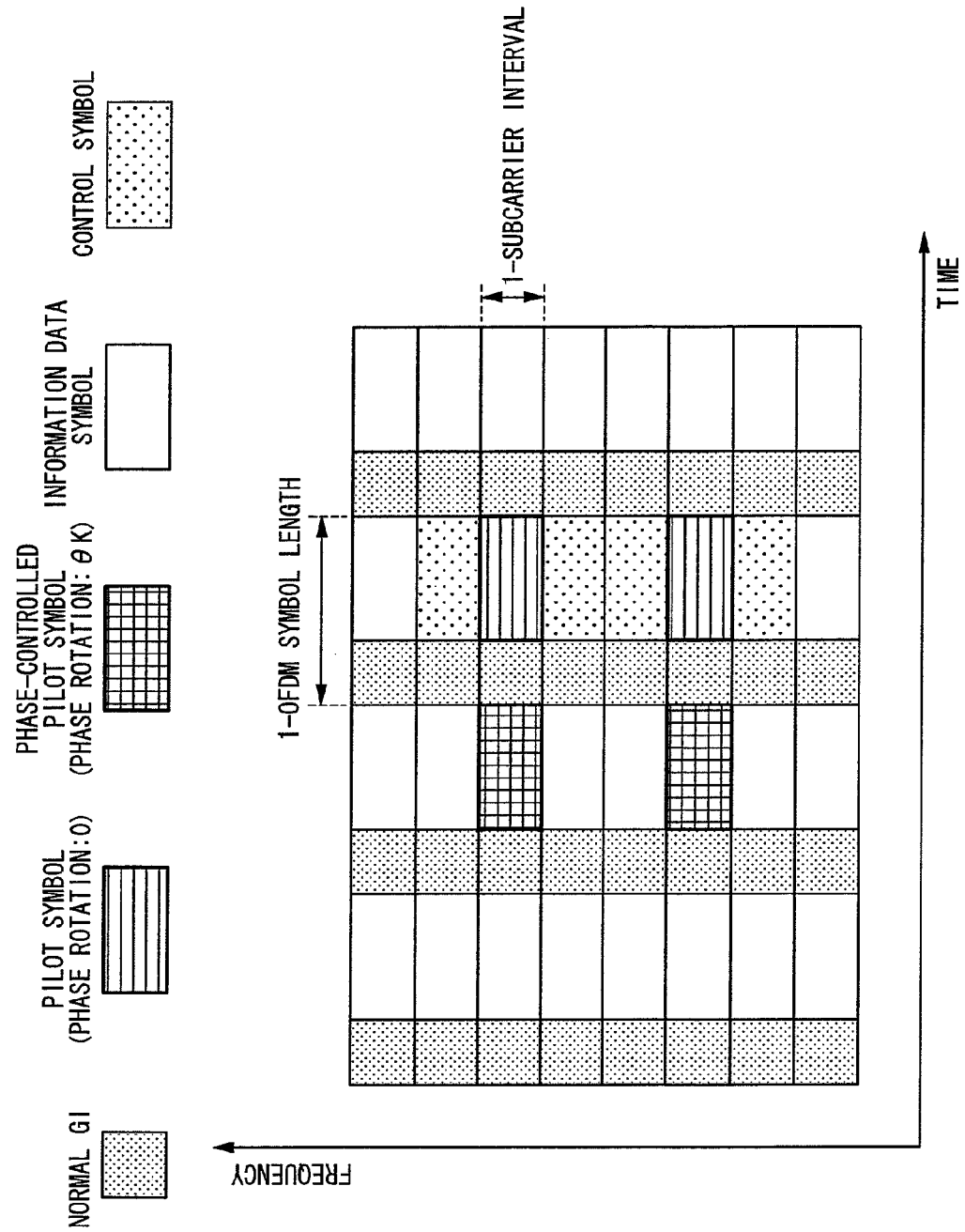
FIG. 21 is a diagram showing a signal of an example of a frame into which normal GI information data, a normal GI control symbol, and a long GI pilot symbol are multiplexed in the fourth embodiment of the present invention.
Figure 22:
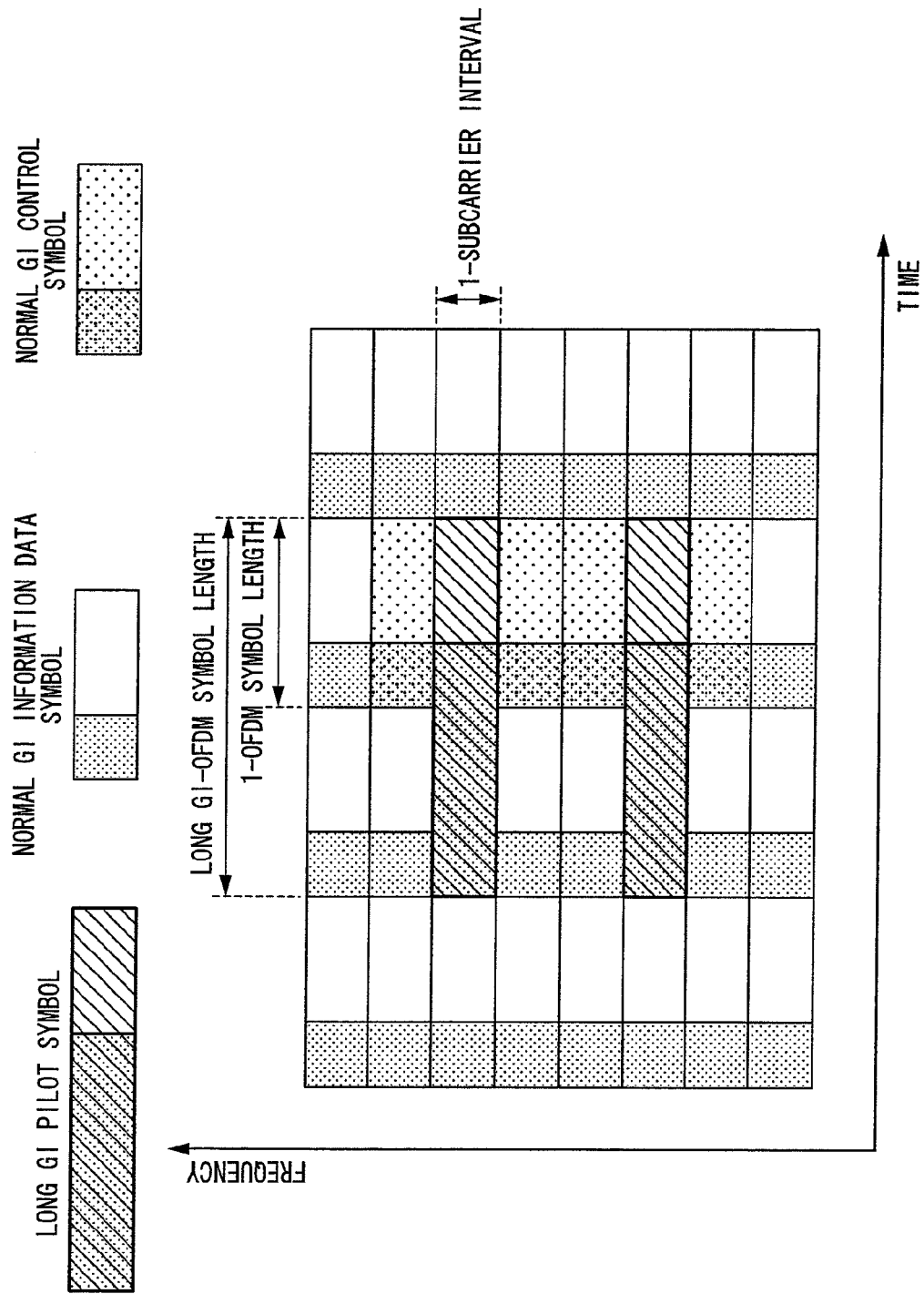
FIG. 22 is a diagram showing a signal of an example of a frame in which normal GI information data, a normal GI control symbol, and a long GI pilot symbol are mixed among subcarriers in the fourth embodiment of the present invention.

In the mapping of the control symbol by the mapping section a93, it is preferentially mapped to an element after an adjacent subcarrier within the same OFDM symbol as a scattered pilot symbol to which a long GI is added later as shown in FIGS. 21 and 22 to be described later.

The pilot symbol processing section a20 performs the same processing as described in the first embodiment for the pilot symbol input from the upper layer processing apparatus (not shown) for the transmission apparatus a4, and outputs the mapped pilot symbol to the multiplexing section a34.

The multiplexing section a34 multiplexes the mapped information data symbol and control symbol input from the information data/control symbol generating section a90, the mapped pilot symbol input from the pilot symbol processing section a20, and a phase-controlled pilot symbol by performing the same processing as described in the first embodiment, and outputs a multiplexing result to the IFFT section a40.

Thereafter, the same processing as described in the first embodiment is performed, and hence an OFDM symbol is transmitted via the transmission antenna a100.

A normal GI symbol, which is a GI-added symbol of the control signal, is referred to as a "normal GI control symbol."

Next, a frame to be transmitted from the transmission apparatus of the fourth embodiment will be described.

FIG. 21 is a diagram showing an example of a frame in which the mapped information data symbol and control symbol, the mapped pilot symbol, and the phase-controlled pilot symbol are multiplexed by the multiplexing section a34 and a normal GI is added to a multiplexed signal by the GI inserting section a50 by a frequency component and a time component. The frame in which the signal as shown in FIG. 21 is arranged can be seen as a frame in which a normal GI information data symbol, a normal GI control symbol, and a long GI pilot symbol are mixed among subcarriers as shown in FIG. 22. In FIGS. 21 and 22, the horizontal axis represents time, the vertical axis represents frequency, one row represents a subcarrier, and one column represents an OFDM symbol.

As shown in FIG. 22, the information data/control symbol generating section a90 preferentially maps the normal GI control symbol to an element after an adjacent subcarrier within the same OFDM symbol as the long GI pilot symbol.

In general, this has an effect of improving the resistance to inter-carrier interference (ICI) occurring in a signal after FFT processing because a discontinuous part such as a joint of a symbol in part of an arrival wave is included in an FFT interval when the reception apparatus b1 performs the FFT processing in an environment where an arrival wave exceeding a GI arrives. That is, ICI may not occur because an arrival wave exceeding the GI does not arrive in a symbol to which the long GI is added as shown in FIG. 22.

From this, highly accurate recovery is possible because ICI is reduced in a resource element after a subcarrier adjacent to a symbol to which the long GI is added, that is, a resource element to which a control symbol is mapped in a third OFDM symbol, as compared with other resource elements.

According to the fourth embodiment of the present invention as described above, a scattered pilot symbol is inserted into any subcarrier within the same OFDM symbol and a long GI longer than a normal GI is set for only the scattered pilot symbol. The reception apparatus can recover a control signal with high accuracy because ICI is reduced in an environment where an arrival wave exceeding a normal GI due to a propagation channel arrives by preferentially allocating the control signal to an element located in an adjacent subcarrier of the scattered pilot symbol.

An example in which a control signal is preferentially mapped to a resource element after an adjacent subcarrier within the same OFDM symbol as a long GI pilot symbol has been described in the fourth embodiment, but the present invention is not limited thereto. It can also be mapped to a resource element of any subcarrier within the same OFDM symbol as the long GI pilot symbol. In this case, it is preferable to map the control signal to a resource element of a subcarrier near to a resource element of the long GI pilot symbol.

For example, it is possible to preferentially map an information data signal having high QoS, an information data signal having high urgency, or the like.

An example in which a control signal preferentially mapped to a resource element of an adjacent subcarrier within the same OFDM symbol as the long GI pilot symbol has been described as the normal GI in the fourth embodiment, but the present invention is not limited thereto. It is possible to add the long GI to the preferentially mapped control signal. Thereby, the transmission apparatus a4 according to the fourth embodiment can be applied as the transmission apparatus according to the first to third embodiments. In this case, a function of performing the same processing as phase control of a pilot symbol described in the first embodiment for a control signal input to the information data/control symbol generating section a90 is included and configured.

The case where the long GI is added to all input pilot symbols has been described in the fourth embodiment, but the present invention is not limited thereto. For example, the long GI can be added to some pilot symbols and the normal GI can be added to other pilot symbols.

In terms of the control symbol shown in FIG. 21, a control symbol to which the long GI is added can be generated by phase-controlling a front OFDM symbol within the pilot symbol as in the phase control of the pilot symbol described in the first embodiment.

Fifth Embodiment

Figure 23:
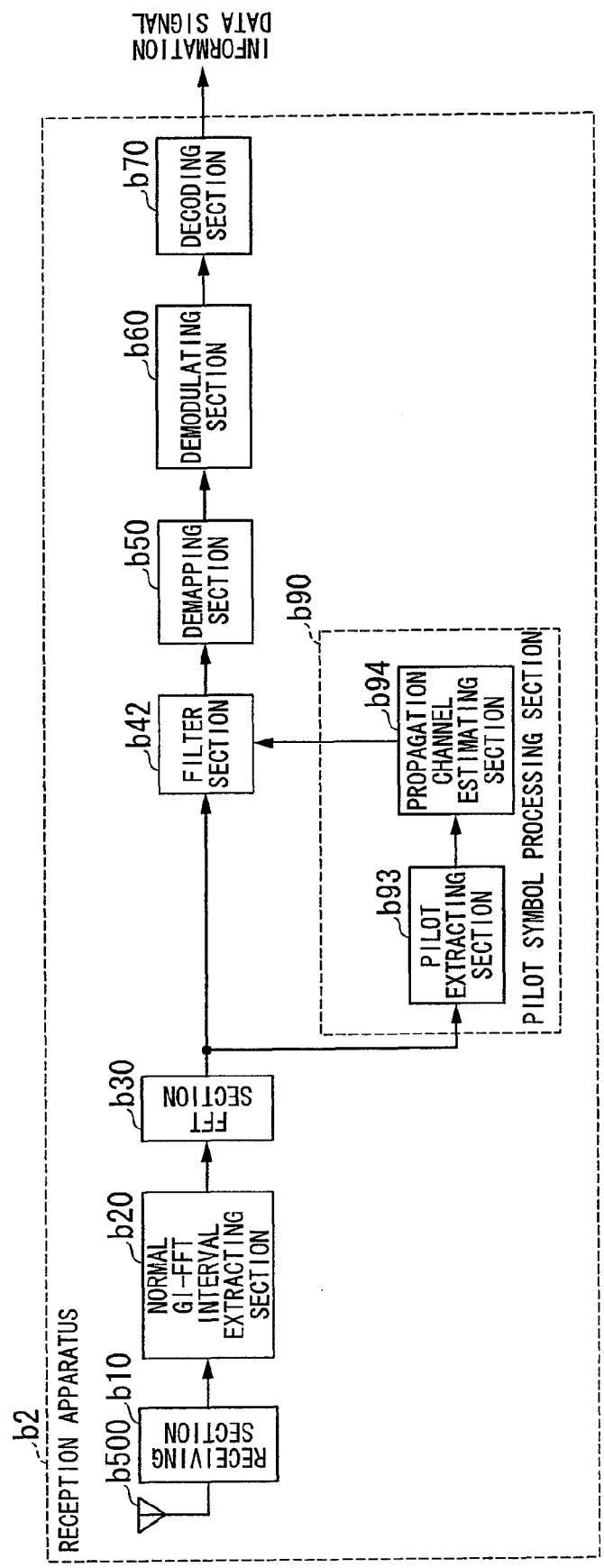
FIG. 23 is a schematic block diagram showing a configuration of a reception apparatus according to a fifth embodiment of the present invention.

Next, a reception apparatus according to the fifth embodiment will be described. FIG. 23 is a schematic block diagram showing a configuration of the reception apparatus according to the fifth embodiment of the present invention. In FIG. 23, a reception apparatus b2 includes a reception antenna b500, a receiving section b10, a normal GI-FFT interval extracting section b20, an FFT section b30, a filter section b42, a demapping section b50, a demodulating section b60, a decoding section b70, and a pilot symbol processing section b90.

In the configuration of the reception apparatus b2 of FIG. 23, a difference from the reception apparatus b1 according to the first embodiment shown in FIG. 10 is that the long GI-FFT interval extracting section b81 and the FFT section b82 of the pilot symbol processing section b80 of the reception apparatus b1 are omitted and a frequency domain signal from which a normal GI output from the FFT section b30 is removed is input to the pilot symbol processing section b90 of the reception apparatus b2. In FIG. 23, the reception antenna b500, the receiving section b10, the normal GI-FFT interval extracting section b20, the FFT section b30, the demapping section b50, the demodulating section b60, and the decoding section b70 of the reception apparatus b2 have the same functions as those of the first embodiment shown in FIG. 10.

The transmission apparatus according to the fifth embodiment is the same as the reception apparatus b1 shown in the first embodiment shown in FIG. 1.

A reception signal received by the reception apparatus b2 is a signal into which the normal GI information data symbol and the long GI pilot symbol as shown in FIG. 6 are multiplexed.

The reception signal received from the reception antenna b500 is subjected to processing such as frequency conversion and analog-digital conversion by the receiving section b10 like the processing described in the first embodiment. Thereafter, a normal GI is removed by the normal GI-FFT interval extracting section b20. Thereafter, a frequency domain signal FFT-processed by the FFT section b30 is output to the filter section b42 and the pilot symbol processing section b90.

In the reception apparatus b2, a function of removing a GI is performed by a configuration having only the normal GI-FFT interval extracting section b20, and only a normal GI is removed from a received OFDM symbol and FFT processing is performed. That is, FFT processing is also performed for a phase-controlled pilot symbol included in the GI of the long GI pilot symbol, for example, a second OFDM symbol shown in FIG. 6. Here, the FFT-processed phase-controlled pilot symbol can be used in propagation channel estimation by returning a phase rotated by phase control to the original. The propagation channel estimation using the second OFDM symbol can be effectively utilized in an environment of propagation that does not exceed the normal GI. Because the accuracy of propagation channel estimation is low due to ISI in an environment of propagation that exceeds the normal GI, it is necessary to determine whether or not to use it in the propagation environment.

The pilot symbol processing section b90 performs propagation channel estimation by a signal of a frequency and time to which a pilot symbol is mapped from a frequency domain signal input from the FFT section b30, and outputs a propagation channel estimation result to the filter section b42. Next, this point will be described in detail. The pilot symbol processing section b90 includes a pilot extracting section b93 and a propagation channel estimation section b94.

The pilot extracting section b93 extracts a scattered pilot symbol from a frequency domain signal from which a normal GI is removed, input from the FFT section b30 by performing the same processing described in the first embodiment, and outputs the extracted scattered pilot symbol to the propagation channel estimation section b94.

The propagation channel estimation section b94 estimates amplitude and phase changes of a transmission signal due to a propagation channel by multipath fading or the like as in the processing described in the first embodiment using a scattered pilot symbol extracted by the pilot extracting section b93 (propagation channel estimation), and outputs a propagation channel estimation result to the filter section b42. It is possible to use various methods such as well-known linear interpolation and FFT interpolation as a propagation channel estimation method for resource elements other than a resource element mapped to a scattered pilot symbol.

The frequency domain signal input to the pilot symbol processing section b90 is obtained by removing only a normal GI and performing FFT processing for a long GI like the normal GI. Thus, the pilot extracting section b93 within the pilot symbol processing section b90 performs propagation channel estimation processing using data of an effective symbol interval of the long GI pilot symbol, for example, an effective symbol interval of a third OFDM symbol of FIG. 6, without using the long GI FFT-processed like the normal GI.

According to the fifth embodiment of the present invention, when a frame is received in which a scattered pilot symbol is inserted into any subcarrier within the same OFDM symbol and a long GI longer than a normal GI is set in only the scattered pilot symbol, only the normal GI is removed without removing the long GI added to a received frame. Thereby, because a circuit scale of the reception apparatus is reduced and the resistance to ISI is improved, the reception apparatus can implement propagation channel estimation with high accuracy without substantially degrading the entire transmission efficiency of communication.

The reception apparatus b2 according to the fifth embodiment can also be applied to the reception apparatus according to the first to fourth embodiments.

Sixth Embodiment

Next, the case where MIMO is used as the sixth embodiment of the present invention will be described. A communication system according to the sixth embodiment includes a transmission apparatus and a reception apparatus.

Figure 24:
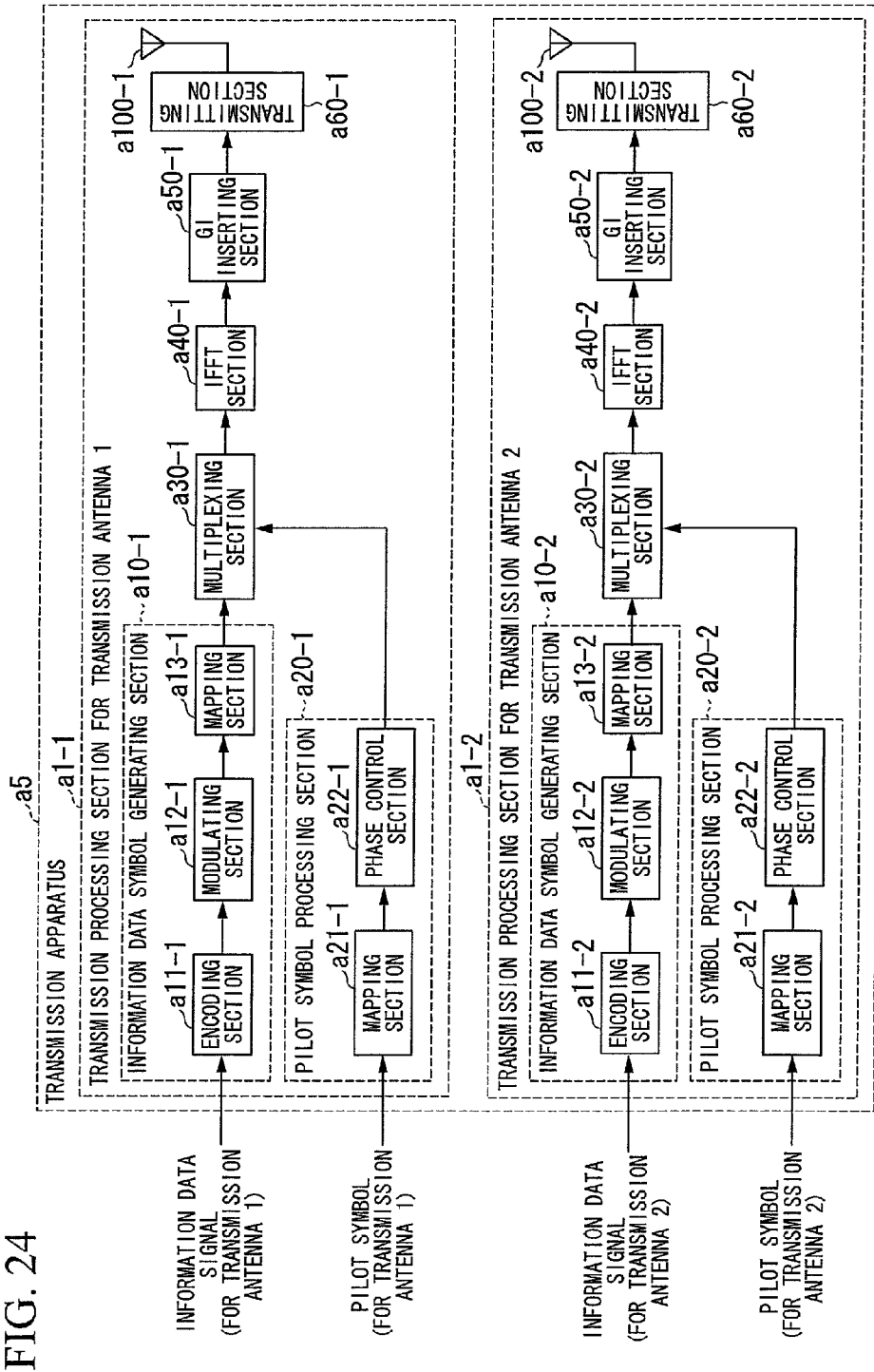
FIG. 24 is a schematic block diagram showing a configuration of a transmission apparatus according to a sixth embodiment of the present invention.

FIG. 24 is a schematic block diagram showing a configuration of the transmission apparatus according to the sixth embodiment. In FIG. 24, a transmission apparatus a5 includes a transmission processing section a1-1 for a transmission antenna 1 and a transmission processing section a1-2 for a transmission antenna 2. Each transmission processing section of FIG. 24 includes an information data symbol generating section a10, a pilot symbol processing section a20, a multiplexing section a30, an IFFT section a40, a GI inserting section a50, a transmitting section a60, and a transmission antenna a100. A numeral subsequent to the hyphen "-" after a reference numeral of each block of FIG. 24 is a corresponding transmission antenna number.

An information data signal and a pilot symbol are input from an upper layer processing apparatus (not shown) for the transmission apparatus a5 for each corresponding transmission antenna to each transmission processing section.

Figure 25:
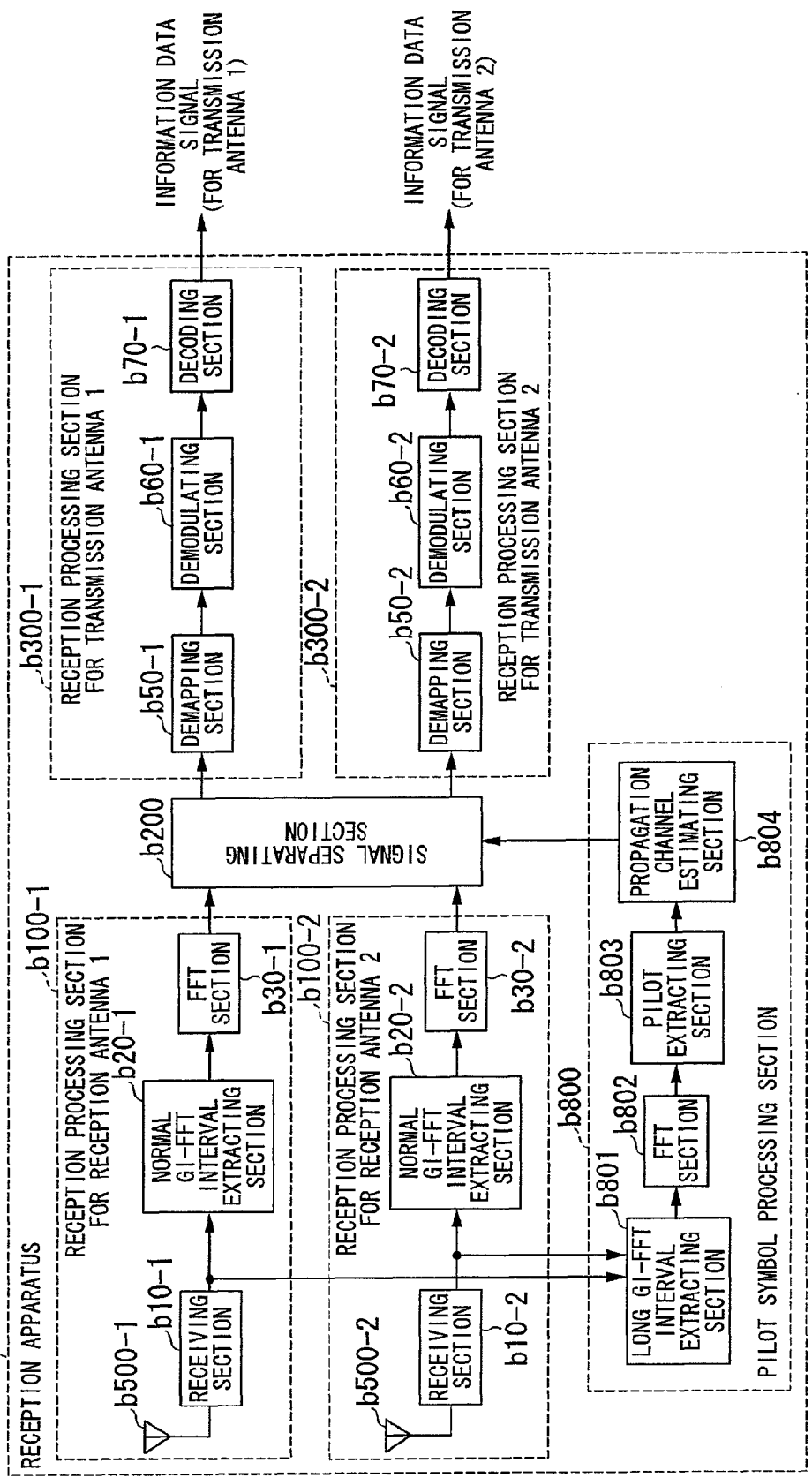
FIG. 25 is a schematic block diagram showing a configuration of a reception apparatus according to the sixth embodiment of the present invention.

FIG. 25 is a schematic block diagram showing a configuration of the reception apparatus according to the sixth embodiment. In FIG. 25, a reception apparatus b3 includes a reception processing section b100-1 for a reception antenna 1, a reception processing section b100-2 for a reception antenna 2, a signal separating section b200, a reception processing section b300-1 for a transmission antenna 1, a reception processing section b300-2 for a transmission antenna 2, and a pilot symbol processing section b800. The reception processing section b100-1 for the reception antenna 1 and the reception processing section b100-2 for the reception antenna 2 in FIG. 25 respectively include a reception antenna b500, a receiving section b10, a normal GI-FFT interval extracting section b20, and an FFT section b30. The pilot symbol processing section b800 estimates a propagation channel for each combination of the transmission antenna and the reception antenna, and the signal separating section b200 separates a signal of each reception antenna into a spatially multiplexed signal of each transmission antenna based on a propagation channel estimation result. The propagation channel estimation and signal separating processing will be described in detail later. The reception processing section b300-1 for the transmission antenna 1 and the reception processing section b300-2 for the transmission antenna 2 respectively include a demapping section b50, a demodulating section b60, and a decoding section b70. A numeral subsequent to the hyphen "-" after a reference numeral of each block of FIG. 25 is a corresponding reception antenna number.

Basic configurations of the transmission apparatus a5 and the reception apparatus b3 according to the sixth embodiment are the same as those of the transmission apparatus a1 shown in FIG. 1 in the first embodiment and the reception apparatus b1 shown in FIG. 10. However, because the sixth embodiment is a MIMO system using a plurality of transmission antennas and a plurality of reception antennas, a difference is that the transmission apparatus a1 shown in FIG. 1 and the reception apparatus b1 shown in FIG. 10 include a plurality of configurations shown in blocks according to the number of antennas of the MIMO system.

The block having the same reference numeral before the hyphen "-" of each block in FIGS. 24 and 25 has the same function as those of the first embodiment shown in FIGS. 1 and 10.

First, a transmission frame to be transmitted by the transmission apparatus a5 according to the sixth embodiment will be described.

Figure 26:
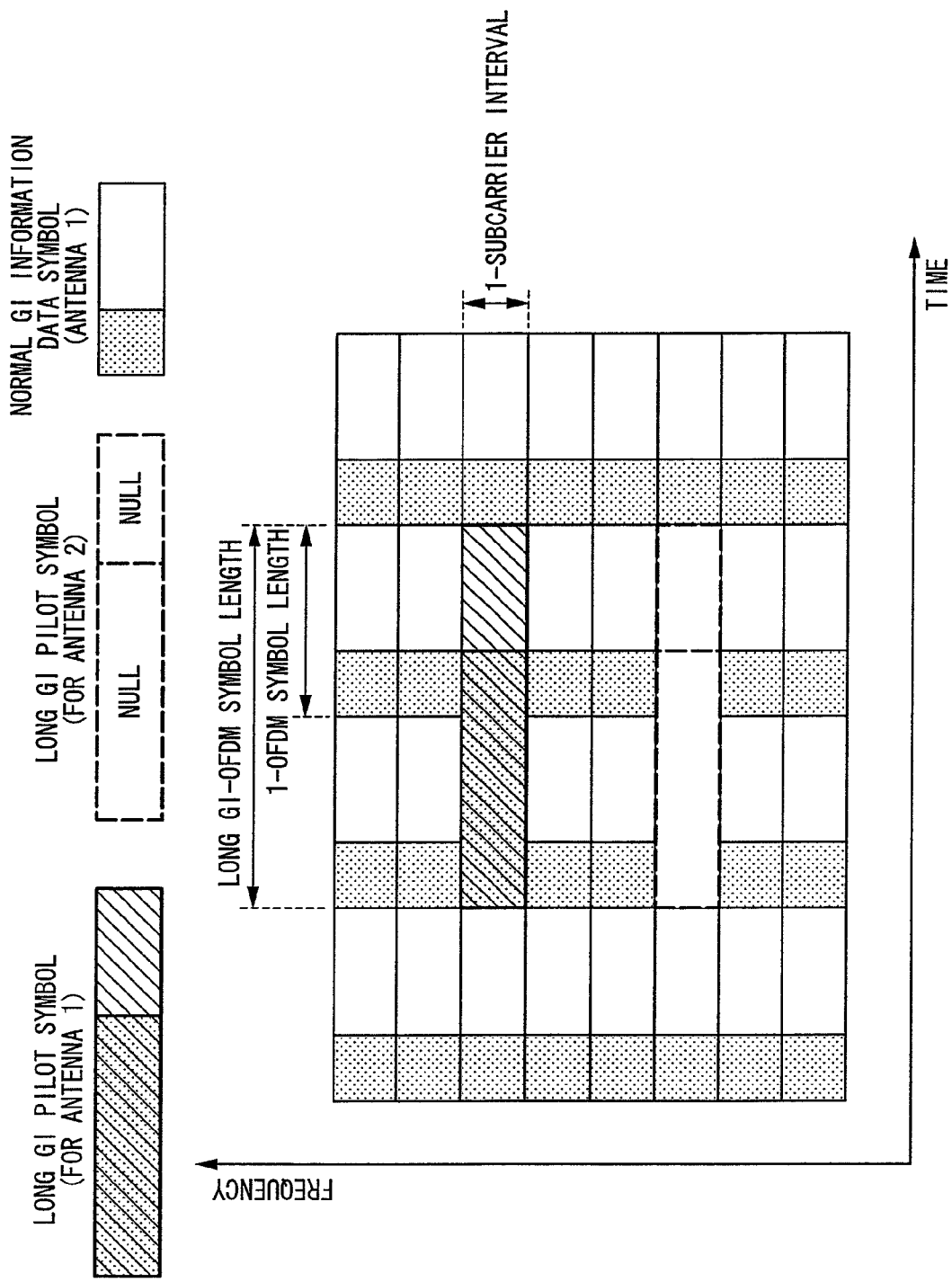
FIG. 26 is a diagram showing an example of a frame into which a pilot symbol of an antenna 1 is multiplexed in the sixth embodiment of the present invention.
Figure 27:
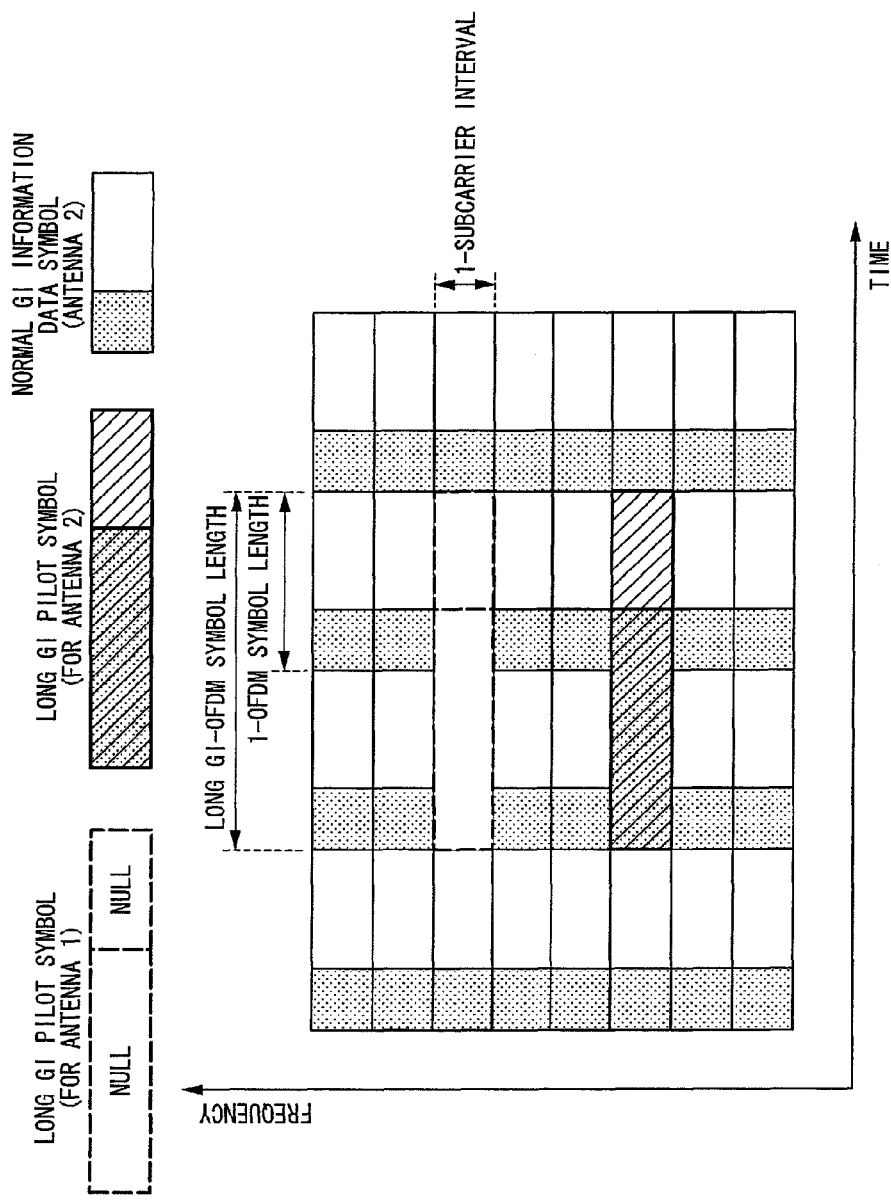
FIG. 27 is a diagram showing an example of a frame into which a pilot symbol of an antenna 2 is multiplexed in the sixth embodiment of the present invention.

FIG. 26 is a diagram showing an example of a frame into which a long GI pilot symbol generated by the transmission processing section a1-1 for the transmission antenna 1 is multiplexed by a frequency component and a time component. FIG. 27 is a diagram showing an example of a frame into which a long GI pilot symbol generated by the transmission processing section a1-2 for the transmission antenna 2 is multiplexed by a frequency component and a time component. In FIGS. 26 and 27, the horizontal axis represents time, the vertical axis represents frequency, one row represents a subcarrier, and one column represents an OFDM symbol.

As shown in FIG. 26, the transmission processing section a1-1 for the transmission antenna 1 maps a pilot symbol for the transmission antenna 1 to one resource element (sixth subcarrier) within resource elements for mapping two scattered pilot symbols. A resource element (third subcarrier) for mapping another scattered pilot symbol is set to zero (null) so that a pilot symbol for the transmission antenna 2 is mapped by the transmission processing section a1-2 for the transmission antenna 2.

On the other hand, as shown in FIG. 27, the transmission processing section a1-2 for the transmission antenna 2 maps a pilot symbol for the transmission antenna 2 to one resource element (third subcarrier) within resource elements for mapping two scattered pilot symbols. A resource element (sixth subcarrier) for mapping another scattered pilot symbol is set to zero (null) so that a pilot symbol for the transmission antenna 1 is mapped by the transmission processing section a1-1 for the transmission antenna 1.

As described in the first embodiment, it is possible to generate a long GI pilot symbol by phase-controlling a pilot symbol shown in FIGS. 26 and 27.

As described above, the transmission apparatus a5 transmits a frame in which scattered pilot symbols are mapped to be independent of each other for each transmission antenna by performing the same processing as described in the first embodiment. In the transmission apparatus a5, the respective transmission processing sections simultaneously transmit the respective frames.

The reception apparatus b3 receiving the frame can perform reception, which is not affected by mutual stream interference, because a normal GI information data symbol is spatially multiplexed, but a long GI pilot symbol is not spatially multiplexed.

Next, the processing of receiving a frame received by the reception apparatus b3 according to the sixth embodiment will be described.

Figure 28:
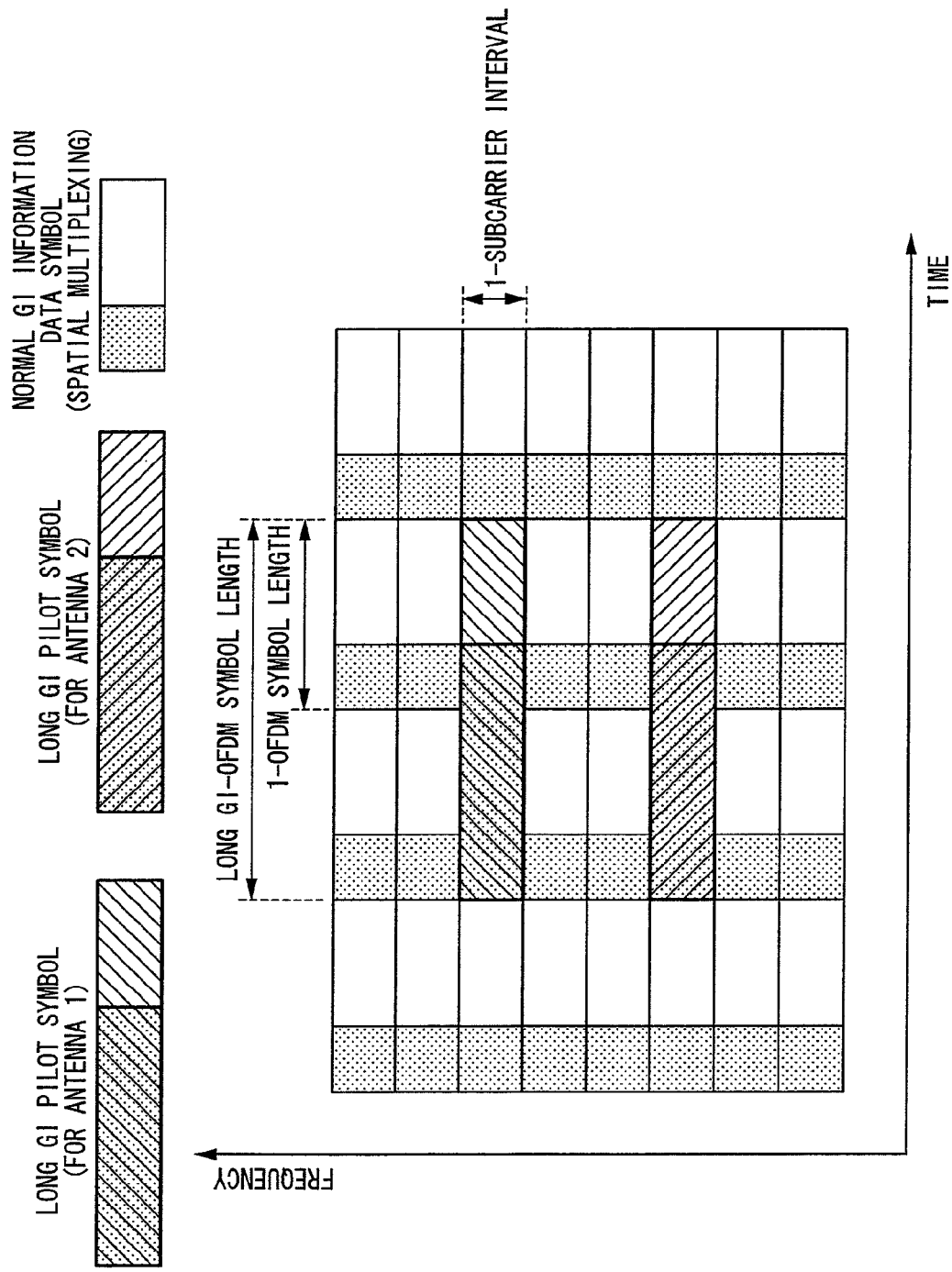
FIG. 28 is a diagram showing an example of a frame into which the pilot symbols of the antenna 1 and the antenna 2 to be received are multiplexed in the sixth embodiment of the present invention.

FIG. 28 is a diagram showing an example of a frame into which pilot symbols of the transmission antenna 1 and the transmission antenna 2 received by the reception apparatus b3 are multiplexed by a frequency component and a time component. In FIG. 28, the horizontal axis represents time, the vertical axis represents frequency, one row represents a subcarrier, and one column represents an OFDM symbol. Scattered pilot symbols are mapped to be independent of each other as shown in FIGS. 26 and 27, so that the reception apparatus b3 receives a frame as shown in FIG. 28. The processing of separating a spatially multiplexed signal is necessary because a normal GI information data symbol is spatially multiplexed, but the separation processing is not necessary because a long GI pilot symbol is not spatially multiplexed, so that a propagation channel can be estimated with high accuracy.

The reception processing section b100-1 for the reception antenna 1 and the reception processing section b100-2 for the reception antenna 2 respectively perform processing by the receiving section b10, the normal GI-FFT interval extracting section b20, and the FFT section b30 for reception signals of the respective reception antennas as in the processing described in the first embodiment, and output frequency domain signals of the respective reception antennas to the signal separating section b200.

The pilot symbol processing section b800 estimates a propagation channel by performing the same processing as described in the first embodiment for each combination of the transmission antenna and the reception antenna, and outputs a propagation channel estimation result to the signal separating section b200. The pilot symbol processing section b800 includes a long GI-FFT interval extracting section b801, an FFT section b802, a pilot extracting section b803, and a propagation channel estimating section b804. They have the same functions as the long GI-FFT interval extracting section b81, the FFT section b82, the pilot extracting section b83, and the propagation channel estimating section b84 described in the first embodiment, except that each received baseband signal from the receiving section b10 corresponding to each reception antenna is input as an input of the long GI-FFT interval extracting section b801.

The signal separating section b200 separates a frequency domain signal of each reception antenna input from the FFT sections b30 of the reception processing section b100-1 for the reception antenna 1 and the reception processing section b100-2 for the reception antenna 2 into a spatially multiplexed frequency domain signal propagation channel-compensated for each transmission antenna based on a propagation channel estimation value (propagation channel estimation result) of each reception antenna estimated by the propagation channel estimating section b804 of the pilot symbol processing section b800, and outputs the frequency domain signal for each transmission antenna to the reception processing section b300-1 for the transmission antenna 1 and the reception processing section b300-2 for the transmission antenna 2. At this time, for example, various signal separation methods such as a ZF criterion, an MMSE criterion, and a maximum likelihood (ML) criterion can be applied as a signal separation method for a spatially multiplexed frequency domain signal, but the present invention is not limited thereto.

For each transmission antenna, the reception processing section b300-1 for the transmission antenna 1 and the reception processing section b300-2 for the transmission antenna 2 perform the same processing as described in the first embodiment for a frequency domain signal propagation channel-compensated for each transmission antenna signal-separated by the signal separating section b200 by the demapping section b50, the demodulation section b60 and the decoding section b70, and output an information data signal (reception data) for each transmission antenna to the upper layer processing apparatus (not shown) for the reception apparatus b3.

In the communication system using the spatial multiplexing technology (MIMO) according to the sixth embodiment of the present invention as described above, a scattered pilot symbol to be mutually independent for each transmission antenna is inserted into any subcarrier within the same OFDM symbol and a long GI longer than a normal GI is set for only the scattered pilot symbol. Thereby, the reception apparatus can estimate a propagation channel with high accuracy without substantially degrading the entire transmission efficiency of communication because the resistance to ISI is improved in an environment where an arrival wave exceeding the normal GI due to a propagation channel arrives.

The case where two transmission antennas of the transmission apparatus a5 and two reception antennas of the reception apparatus b3 are provided has been described in the sixth embodiment, but the present invention is not limited thereto. The case where either or both of the number of transmission antennas provided in the transmission apparatus a5 and the number of reception antennas provided in the reception apparatus b3 exceed two can also be applied. The case where the number of transmission antennas provided in the transmission apparatus a5 and the number of reception antennas provided in the reception apparatus b3 are different from each other can also be applied.

An example in which the transmission processing section a1-1 for the transmission antenna 1 and the transmission processing section a1-2 for the transmission antenna 2 mutually perform error-correction coding processing and modulation processing for information data signals of transmission antennas respectively input from the upper layer processing apparatus (not shown) for the transmission apparatus a5 has been described in the sixth embodiment, but the present invention is not limited thereto.

For example, a signal for which error-correction coding processing and modulation processing are performed can be input from the upper layer processing apparatus (not shown) for the transmission apparatus a5 to the transmission processing section for each transmission antenna.

An example in which the reception processing section b300-1 for the transmission antenna 1 and the reception processing section b300-2 for the transmission antenna 2 mutually perform demodulation processing and decoding processing for received signals and output processing results to the upper layer processing apparatus (not shown) for the reception apparatus b3 has been described in the sixth embodiment, but the present invention is not limited thereto. For example, the demodulation processing and the decoding processing for the received signals can be integrated and performed in one place or an information data signal after demapping can be output to the upper layer processing apparatus (not shown) for the reception apparatus b3.

The transmission apparatus a5 and the reception apparatus b3 according to the sixth embodiment can also be applied to the transmission apparatus and the reception apparatus according to the first to fifth embodiments.

The case where the long GI is added to all input pilot symbols has been described in the sixth embodiment, but the present invention is not limited thereto. For example, the long GI can be added to some pilot symbols and the normal GI can be added to other pilot symbols. It is possible to add the long GI to pilot symbols for some transmission antennas and add the normal GI to pilot symbols for other transmission antennas. In this case, a high effect is obtained if the long GI is added to a pilot symbol for a transmission antenna that transmits an information data signal and a control symbol having high importance.

According to the embodiment of the present invention as described above, the reception apparatus can perform propagation channel estimation or signal recovery with high accuracy without substantially degrading the entire transmission efficiency of communication because the resistance to ISI is improved by setting a long GI longer than a normal GI to either or both of a pilot symbol of any subcarrier within the same OFDM symbol and a control signal in an environment where an arrival wave exceeding the normal GI due to a propagation channel arrives.

A configuration of generating an OFDM symbol by superimposing (multiplexing), for example, a mapped information data symbol, a mapped pilot symbol, and a phase-controlled pilot symbol, in the frequency domain and adding a GI having a predetermined length after IFFT processing a multiplexed symbol has been described in the embodiment of the present invention, but the present invention is not limited thereto.

For example, it is possible to generate a normal GI-OFDM symbol by adding the normal GI to some symbols, generate a long GI-OFDM symbol by adding the long GI to other symbols, and superimpose (multiplex) the respectively generated normal GI-OFDM symbol and long GI-OFDM symbol in the time domain.

Seventh Embodiment

A form of adding a GI to a symbol to which the long GI is added after a phase-controlled symbol is mapped to a previous resource element in the time direction and the symbol to which the long GI is added and a symbol to which the normal GI is added are multiplexed has been described in the first to sixth embodiments. In the following seventh to twelfth embodiments, a long GI and a normal GI are separately generated and multiplexed and a signal in which a long GI symbol and a normal GI symbol are scattered among a plurality of subcarriers at the same time is generated as in the first to sixth embodiments.

Figure 29:
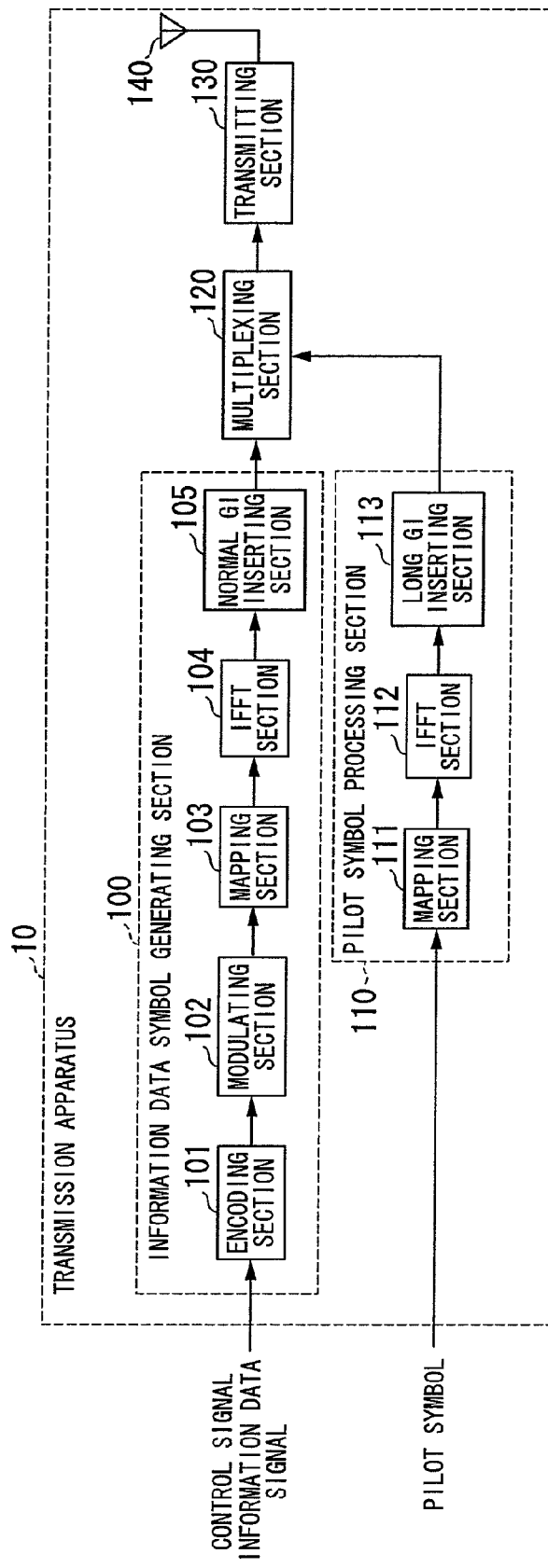
FIG. 29 is a schematic block diagram showing a configuration of a transmission apparatus according to a seventh embodiment of the present invention.

Hereinafter, the seventh embodiment of the present invention will be described with reference to the drawings. A wireless communication system of the embodiment includes a transmission apparatus 10 and a reception apparatus 20 that perform communication in an OFDM scheme. FIG. 29 is a schematic block diagram showing a configuration of the transmission apparatus according to the embodiment.

The transmission apparatus 10 includes an information data symbol generating section 100 (also referred to as a first multicarrier symbol generating section), a pilot symbol processing section 110 (also referred to as a second multicarrier symbol generating section), a multiplexing section 120, a transmitting section 130, and a transmission antenna 140. The information data symbol generating section 100 includes an encoding section 101, a modulating section 102, a mapping section 103, an IFFT section 104, and a normal GI inserting section 105. The pilot symbol generating section 110 includes a mapping section 111, an IFFT section 112, and a long GI inserting section 113.

An information data signal, which is a bit stream signal of data (information) to be transmitted from the transmission apparatus 10 to the reception apparatus 20, and a control signal for transmitting the information data signal are first input to the information data symbol generating section 100. In the information data symbol generating section 100, the encoding section 101 performs error-correction coding based on a convolutional code, a turbo code, or the like for the input information data signal and control signal. The modulating section 102 performs modulation in which the error-correction coded information data signal and control signal are allocated to an information data symbol and a control symbol by a modulation scheme such as QPSK or QAM. The mapping section 103 maps (arranges) the information data symbol and the control symbol modulated by the modulating section 102 to resource elements other than a position (resource element) into which a pilot symbol, which is a signal to be used in propagation channel estimation in a receiver, is inserted. Here, the resource element is a region including a frequency and a time having predetermined widths, and is a region to which one modulation symbol is mapped. A resource element for mapping the information data symbol, a resource element for mapping the control symbol, and a resource element for mapping the pilot symbol are preset so that they do not overlap each other.

Here, the control signal includes information to be used in communication control necessary to transmit/receive a plurality of information data signals, for example, such as a modulation scheme to be used in an information data signal, a mapping method (resource allocation method), error-correction coding information (for example, a coding method, a coding rate, and a puncturing pattern), an interleaving method, a scrambling method, HARQ control information (for example, packet reception notification information (an ACK), non-packet-reception notification information (an NACK), the number of retransmissions, or the like), a synchronization signal, MIMO control information (for example, the number of layers (the number of streams) or a precoding method), base station information, terminal information, format information of control information, format information of data information, feedback information (for example, a CQI or the like), and transmission power control information, but the present invention is not limited thereto.

Figure 30:
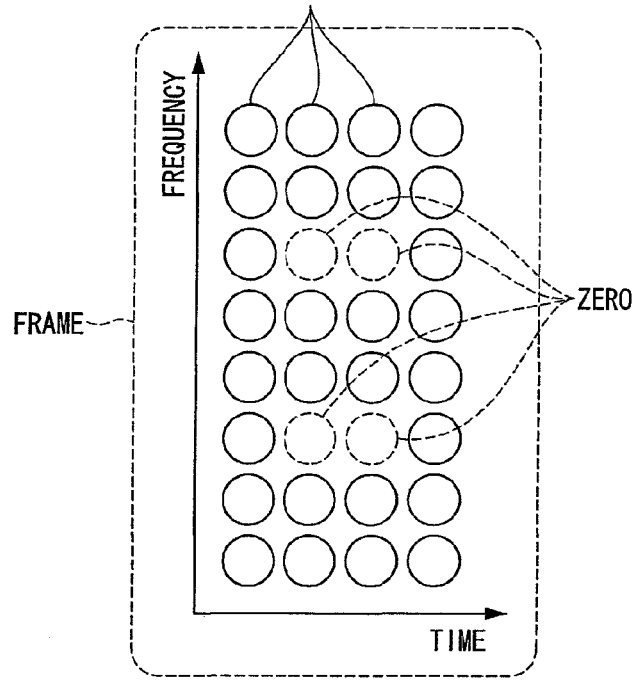
FIG. 30 is a diagram showing an example of an arrangement of symbols of an information data signal and a control signal directed to a frame by a mapping section 103 according to the same embodiment.

FIG. 30 is a diagram showing an example of an arrangement of an information data symbol and a control symbol directed to a frame by the mapping section 103. The example shown in FIG. 30 shows the case where pilot symbols are respectively arranged in third and sixth subcarriers from a low frequency direction in two second and third OFDM symbols in a frame constituted by four OFDM symbols and eight subcarriers. Thus, the mapping section 103 arranges modulated information data symbols and control symbols in all OFDM symbols of first, second, fourth, fifth, seventh, and eighth subcarriers and first and fourth OFDM symbols of the third and sixth subcarriers as shown in FIG. 30. That is, they are arranged in all positions where no pilot symbol is arranged. The mapping section 103 arranges zero (null) in positions into which the pilot symbols are inserted.

Returning to FIG. 29, the IFFT section 104 performs IFFT processing for the information data symbol and the control symbol mapped by the mapping section 103, which are frequency domain signals, and performs a transform from the frequency domain signals into time domain signals. The normal GI inserting section 105 adds a normal GI (first GI), which is a GI having a normal length as a predetermined length, to the time domain signal. That is, the normal GI inserting section 105 generates a time domain signal of a normal GI-OFDM symbol including an information data symbol and a control symbol to which the normal GI is added.

On the other hand, a pilot symbol, which is a known signal to be used in propagation channel estimation in the reception apparatus 20, is input to the pilot symbol processing section 110. Here, like the information data signal and the control signal, a pilot signal, which is a bit stream, may be input to the pilot symbol processing section 110 in terms of the pilot symbol. The pilot symbol processing section 110 may modulate the input pilot signal by a modulation scheme such as QPSK or QAM.

In the pilot symbol processing section 110, first, the mapping section 111 maps input pilot symbols as scattered pilot symbols so that they are scattered in the frequency direction and the time direction.

Figure 31:
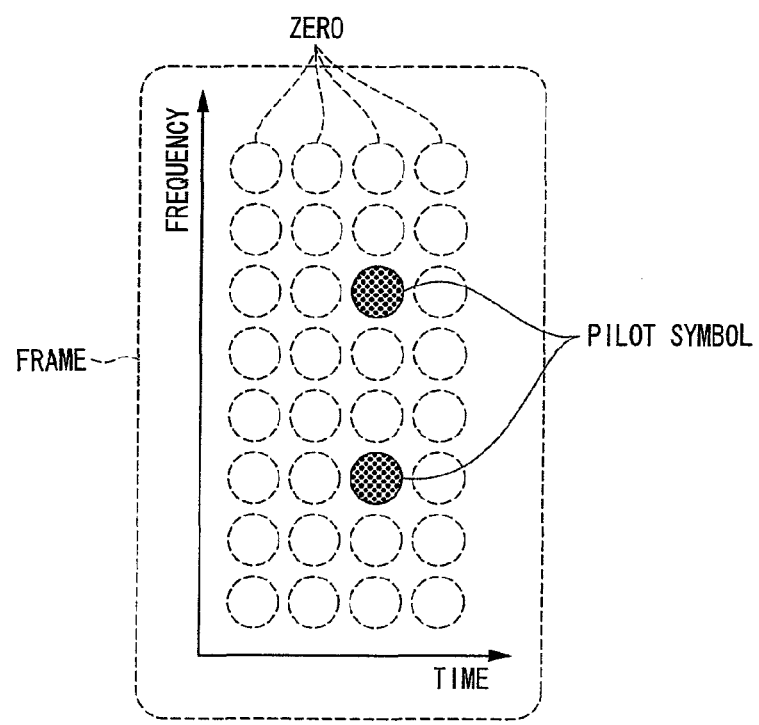
FIG. 31 is a diagram showing an example of an arrangement of a symbol of a pilot signal directed to a frame by a mapping section 111 according to the same embodiment.

FIG. 31 is a diagram showing an example of an arrangement of pilot symbols directed to a frame by the mapping section 111 for mapping information data symbols and control symbols shown in FIG. 30. The example of FIG. 31 shows the case where one pilot symbol to which a GI (a long GI to be described later) is added is set using two OFDM symbols in a frame constituted by four OFDM symbols and eight subcarriers. In this example, the pilot symbols are mapped to a third OFDM symbol of third and sixth subcarriers, and a previous second OFDM symbol is designated as zero (null). As will be described later, this is because a previous resource element in the time direction from a resource element in which the pilot symbol is arranged by the mapping section 111 becomes a long GI of a pilot symbol.

Returning to FIG. 29, the IFFT section 112 performs IFFT processing for a pilot symbol mapped by the mapping section 111, which is a frequency domain signal, and performs transformation from the frequency domain signal into a time domain signal. The long GI inserting section 113 adds the long GI, which has a predetermined length and is longer than the normal GI added by the normal GI inserting section 105, to the time domain signal generated by the IFFT section 112. That is, the long GI inserting section 113 generates a time domain signal of a long GI-OFDM symbol including the pilot symbol to which the long GI longer than the normal GI is added. In the length of the long GI, a length of the pilot symbol is further added to twice the normal GI as will be described later.

As described above, the information data symbol generating section 100 generates a normal GI-OFDM symbol by adding the normal GI to the input information data signal and control signal symbols, and the pilot symbol generating section 110 generates a long GI-OFDM symbol by adding the long GI to the input pilot symbol.

The multiplexing section 120 multiplexes the normal GI-OFDM symbol, which is generated by the information data symbol generating section 100 and includes the information data symbol and the control symbol to which the normal GI is added (a normal GI information data symbol and a normal GI control symbol), and the long GI-OFDM symbol, which is generated by the pilot symbol generating section 110 and includes the pilot symbol to which the long GI is added (a long GI pilot symbol), in the time domain. Here, time-domain multiplexing by the multiplexing section 120 is to add a sampling value of each time position of a time domain signal of the normal GI-OFDM symbol generated by the information data symbol generating section 100 to a sampling value of each time position of the time domain signal of the long GI-OFDM symbol generated by the pilot symbol generating section 110, so that the information data symbol and the control symbol to which the normal GI is added and the pilot symbol to which the long GI is added are frequency-multiplexed. In a frequency-multiplexed signal, a subcarrier in which a symbol is arranged in the normal GI-OFDM symbol and a subcarrier in which a symbol is arranged in the long GI-OFDM symbol are scattered among a plurality of subcarriers constituting a multicarrier at the same time.

Figure 32:
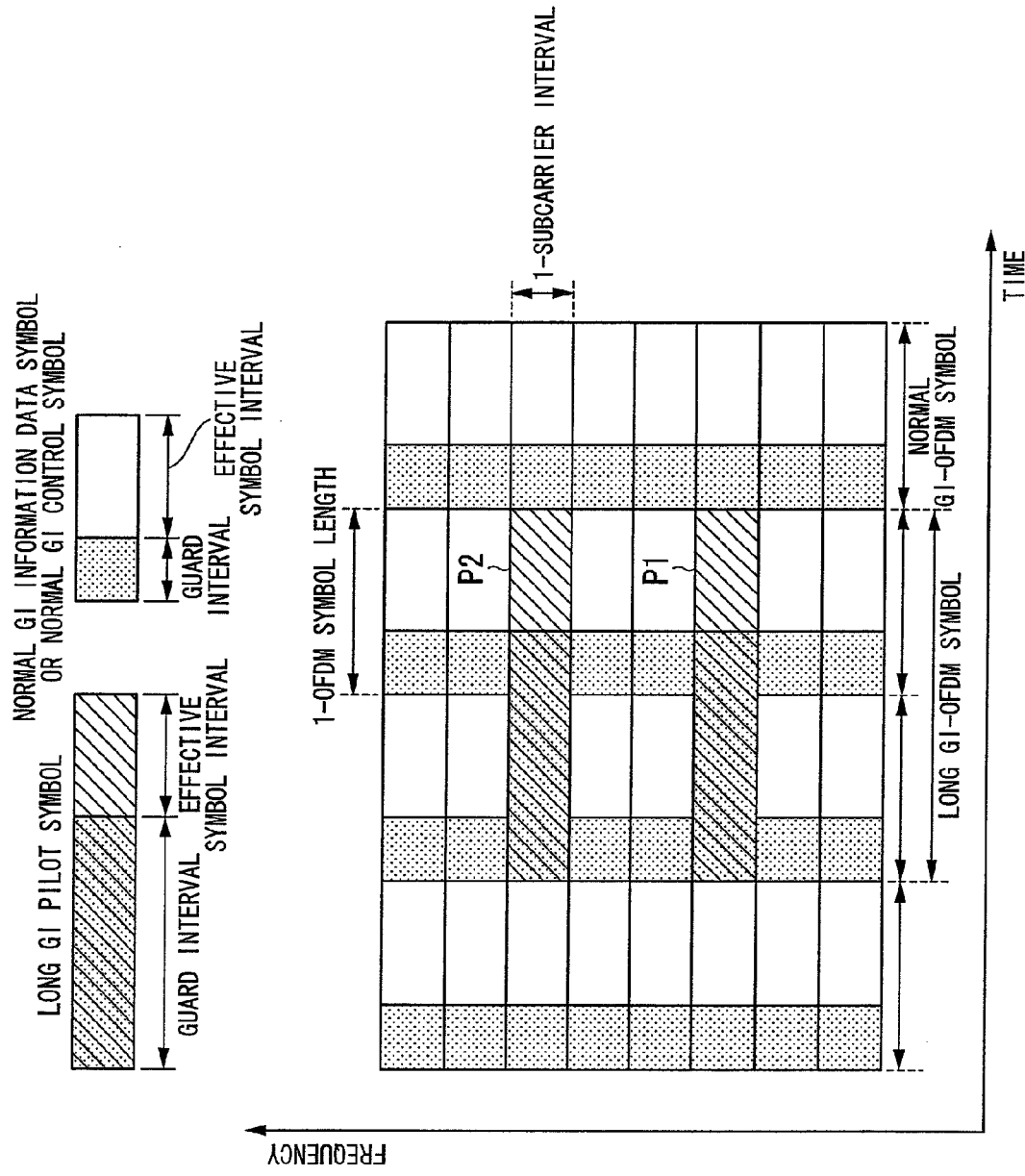
FIG. 32 is a diagram showing an example of a frequency component and a time component of signals multiplexed by a multiplexing section 120 according to the same embodiment.

FIG. 32 is a diagram showing an example of a frequency component and a time component of signals multiplexed by the multiplexing section 120 in the examples as shown in FIGS. 30 and 31. The example of FIG. 32 shows a frame constituted by four OFDM symbols and eight subcarriers. In FIG. 32, rectangles P1 and P2 hatched by oblique lines indicate resource elements in which long GI pilot symbols are arranged. A rectangle not hatched by oblique lines indicates a resource element in which a normal GI information data symbol or a normal GI control symbol is arranged. Among rectangles indicating resource elements in which the long GI pilot symbol, the normal GI information data symbol, and the normal GI control symbol are respectively arranged, a shaded hatched part indicates a GI and a white part indicates an effective symbol interval. Here, a signal into which a long GI and a symbol to which the long GI is added are multiplexed within an interval in which the long GI and the symbol are combined in which the long GI pilot symbol is arranged is referred to as a long GI-OFDM symbol. Here, a signal into which a normal GI and a symbol to which the normal GI is added are multiplexed within an interval in which the normal GI and the symbol are combined in which the normal GI information data symbol or the normal GI control symbol is arranged is referred to as a normal GI-OFDM symbol. The interval corresponding to the normal GI-OFDM symbol of the frame is also simply referred to as an OFDM symbol, and a length of the OFDM symbol is referred to as an OFDM symbol length.

The long GI pilot symbols are arranged in regions P1 and P2, that is, regions of second and third OFDM symbols for third and sixth subcarriers from a low frequency direction, and their effective symbol intervals are consistent with the other signals arranged in the third OFDM symbol. That is, because each long GI pilot symbol uses two OFDM symbols, its GI (long GI) is a length in which a normal GI is added to one OFDM symbol, and is significantly long as compared with the normal GI. An effective symbol interval of each of the long GI-OFDM symbols is consistent with an effective symbol interval of any normal GI-OFDM symbol in the time direction. Here, in the third OFDM symbol, the effective symbol interval of the long GI pilot symbol (a rectangle hatched by oblique lines in the white space) is consistent with the effective symbol intervals of the normal GI information data symbol and the normal GI control symbol (white rectangles) in the time direction (and misalignment is absent). Thus, the reception apparatus 20 can separate the pilot symbol, the information data symbol, and the control symbol by setting an FFT interval and performing FFT processing as in the related art.

Returning to FIG. 29, the transmitting section 130 performs conversion from a digital signal into an analog signal, frequency conversion from a baseband frequency into a radio frequency, and the like for signals multiplexed by the multiplexing section 120, and transmits a conversion result from the transmission antenna 140 to the reception apparatus 20.

Figure 33:
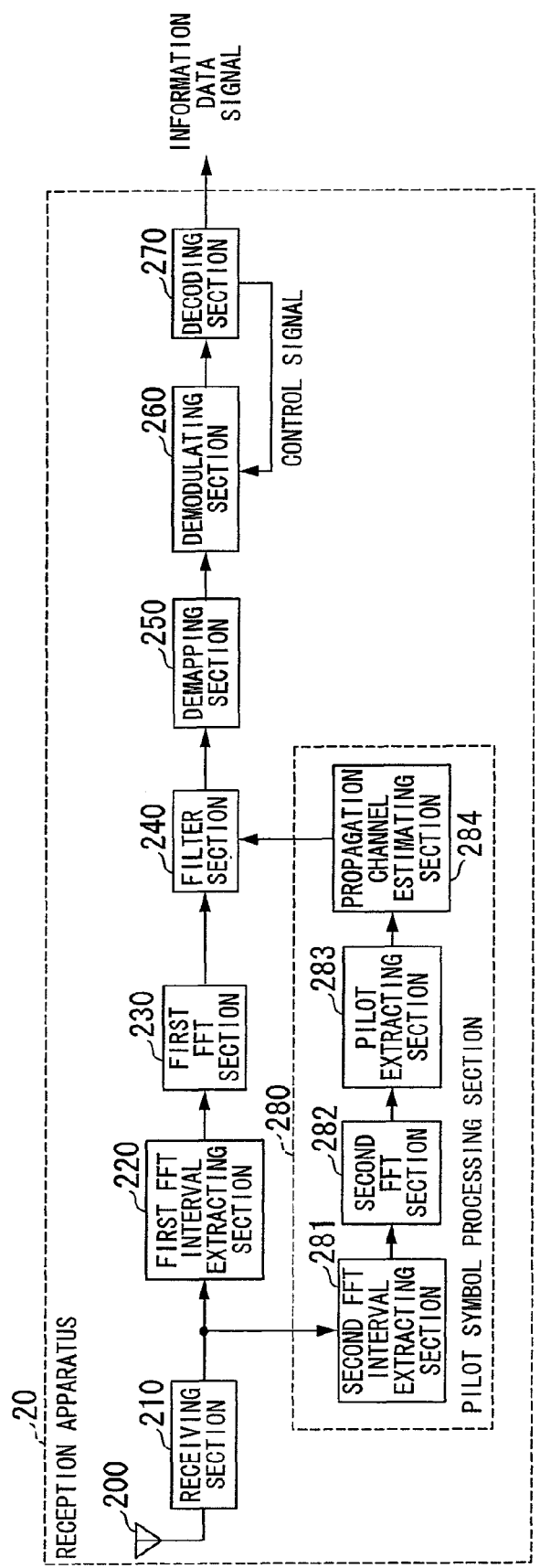
FIG. 33 is a schematic block diagram showing a configuration of a reception apparatus 20 according to the same embodiment.

FIG. 33 is a schematic block diagram showing a configuration of the reception apparatus 20 according to the embodiment. The reception apparatus 20 includes a reception antenna 200, a receiving section 210, a first FFT interval extracting section 220, a first FFT section 230, a filter section 240, a demapping section 250, a demodulating section 260, a decoding section 270, and a pilot symbol processing section 280. The pilot symbol processing section 280 includes a second FFT interval extracting section 281, a second FFT section 282, a pilot extracting section (symbol extracting section) 283, and a propagation channel estimating section 284.

The receiving section 210 performs processing such as frequency conversion from a radio frequency into a baseband frequency, conversion from an analog signal into a digital signal, and the like for a reception signal received from the reception antenna 200, and outputs a baseband signal of its processing result. The baseband signal output by the receiving section 210 is input to the first FFT interval extracting section 220 for recovering an information data signal and a control signal and the second FFT interval extracting section 281 of the pilot symbol processing section 280 for performing propagation channel estimation by a pilot signal, respectively.

Figure 34:
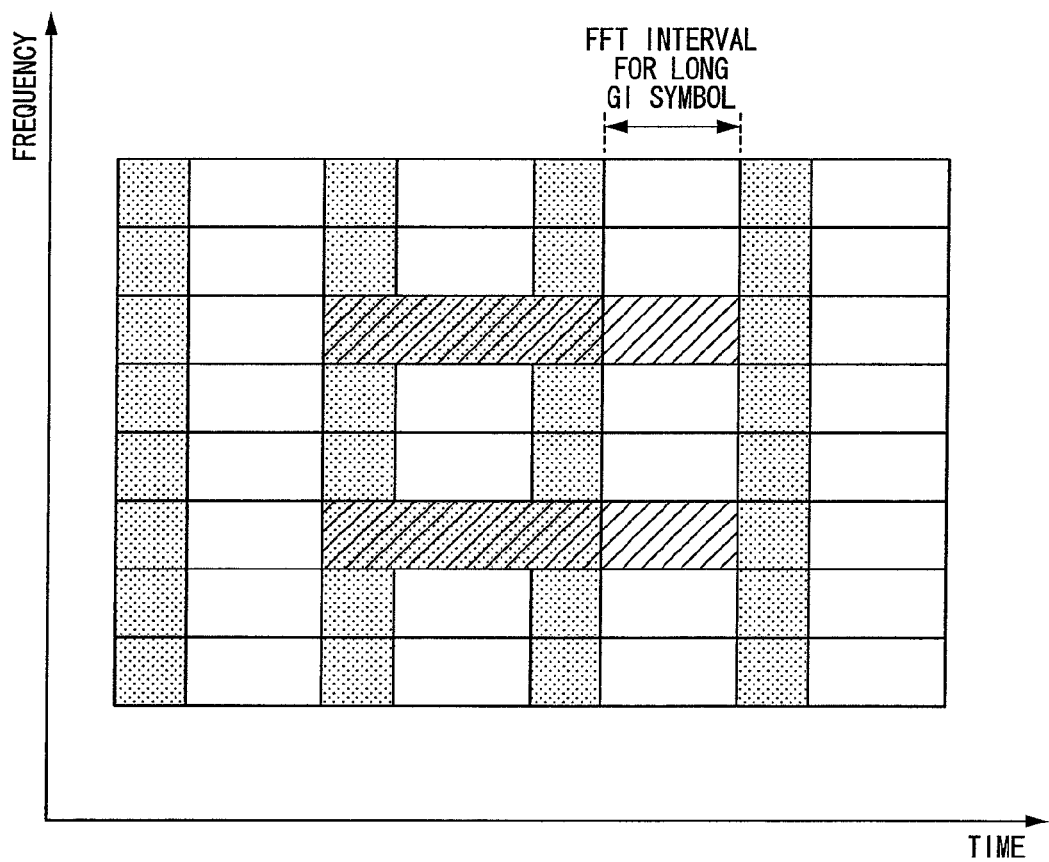
FIG. 34 is a diagram showing an example of an FFT interval for a long GI pilot symbol according to the same embodiment.

First, processing to be performed by the pilot symbol processing section 280 will be described. From the signal output by the receiving section 210, the second FFT interval extracting section 281 extracts a signal of an effective symbol interval having a predetermined length from the end of the long GI added to the pilot symbol as an FFT interval signal serving as a target of a Fourier transform by the second FFT section 282. FIG. 34 shows an FFT interval for a long GI pilot symbol of the frame shown in FIG. 32 as an example. The second FFT interval extracting section 281 extracts its FFT interval, that is, removes an interval other than the FFT interval. The second FFT section 282 performs FFT processing for the FFT interval extracted by the second FFT extracting section 281, and performs conversion from a time domain signal into a frequency domain signal. Thereby, the second FFT section 282 obtains a reception signal of a symbol included in a long GI-OFDM symbol.

The pilot extracting section 283 extracts an effective symbol interval of the long GI-OFDM symbol and a subcarrier signal in which a pilot symbol is arranged as a received pilot symbol, from the frequency domain signal, which is a result of conversion by the second FFT section 282. The propagation channel estimating section 284 estimates amplitude and phase changes due to fading or the like by comparing waveforms (phases and amplitudes) of a received pilot symbol and a known pilot symbol, and outputs an estimation result to the filter section 240. At this time, as a method of estimating a propagation channel for a resource element other than a resource element to which a pilot symbol is mapped, well-known methods such as linear interpolation and FFT interpolation can be used with a propagation channel estimation result for the resource element to which the pilot symbol is mapped.

Figure 35:
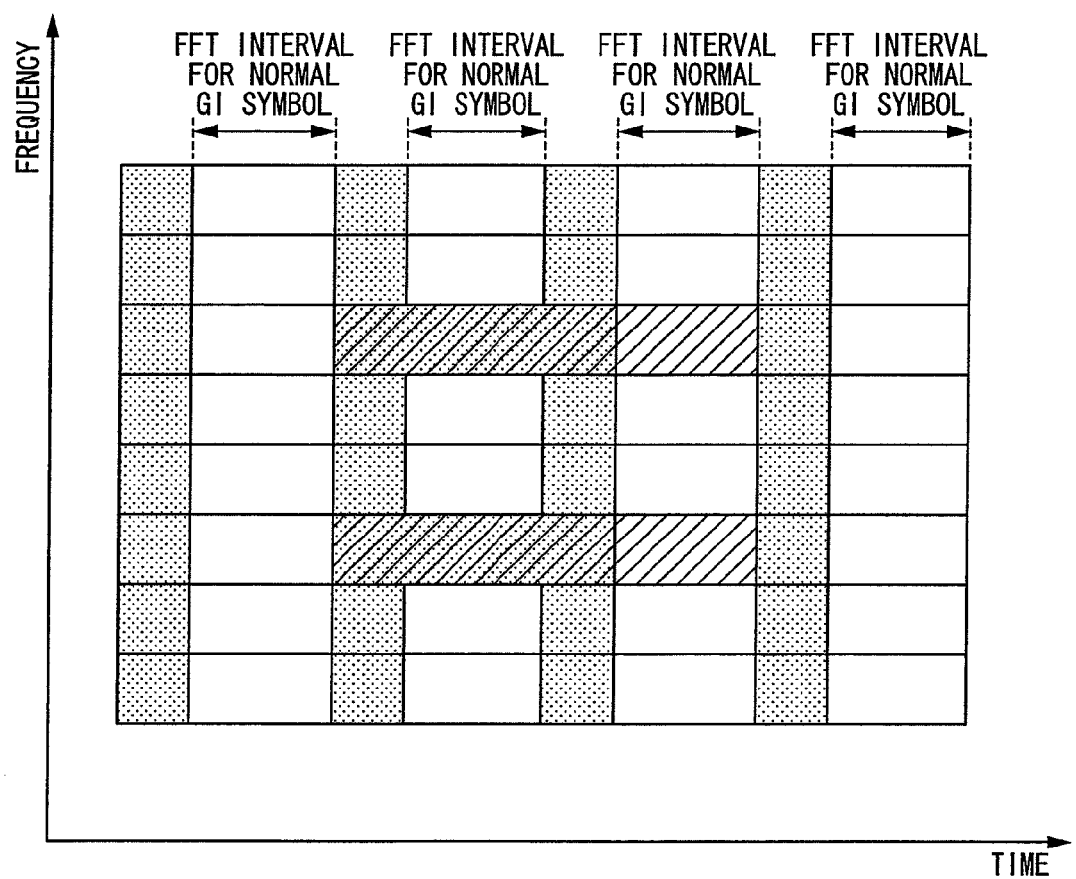
FIG. 35 is a diagram showing an example of an FFT interval for a normal GI information data symbol and a normal GI control symbol according to the same embodiment.

On the other hand, the first FFT interval extracting section 220 extracts a signal of an effective symbol interval, which has a predetermined length from the end of a normal GI added to the information data symbol and the control symbol, as a signal of an FFT interval serving as a target of a Fourier transform by the first FFT section 230 from the signal output by the receiving section 210. The FFT interval is consistent with the effective symbol interval of a signal transmitted by the transmission apparatus 100. FIG. 35 shows the FFT interval for the normal GI information data symbol and the normal GI control symbol in the frame shown in FIG. 32 as an example. The first FFT interval extracting section 220 removes an interval other than the FFT interval. The first FFT section 230 performs an FFT for the FFT interval extracted by the first FFT interval extracting section 220, and performs conversion from a time domain signal into a frequency domain signal. Thereby, the first FFT section 230 obtains a reception signal of a symbol included in the normal GI-OFDM symbol.

The filter section 240 compensates for signal amplitude and phase changes by calculating a weight coefficient using a ZF criterion, an MMSE criterion, or the like based on a propagation channel estimation value estimated by the propagation channel estimating section 284 and multiplying the frequency domain signal, which is a result of transform by the first FFT section 230, by the weight coefficient (propagation channel compensation).

Figure 36:
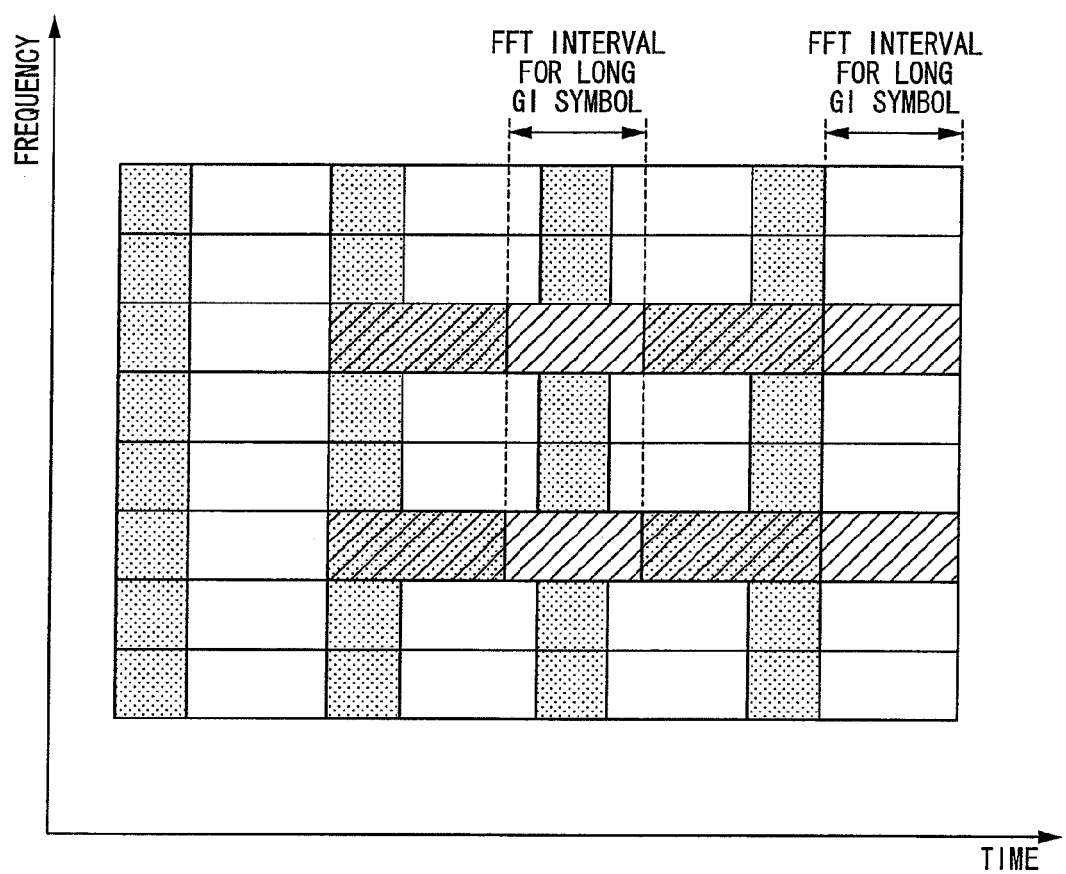
FIG. 36 is a diagram showing another example of an FFT interval for a long GI pilot symbol according to the same embodiment.
Figure 37:
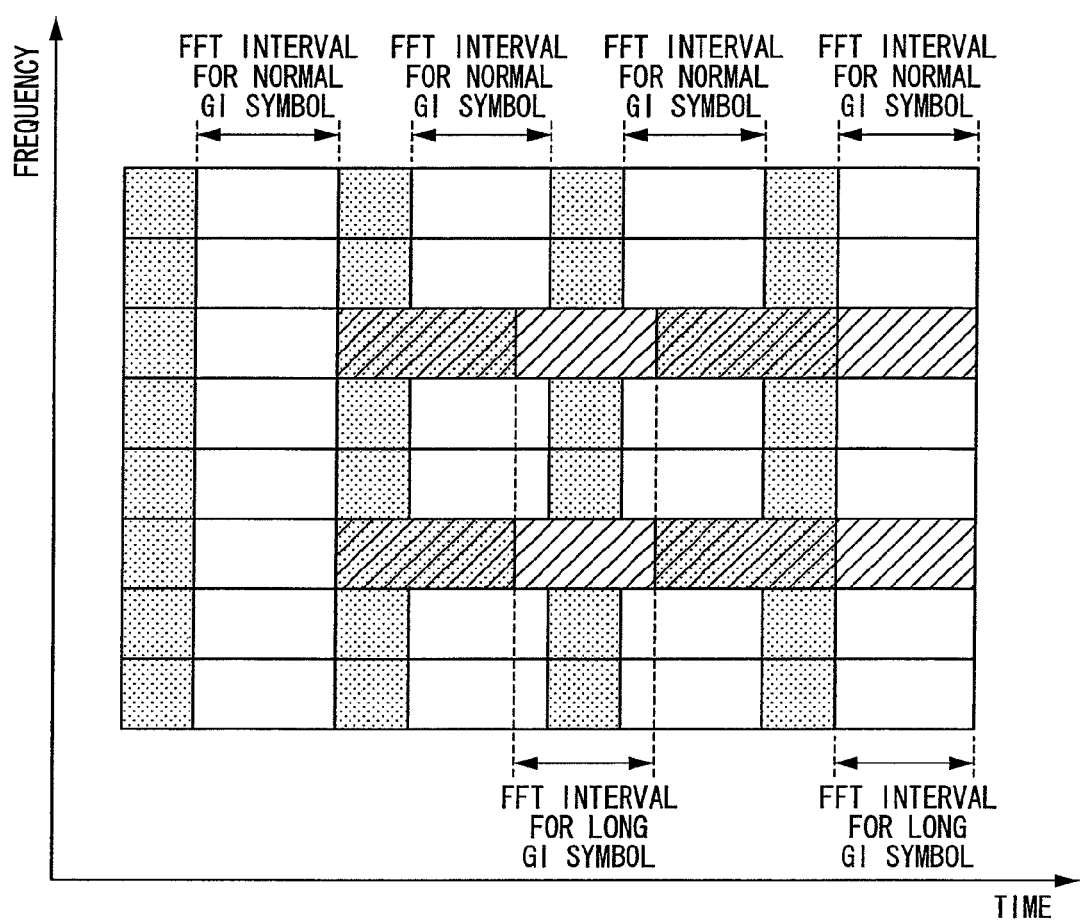
FIG. 37 is a diagram showing another example of an FFT interval for a normal GI information data symbol and a normal GI control symbol according to the same embodiment.

Here, separate examples of FFT interval extractions, which are performed by the second FFT interval extracting section 281 and the first FFT interval extracting section 220, are shown in FIGS. 36 and 37. In these examples, the case where two long GI pilot symbols are mapped to one subcarrier using three second to fourth OFDM symbols of third and sixth subcarriers is shown. Also, in the above-described arrangement example, the normal GI is added to the information data symbol and the control symbol arranged in an OFDM symbol to temporally overlap the long GI pilot symbol. In FIG. 37, an FFT interval for the normal GI information data symbol and the normal GI control symbol are shown as in FIG. 35. The first FFT interval extracting section 220 removes an interval other than the FFT interval. FIG. 36 shows an FFT interval for a long GI pilot symbol. In this case, because an effective symbol interval of a long GI is designated as the FFT interval, an FFT interval for a front pilot symbol is different from the effective symbol interval of the normal GI symbol. The second FFT interval extracting section 281 removes an interval other than the FFT interval.

If the effective symbol interval to which the long GI is added is different from the effective symbol interval to which the normal GI is added as shown in FIGS. 36 and 37, ICI occurs because a discontinuous point (symbol boundary) is included within an FFT interval set by the reception apparatus for each interval. Thus, it is possible to apply an interference canceller or turbo equalization for removing ICI. For example, after the pilot symbol processing section 280 performs the already described processing, it is possible to generate a replica signal of a received pilot symbol (long GI-OFDM symbol) and input a signal obtained by subtracting the replica signal from a reception signal to the first FFT interval extracting section 220. Thereby, it is possible to remove or reduce ICI due to the long GI pilot symbol. Its inverse process is also possible. That is, it is possible to remove or reduce ICI for the long GI pilot symbol by generating a replica signal of a normal GI-OFDM symbol and subtracting the replica signal from a reception signal. It is possible to apply iterative processing for iterating these processes.

The demapping section 250 performs demapping processing of extracting a signal of a region where an information data symbol is arranged and a signal of a region where a control symbol is arranged as a received information data symbol and a received control symbol from a signal propagation channel-compensated by the filter section 240. The demodulating section 260 performs demodulation processing by a modulation scheme designated by the control signal decoded by the decoding section 270 for the information data symbol and a predetermined modulation scheme for the control symbol, which are modulation schemes used by the modulating section 102 of the transmission apparatus 10 such as QPSK and QAM for the signals extracted by the demapping section 250.

At this time, the decoding section 270 decodes an error-correction coded signal, which is a result of demodulation by the demodulating section 260, using a well-known method such as MLD, MAP, log-MAP, max-log-MAP, or SOVA, and outputs the information data signal and the control signal, which are bit streams of decoding processing results. Information indicating a modulation scheme used when the modulating section 102 of the transmission apparatus 10 modulates the information data signal is included in the control signal output by the decoding section 270. The modulating section 260 determines a modulation scheme to be used when the information data signal is demodulated based on the information.

Figure 38:
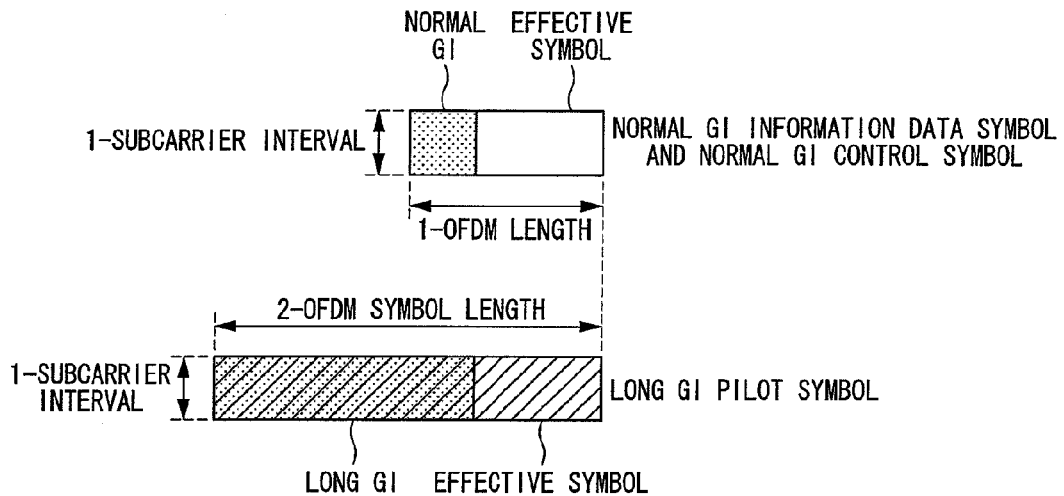
FIG. 38 is a diagram showing schematic configurations of an information data signal to which a normal GI is added and a pilot signal to which a long GI is added according to the same embodiment.

Here, the resistance to ISI of the normal GI and the long GI will be described. FIG. 38 is a diagram showing schematic configurations of a normal GI information data symbol and a normal GI control symbol and a schematic configuration of a long GI pilot symbol. The length of the long GI pilot symbol becomes the length of two OFDM symbols, which is twice the length of one OFDM symbol that is the length of the normal GI information data symbol. At this time, because the effective symbol lengths are respectively identical, the length difference is implemented by significantly lengthening a long GI, that is, by further adding the length of a pilot signal to twice the normal GI.

The GI is implemented by adding the rear end of the effective symbol interval to the front thereof, but, in the embodiment, the long GI inserting section 113 further adds the rear end of the effective symbol interval to the front thereof to obtain a signal of the long GI because the length of the long GI is insufficient even when the entire effective symbol interval is added to the front thereof. When the long GI is longer than that of the embodiment and the length is insufficient even when the long GI is generated by the method of the embodiment, the long GI is generated by iterating a process of further adding the rear end of the effective symbol interval to the front thereof.

Figure 39:
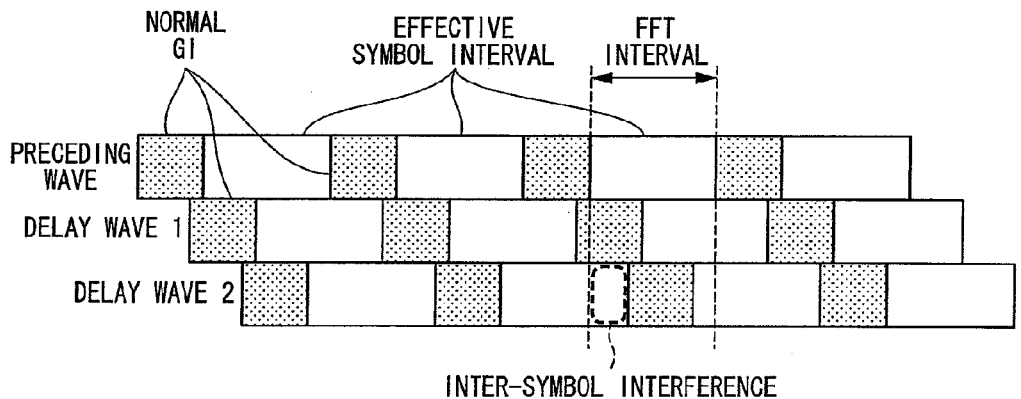
FIG. 39 is a diagram showing a schematic configuration example of a reception signal for an information data signal or a control signal to which a normal GI is added according to the same embodiment.

FIG. 39 is a diagram showing a schematic configuration example of a reception signal when a preceding wave and two delay waves for a normal GI information data symbol or a normal GI control symbol arrive. In FIG. 39, a shaded hatched rectangle indicates a normal GI signal and a white rectangle indicates a signal of an effective symbol interval. In FIG. 39, the case where FFT processing is performed for a third OFDM symbol of an arrival wave (not shown) is shown, and an FFT interval, which is an interval serving as a target of an FFT, is set to an effective symbol interval of the preceding wave. At this time, because a delay time of a delay wave 2 exceeds a GI, a signal of a second OFDM symbol of the delay wave 2 is included in the FFT interval, and consequently ISI occurs.

Figure 40:
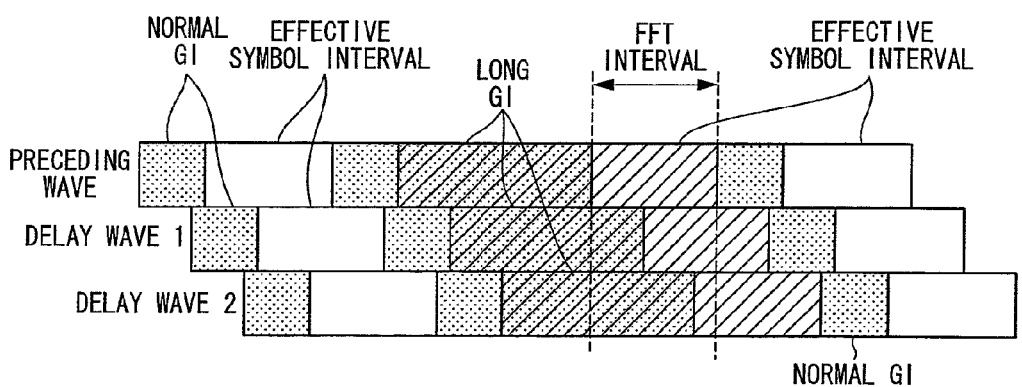
FIG. 40 is a diagram showing a schematic configuration example of a reception signal for an information data signal to which a normal GI is added and a pilot signal to which a long GI is added according to the same embodiment.

FIG. 40 is a diagram showing a schematic configuration example of a reception signal when a preceding wave and two delay waves for a normal GI information data symbol and a long GI pilot symbol arrive as in FIG. 39. In FIG. 39, a rectangle hatched by oblique lines indicates a signal of a long GI pilot symbol. A rectangle, which is not hatched by oblique lines, indicates a signal of the normal GI information data symbol or the normal GI control symbol. In the rectangles indicating the signals of the long GI pilot symbol and the normal GI information data symbol, a shaded hatched part indicates a signal of a GI (normal or long GI) and a white part indicates a signal of an effective symbol interval.

In FIG. 40, the case where FFT processing is performed for a long GI-OFDM symbol is shown, and its FFT interval is set to an effective symbol interval of the preceding wave. In the normal GI, ISI does not occur because a previous symbol signal does not enter an FFT interval if a delay time from the preceding wave of the delay wave 2 does not exceed the long GI even when it exceeds the normal GI.

From the above, it can be seen that the resistance to ISI is significantly improved in a signal to which the long GI is added with respect to the normal GI.

Here, propagation channel estimation by the propagation channel estimating section 284 and propagation channel compensation by the filter section 240 using a pilot symbol having high resistance to ISI by adding a long GI will be described. Because a propagation channel estimating method and a propagation channel compensating method can be the same as those of the related art even when the present invention is used, an example is shown here.

The pilot symbol is a signal known between the transmission apparatus 10 and the reception apparatus 20. To perform the propagation channel estimation, the propagation channel estimating section 284 of the reception apparatus 20 calculates a propagation estimation value by dividing a received pilot symbol $P'_{m,n}$ by a known pilot symbol $P_{m,n}$. That is, the propagation channel estimating section 284 obtains a propagation channel estimation value $\hat{H}_{m,n}$ using the following Equation (5).

$$\hat{H}_{m,n} = \frac{P'_{m,n}}{P_{m,n}} \quad (5)$$

In this regard, m is a subcarrier number and n is an OFDM symbol number.

In this case, the accuracy of propagation channel estimation depends on the received pilot symbol $P'_{m,n}$. It is possible to significantly improve ISI as already described by adding a long GI to the pilot symbol. Thus, it is possible to obtain the estimation value with significantly high accuracy.

Furthermore, the propagation channel estimating section 284 also performs propagation channel estimation for resource elements of an information data symbol and a control symbol in which no pilot symbol is arranged (a region for signal arrangement defined by subcarriers and OFDM symbols). The estimation method can be performed by various interpolation methods such as linear interpolation, non-linear interpolation, and FFT interpolation using the propagation channel estimation value obtained by Equation (5). At this time, because the propagation channel estimation value to be used in interpolation, that is, the propagation channel estimation value obtained by Equation (5), can have high accuracy by adding the long GI to the pilot symbol, it is also possible to improve the accuracies of propagation channel estimation values of resource elements of an information data symbol and a control symbol obtained by interpolation based on the propagation channel estimation value.

Next, the filter section 240 performs propagation channel compensation for the information data symbol and the control symbol using the obtained propagation channel estimation values. Here, if the ZF criterion is used as a method of propagation channel compensation by the filter section 240, the propagation channel compensation is performed by multiplying a frequency domain signal including the information data symbol or the control symbol by a weight coefficient $W^{ZF}_{m,n}$ expressed in the following Equation (6). In this regard, * denotes a conjugate in Equation (6).

$$w^{ZF}_{m,n} = \frac{H^*_{m,n}}{|H_{m,n}|^2} \quad (6)$$

If the MMSE criterion is used as a method of propagation channel compensation by the filter section 240, the propagation channel compensation is performed by multiplying a frequency domain signal including the information data symbol or the control symbol by a weight coefficient $W^{MMSE}_{m,n}$ expressed in the following Equation (7). In this regard, $\sigma^2$ denotes noise power in Equation (7).

$$w^{MMSE}_{m,n} = \frac{H^*_{m,n}}{|H_{m,n}|^2 + \sigma^2} \quad (7)$$

As described above, the reception apparatus 20 can implement highly accurate propagation channel estimation suppressing the influence of an arrival wave of a delay time exceeding a normal GI by adding a long GI longer than the normal GI in which a GI across at least one previous resource element in the time direction is set to a pilot symbol even in an environment where an arrival wave of a delay time exceeding the normal GI arrives. Furthermore, it is also possible to recover a transmitted information data symbol and control symbol with high accuracy because propagation channel compensation can be performed with high accuracy by performing the propagation channel compensation using a highly accurate propagation channel estimation result for the information data symbol and the control symbol to which the normal GI is added. Because the normal GI is added to the information data symbol and the control symbol arranged in an OFDM symbol temporally overlapping the pilot symbol to which the long GI is added, an increase of a GI caused by use of the long GI is suppressed and consequently the entire transmission efficiency is not substantially degraded, so that the reception apparatus 20 can implement highly accurate propagation channel estimation. Therefore, a receiver can perform communication so that a signal is recoverable by significantly improving the resistance to ISI without substantially degrading the entire transmission efficiency.

That is, the long GI inserting section 113 adds the long GI to a pilot symbol, which is an important symbol to be used in propagation channel estimation, the normal GI inserting section 105 adds the normal GI to other symbols, and the multiplexing section 120 multiplexes their results, so that the resistance to ISI is significantly improved in the pilot symbol, which is the important symbol (a symbol that affects demodulation of a plurality of symbols). Thereby, the resistance to ISI is significantly improved for the entire communication and the receiver can perform communication so that a signal is recoverable without substantially degrading transmission efficiency.

The reception apparatus 20 recovers an information data signal and a control signal without performing iterative processing in the embodiment, but the reception apparatus 20 may perform iterative processing such as interference cancellation or turbo equalization, which recovers a transmitted signal by removing ISI or the like using a decoding result.

The case where the length of the pilot symbol to which the long GI is added is twice the OFDM symbol length as compared with the OFDM symbol length of the information data symbol and the control symbol having the normal GI has been described above, but the present invention is not limited thereto as in the examples of FIGS. 36 and 37. It is preferable that at least the length of the long GI pilot symbol be set to be longer than those of the normal GI information data symbol and control symbol. For example, it may be 3 or 1.5 times the length thereof.

The case where signals to which GIs having two types of lengths of a normal GI and a long GI are added are used has been described above, but the present invention is not limited thereto. Signals to which GIs having three or more different types of lengths are added may be used. For example, the normal GI may be a first GI, and the long GI may be a plurality of types of second GIs.

The case where the long GI is added to all input pilot symbols has been described above, but the present invention is not limited thereto. For example, the long GI may be added to some pilot symbols and the normal GI may be added to other pilot symbols.

Eighth Embodiment

Hereinafter, the eighth embodiment of the present invention will be described with reference to the drawings. A wireless communication system according to the embodiment includes a transmission apparatus 10a and a reception apparatus 20, which perform communication in an OFDM scheme. The transmission apparatus 10a according to the embodiment is different from part of the transmission apparatus 10 according to the seventh embodiment. The following description will focus on blocks having functions different from those described in the seventh embodiment. The blocks whose description is omitted have the same functions as those of the seventh embodiment. Because the reception apparatus 20 according to the embodiment has the same configuration as the reception apparatus 20 (FIG. 33) according to the seventh embodiment, description is omitted.

Figure 41:
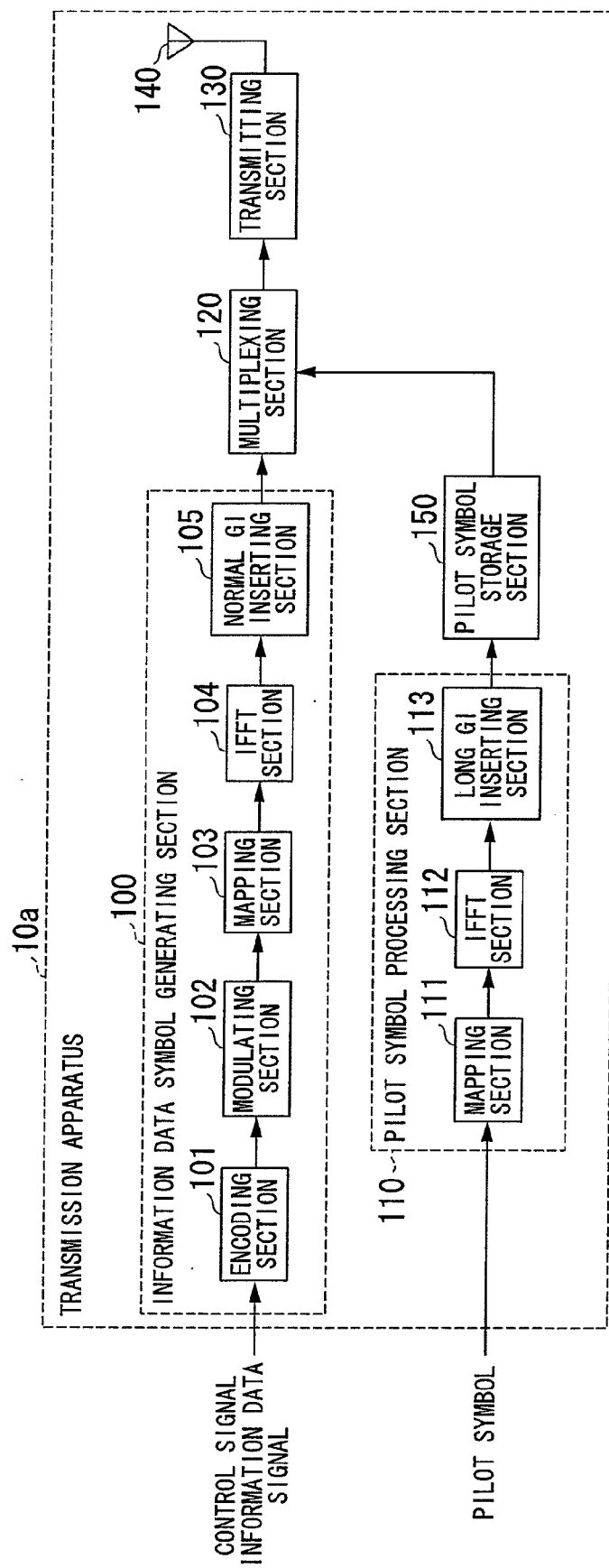
FIG. 41 is a schematic block diagram showing a configuration of a transmission apparatus 10a according to an eighth embodiment of the present invention.

FIG. 41 is a schematic block diagram showing a configuration of the transmission apparatus 10a according to the embodiment. A difference from the transmission apparatus 10 according to the seventh embodiment is that a pilot symbol storage section 150 (a symbol storage section) is added between the pilot symbol processing section 110 and the multiplexing section 120, and the configurations denoted by the other reference numerals 100 to 140 are identical.

The pilot symbol processing section 110 performs the same processing as described in the seventh embodiment, performs mapping and inverse Fourier transformation for a pilot symbol, and outputs a time domain signal of a long GI-OFDM symbol to which a long GI is added. The pilot symbol storage section 150 stores the time domain signal of the long GI-OFDM symbol output by the pilot symbol generating section 110.

On the other hand, the information data symbol generating section 100 performs the same processing as described in the seventh embodiment, and outputs a time domain signal of a normal GI-OFDM symbol.

The multiplexing section 120 performs the same processing as described in the seventh embodiment, but multiplexes a time domain signal of a normal GI-OFDM symbol including a normal GI information data symbol and control symbol and a time domain signal of a long GI-OFDM symbol including a long GI pilot symbol stored in the pilot symbol storage section 150.

Thereby, it is possible to use the time domain signal of the long GI-OFDM symbol stored by the pilot symbol storage section 150 as long as a value of a scattered pilot symbol and its position are not changed. Because it is possible to omit the processing of the pilot symbol processing section 110, a calculation amount corresponding thereto is reduced.

When there are a plurality of patterns for the value of the scattered pilot symbol and its position, the pilot symbol storage section 150 stores the time domain signal of the long GI-OFDM symbol output by the pilot symbol processing section 110 for each pattern, and outputs a signal of a corresponding pattern among stored signals to the multiplexing section 120, so that it is possible to reduce a processing amount because the processing of the pilot symbol processing section 110 is performed only when it is initially generated for each pattern, and is then omitted.

As described above, a pilot symbol in which a GI longer than a normal GI is set for only a scattered pilot symbol in any subcarrier within the same OFDM symbol is pre-generated, stored, and multiplexed into an information data symbol and a control symbol if necessary, so that a calculation amount for pilot symbol generation can be reduced, and the resistance to ISI can be significantly improved and the reception apparatus 20 can implement propagation channel estimation with high accuracy without substantially degrading the entire transmission efficiency as in the seventh embodiment.

The case where the transmission apparatus 10a includes the pilot symbol processing section 110 and inputs a long GI-OFDM symbol to the pilot symbol storage section 150 has been described above, but the pilot symbol processing section 110 may be omitted, that is, the transmission apparatus 10a may not include the pilot symbol processing section 110. In this case, it is preferable that a time domain signal of a pre-created long GI-OFDM symbol be input to the transmission apparatus 10a and the pilot symbol storage section 150 store the time domain signal.

The case where the long GI is added to all input pilot symbols has been described above, but the present invention is not limited thereto. For example, the long GI may be added to some pilot symbols and the normal GI may be added to other pilot symbols.

Ninth Embodiment

Hereinafter, the ninth embodiment of the present invention will be described with reference to the drawings. A wireless communication system according to the embodiment includes a transmission apparatus 10b and a reception apparatus 20, which perform communication in an OFDM scheme. The transmission apparatus 10b according to the embodiment is different from part of the transmission apparatus 10 according to the seventh embodiment. The following description will focus on blocks having functions different from those described in the seventh embodiment. The blocks whose description is omitted have the same functions as those of the seventh embodiment. Because the reception apparatus 20 according to the embodiment has the same block configuration as the reception apparatus 20 (FIG. 33) according to the seventh embodiment, description is omitted.

Figure 42:
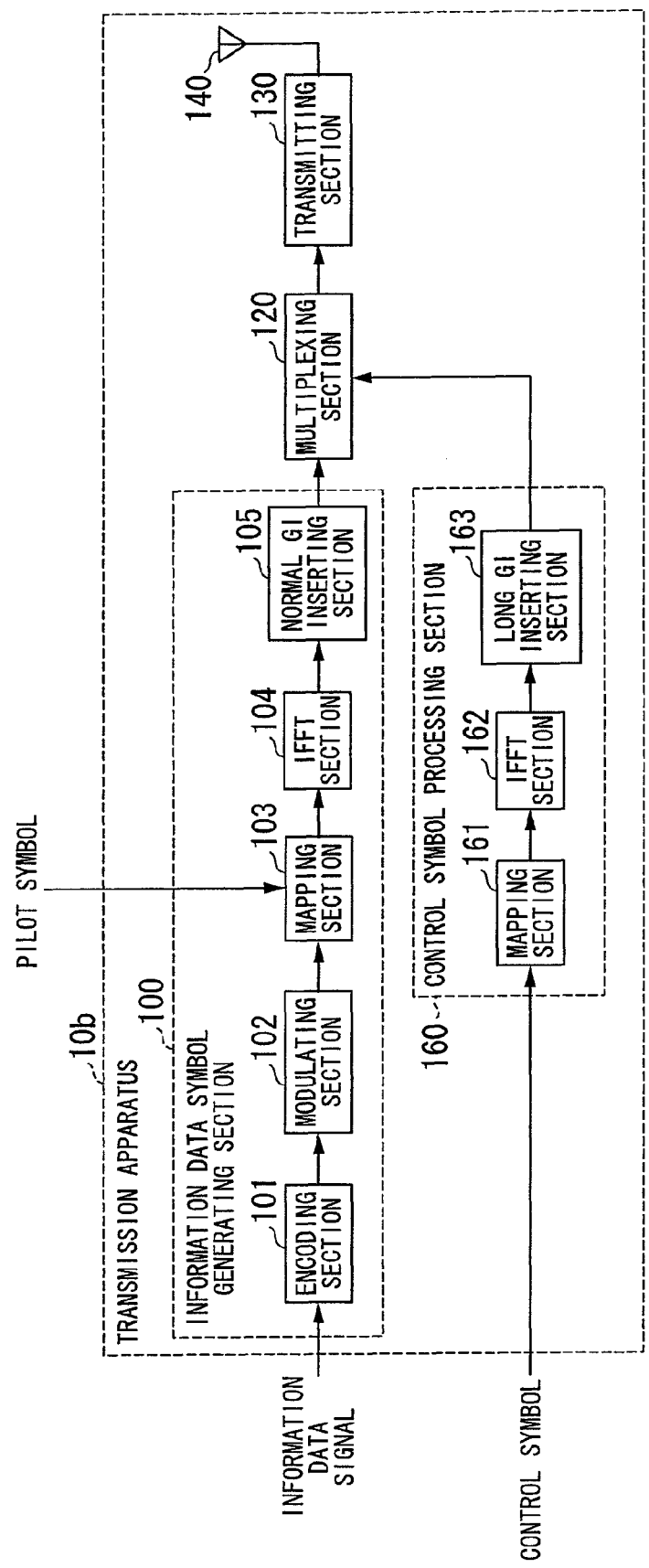
FIG. 42 is a schematic block diagram showing a configuration of a transmission apparatus 10b according to a ninth embodiment of the present invention.

FIG. 42 is a schematic block diagram showing a configuration of the transmission apparatus 10b according to the embodiment. A difference from the transmission apparatus 10 according to the seventh embodiment is that the pilot symbol processing section 110 is omitted and a control symbol processing section 160 (also referred to as a second multicarrier symbol generating section) is added, and the configurations denoted by the other reference numerals 100 to 105 and 120 to 140 are identical. A control symbol, not a pilot symbol described in the seventh embodiment, within a signal input to the transmission apparatus 10 is input to the control symbol processing section 160, and the pilot symbol is input to the mapping section 103 of the information data symbol generating section 100.

Here, the control symbol is an encoded and modulated modulation symbol, and includes a modulation symbol of a control signal indicating information necessary for receiving a plurality of information data signals, for example, such as a modulation scheme of adaptive modulation, a mapping method (resource allocation method), error-correction coding information (for example, a coding method, a coding rate, and a puncturing pattern), an interleaving method, a scrambling method, HARQ control information (for example, packet reception notification information (an ACK), non-packet-reception notification information (a NACK), the number of retransmissions, or the like), a synchronization signal, spatial multiplexing technology (MIMO) control information (for example, the number of layers (the number of streams) or a precoding method), base station information, terminal information, format information of control information, format information of data information, feedback information (for example, a CQI or the like), and transmission power control information, but the present invention is not limited thereto.

The control symbol processing section 160 includes a mapping section 161, an IFFT section 162, and a long GI inserting section 163. In the control symbol processing section 160, first, the mapping section 161 maps an input control symbol to a resource element in which the control symbol is arranged as in processing by the mapping section 111 of the pilot symbol generating section 110 described in the seventh embodiment. The IFFT section 162 performs IFFT processing for the control symbol mapped by the mapping section 161, which is a frequency domain signal, and performs conversion from the frequency domain signal into a time domain signal. The long GI inserting section 163 adds a GI longer than the normal GI added by the normal GI inserting section 105 to the time domain signal generated by the IFFT section 162, and generates a time domain signal of a long GI-OFDM symbol including a control symbol to which a long GI is added.

On the other hand, the information data symbol generating section 100 performs the same processing as described in the seventh embodiment for an input information data signal. In this regard, a pilot symbol input to the mapping section 103 is arranged in a resource element for the pilot symbol by the mapping section 103, and the IFFT section 104 and the normal GI inserting section 105 perform the same processing as described in the seventh embodiment for the information data signal and the pilot symbol. The information data symbol generating section 100 outputs a time domain signal of a normal GI-OFDM symbol including the information data symbol and the pilot symbol to which the normal GI is added as a result of processing by the normal GI inserting section 105.

The multiplexing section 120 performs the same processing as described in the seventh embodiment, but the normal GI-OFDM symbol generated by the information data symbol generating section 100 and the long GI-OFDM symbol generated by the control symbol processing section 160 are multiplexed in the time domain.

Figure 43:
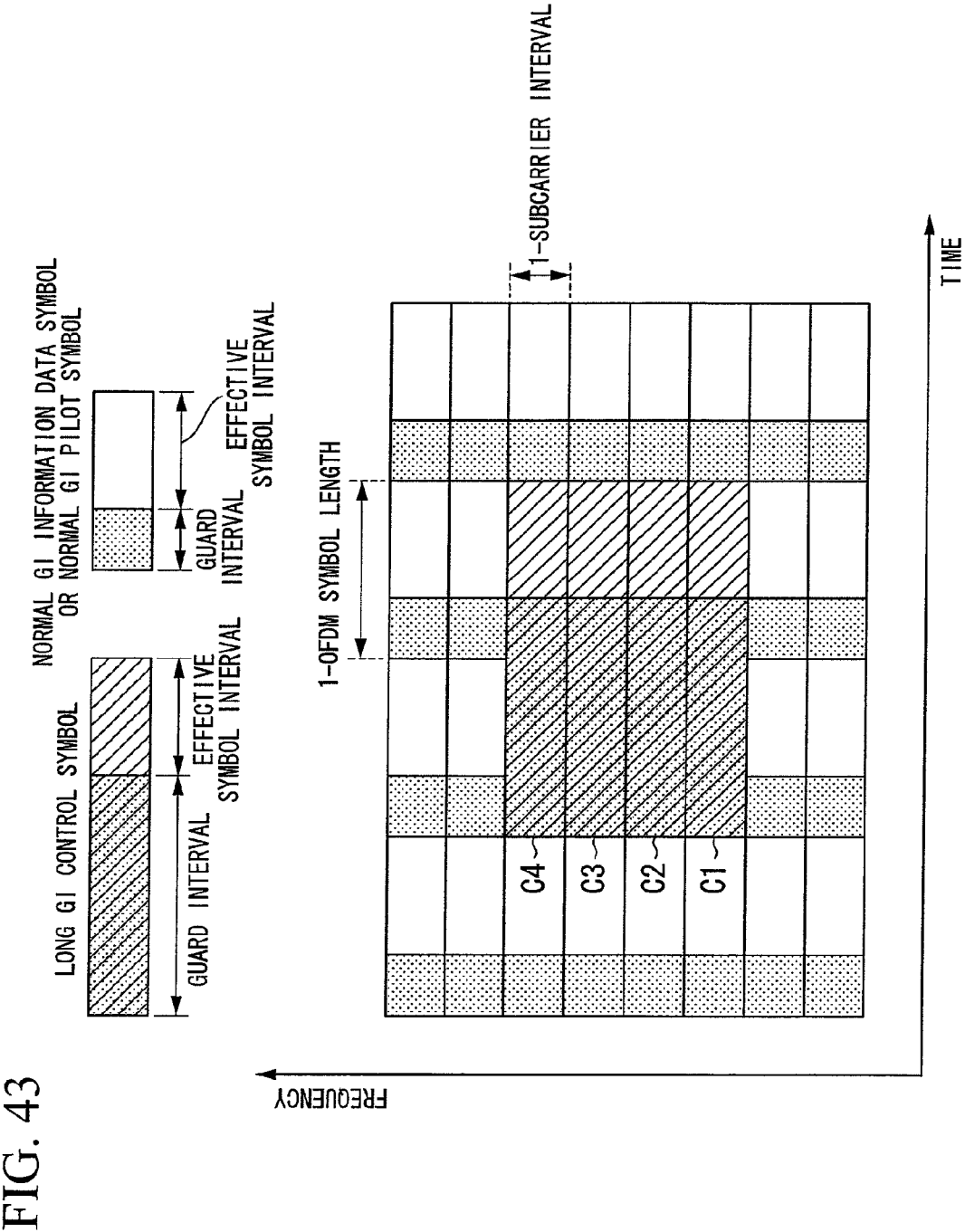
FIG. 43 is a diagram showing an example of a frequency component and a time component of signals multiplexed by a multiplexing section 120 according to the same embodiment.

FIG. 43 is a diagram showing an example of a frequency component and a time component of signals multiplexed by the multiplexing section 120. In the example of FIG. 43, a frame constituted by four OFDM symbols and eight subcarriers is shown. In FIG. 43, each of rectangles C1 to C4 hatched by oblique lines indicates a region where a long GI control symbol is arranged as a control symbol to which a long GI is added. A rectangle not hatched by oblique lines indicates a region where a normal GI information data symbol is arranged as an information data symbol to which a normal GI is added, or a normal GI pilot symbol is arranged as a pilot symbol to which the normal GI is added. Among rectangles indicating regions where the long GI control symbol, the normal GI information data symbol, and the normal GI pilot symbol are arranged, a shaded hatched part indicates a GI and a white part indicates an effective symbol interval.

The long GI control symbols are arranged in regions C1 to C4, that is, regions of second and third OFDM symbols for third and sixth subcarriers from a low frequency direction, and their effective symbol intervals are consistent with the other signals arranged in the third OFDM symbol. That is, because a region where the long GI control symbol is arranged corresponds to two OFDM symbols for one long GI control symbol, the long GI is significantly long as compared with the normal GI. Thereby, the resistance to ISI is significantly improved in relation to the control symbol.

As described above, a control symbol is inserted into any subcarrier within the same OFDM symbol in an environment where an arrival wave exceeding a normal GI arrives, and the long GI inserting section 163 sets a GI longer than the normal GI for only the control symbol, which is important information to be used in the designation of a parameter for transmitting an information data signal, or the like, so that the resistance to ISI of the control symbol can be significantly improved and the receiver can recover a control signal without substantially degrading the entire transmission efficiency. The control signal is an important signal to be used in the designation of a parameter for transmitting many information data signals, or the like, and the transmission efficiency of the information data signals can be improved by improving the transmission efficiency of the control signal because many information data signals are also not transmitted if no control signal is transmitted.

The case where the long GI control symbol has a length twice the length of the normal GI information data symbol has been described above, but the present invention is not limited thereto. It is preferable that at least the long GI control symbol be set to be longer than the length of the normal GI information data symbol. For example, it may be 3 or 1.5 times the length thereof.

The case where the long GI is added to the control symbol has been described above, but the present invention is not limited thereto. The long GI may be added to a symbol having high importance within the information data signal. For example, the long GI can be added to a symbol of an information data signal having high QoS, an information data signal having high urgency, or the like.

The transmission apparatus according to the embodiment can also be applied to those according to the seventh and eighth embodiments.

An example in which the control symbol processing section 160 receives a modulated control symbol has been described in the embodiment, but the control symbol processing section 160 may include an encoding section, which performs error-correction coding, and a modulating section, which performs modulation such as BPSK, and may receive a control signal, which is not error-correction coded and modulated, generate a control symbol by performing error-correction coding by the encoding section and modulation by the modulating section for the received signal, and input the control symbol to the mapping section 161.

The case where the long GI is added to all input control symbols has been described above, but the present invention is not limited thereto. For example, it is possible to add the long GI only to some control symbols and add the normal GI to other control symbols.

In this case, it is preferable to add the long GI to a control symbol having high importance among control symbols.

Tenth Embodiment

Hereinafter, the tenth embodiment of the present invention will be described with reference to the drawings. A wireless communication system according to the embodiment includes a transmission apparatus 10c and a reception apparatus 20, which perform communication in an OFDM scheme. The transmission apparatus 10c according to the embodiment is different from part of the transmission apparatus 10 according to the seventh embodiment. The following description will focus on blocks having functions different from those described in the seventh embodiment. The blocks whose description is omitted have the same functions as those of the seventh embodiment. The reception apparatus 20 according to the embodiment can be implemented as the same block configuration as the reception apparatus 20 (FIG. 33) according to the seventh embodiment.

Figure 44:
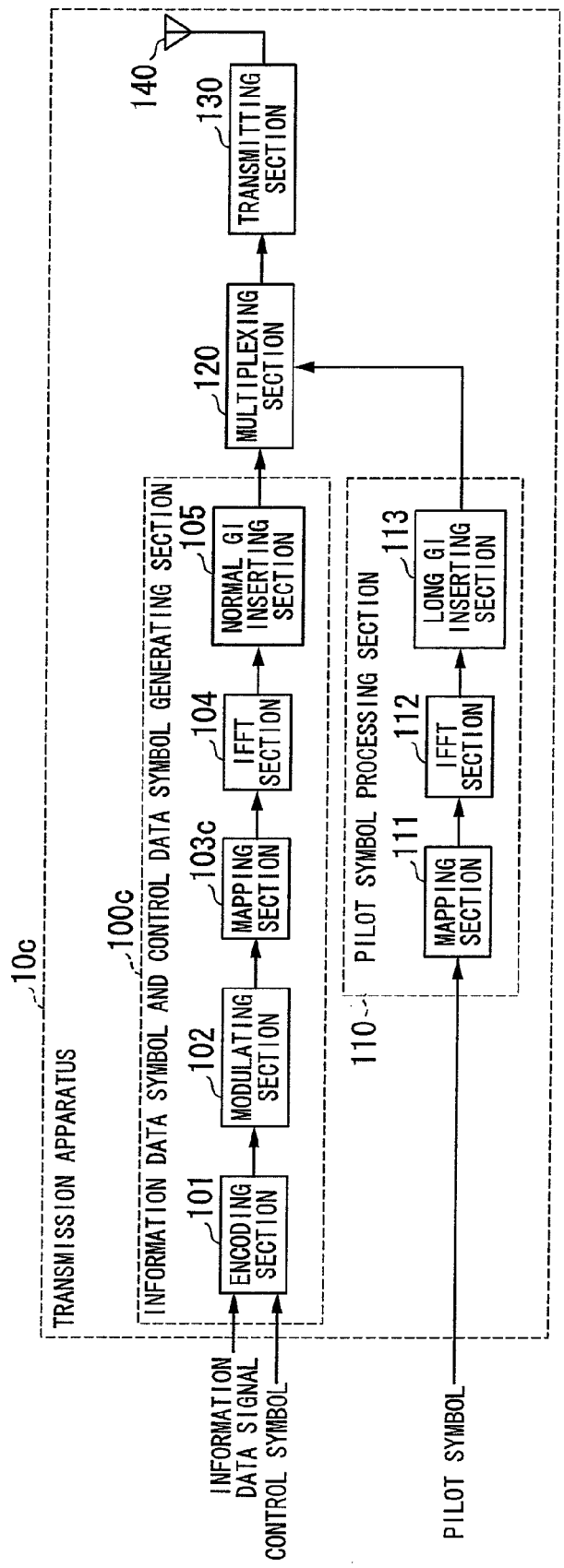
FIG. 44 is a schematic block diagram showing a configuration of a transmission apparatus 10c according to a tenth embodiment of the present invention.

FIG. 44 is a schematic block diagram showing a configuration of the transmission apparatus 10c according to the embodiment. A difference from the transmission apparatus 10 according to the seventh embodiment is that the information data symbol generating section 100 is changed to an information data symbol generating section 100c (also referred to as a first multicarrier symbol generating section), and the configurations denoted by the other reference numerals 110 to 140 are identical. The information data symbol generating section 100c is only different from the information data symbol generating section 100 in that a mapping section 103c is provided in place of the mapping section 103, and the configurations denoted by the other reference numerals 101, 102, 104, and 105 are identical.

Here, the control signal includes, for example, a modulation scheme to be used in an information data signal, a mapping method (resource allocation method), error-correction coding information (for example, a coding method, a coding rate, and a puncturing pattern), an interleaving method, a scrambling method, HARQ control information (for example, packet reception notification information (an ACK), non-packet-reception notification information (an NACK), the number of retransmissions, or the like), a synchronization signal, MIMO control information (for example, the number of layers (the number of streams) or a precoding method), base station information, terminal information, format information of control information, format information of data information, feedback information (for example, a CQI or the like), transmission power control information, and the like, but the present invention is not limited thereto.

Figure 45:
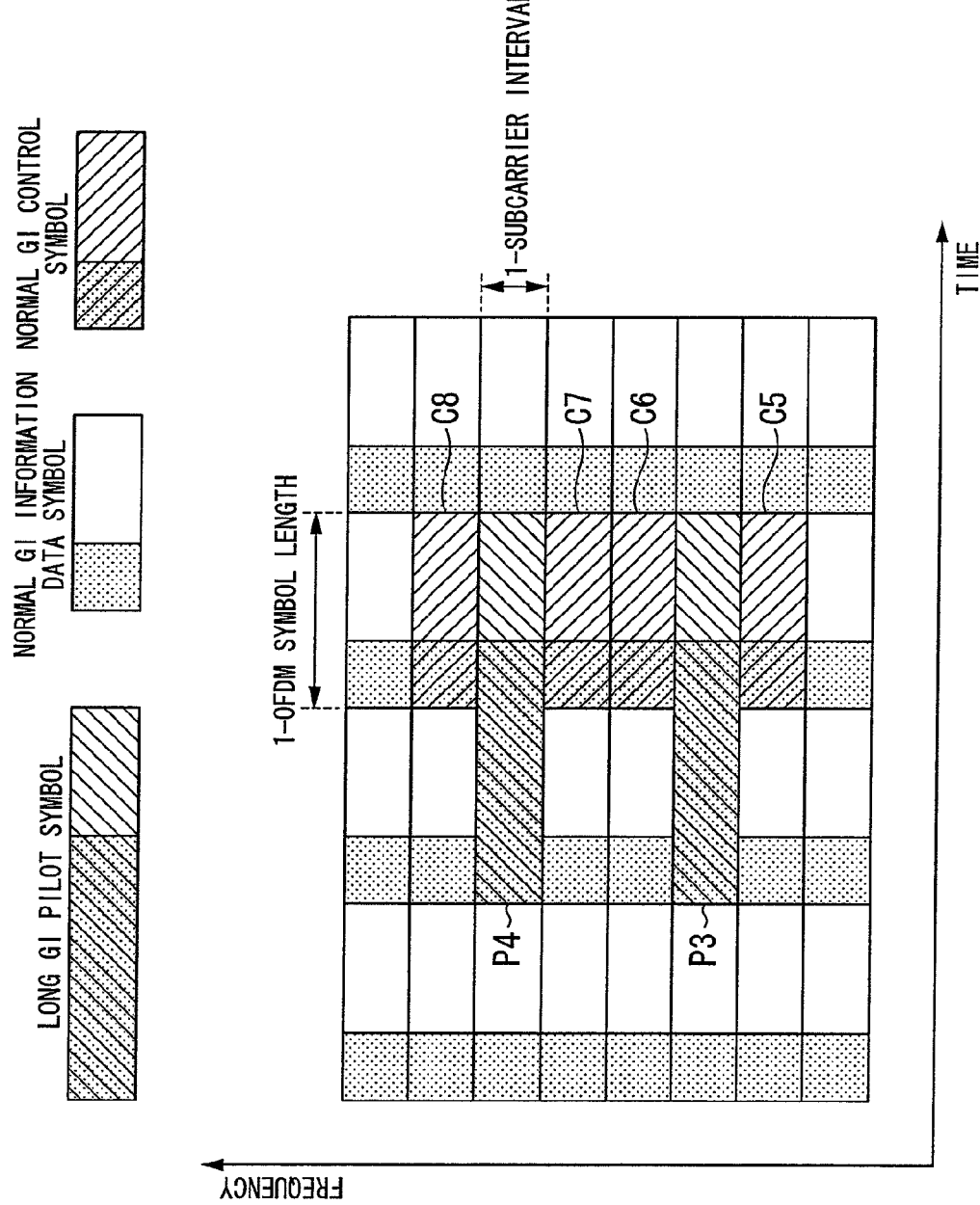
FIG. 45 is a diagram showing an example of a frequency component and a time component of signals multiplexed by a multiplexing section 120 according to the same embodiment.

The information data symbol generating section 100c includes an encoding section 101, a modulating section 102, a mapping section 103c, an IFFT section 104, and a normal GI inserting section 105. First, the encoding section 101 performs error-correction coding based on a convolutional code, a turbo code, or the like for an information data signal and a control signal. The modulating section 102 modulates the error-correction coded information data signal and control signal by a modulation scheme such as QPSK or QAM, and generates an information data symbol and a control symbol. The mapping section 103c maps the information data symbol and the control symbol generated by the modulating section 102 to resource elements respectively predetermined for the information data symbol and the control symbol, which are resource elements other than a resource element to which a scattered pilot symbol is mapped. At this time, as shown in FIG. 45 to be described later, a resource element adjacent to a scattered pilot symbol to which the long GI is added, in particular, a resource element of an adjacent subcarrier within the same OFDM symbol, is preferentially allocated for the resource element predetermined for the control symbol, which is the resource element mapped by the mapping section 103c. The IFFT section 104 performs IFFT processing for the information data symbol and the control symbol mapped by the mapping section 103c, which are frequency domain signals, and performs conversion from the frequency domain signals into time domain signals. The normal GI inserting section 105 adds the normal GI to the time domain signals generated by the IFFT section 104.

FIG. 45 is a diagram showing an example of a frequency component and a time component of signals multiplexed by the multiplexing section 120 according to the embodiment. The example of FIG. 45 shows a frame constituted by four OFDM symbols and eight subcarriers. In FIG. 45, rectangles P3 and P4 hatched by oblique lines upward to the right indicate regions where a pilot symbol including a GI is arranged. Rectangles C5 to C8 hatched by oblique lines downward to the right indicate regions where a control symbol including a GI is arranged. A rectangle not hatched by oblique lines indicates a region where an information data symbol including a GI is arranged. Among rectangles indicating regions where the pilot symbol, the information data symbol, and the control symbol are arranged, a shaded hatched part indicates a GI and a white part indicates an effective symbol interval.

The long GI pilot symbols are arranged in the regions P3 and P4, that is, regions of second and third OFDM symbols for third and sixth subcarriers from a low frequency direction, and their effective symbol intervals are consistent with the other signals arranged in the third OFDM symbol. The control symbol is arranged in the third OFDM symbol for the regions C5 to C8, that is, second, fourth, fifth, and seventh subcarriers from a low frequency direction.

That is, because each long GI pilot symbol uses two OFDM symbols, its GI (long GI) is a length in which a normal GI is added to one OFDM symbol, and is significantly long as compared with the normal GI. The control symbol is arranged in a resource element adjacent to each pilot symbol in the frequency direction (a resource element of an adjacent subcarrier within the same OFDM symbol).

As shown in FIG. 45, the effect obtained by preferentially allocating the control symbol to a resource element of an adjacent subcarrier within the same OFDM symbol as a scattered pilot symbol to which a long GI is added will be described as follows. In general, the reception apparatus performs FFT processing in an environment where an arrival wave exceeding a GI arrives, so that a discontinuous part (symbol boundary) of part of an arrival wave is included within an FFT interval. Thus, ICI occurs in a signal after FFT processing.

However, because a GI is long in a symbol to which a long GI is added as shown in FIG. 45, an arrival wave exceeding the GI does not arrive, or is significantly weak as compared with that of a symbol to which a normal GI is added. Thus, the ICI does not occur, or is significantly weak, in the symbol to which the long GI is added. That is, interference (ICI) to a symbol adjacent in the frequency direction is low in a symbol to which the long GI is added as compared with a symbol to which the normal GI is added. From the above, ICI is reduced in an element of an adjacent subcarrier of a symbol to which the long GI is added as compared with the other elements, so that it is possible to perform recovery with high accuracy.

As described above, a scattered pilot symbol is inserted into any subcarrier within the same OFDM symbol in an environment where an arrival wave exceeding a normal GI arrives, and a GI longer than the normal GI is set for only the scattered pilot symbol. Furthermore, a control symbol is preferentially allocated to an element located in an adjacent subcarrier of the scattered pilot symbol. Thereby, ICI to the control symbol can be reduced and the receiver can recover a control signal with high accuracy.

An example in which the control symbol is preferentially allocated to a resource element of an adjacent subcarrier within the same OFDM symbol as a scattered pilot symbol to which the long GI is added has been described above, but the present invention is not limited thereto. It may be allocated to an element of a peripheral subcarrier within the same OFDM symbol as the scattered pilot symbol to which the long GI is added. In this case, in particular, it is preferable to perform allocation to a resource element of a subcarrier near a resource element of the scattered pilot symbol to which the long GI is added.

An example in which the control symbol is preferentially allocated to a resource element of an adjacent subcarrier within the same OFDM symbol as the scattered pilot symbol to which the long GI is added has been described above, but the present invention is not limited thereto. For example, a symbol of an information data signal having high QoS, an information data signal having high urgency, or the like may be preferentially allocated.

The mapping section 103c of the transmission apparatus 10c according to the embodiment can also be applied to the transmission apparatus according to the first to ninth embodiments.

The case where the long GI is added to all input pilot symbols has been described above, but the present invention is not limited thereto. For example, the long GI may be added to some pilot symbols and the normal GI may be added to other pilot symbols.

Eleventh Embodiment

Hereinafter, the eleventh embodiment of the present invention will be described with reference to the drawings. A wireless communication system according to the embodiment includes a transmission apparatus 10 and a reception apparatus 20a, which perform communication in an OFDM scheme. The transmission apparatus 10 according to the embodiment is implemented by the same block configuration as those of the transmission apparatus 10 (FIG. 29) according to the seventh embodiment. The reception apparatus 20a according to the embodiment is different from part of the reception apparatus 20 according to the seventh embodiment. The following description will focus on blocks having functions different from those described in the seventh embodiment. The blocks whose description is omitted have the same functions as those of the seventh embodiment.

Figure 46:
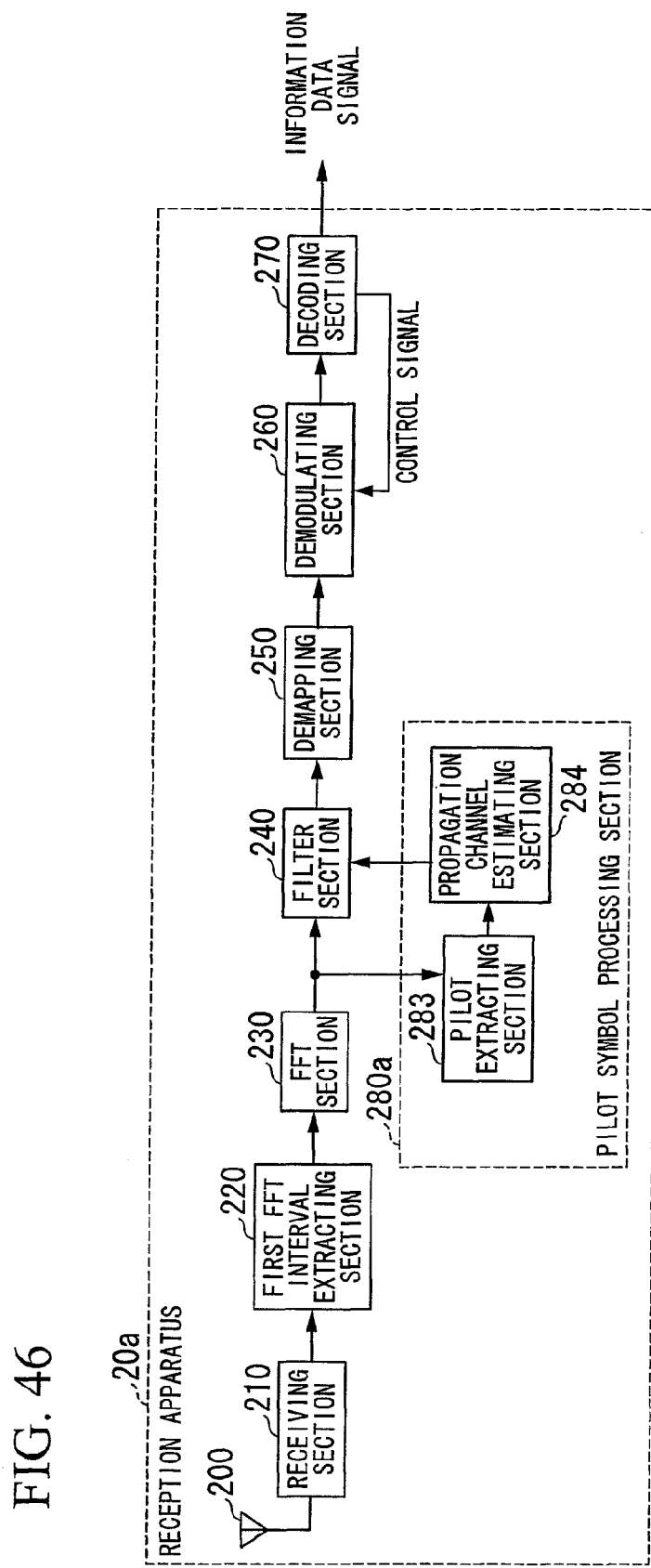
FIG. 46 is a schematic block diagram showing a configuration of a reception apparatus 20a according to an eleventh embodiment of the present invention.

FIG. 46 is a schematic block diagram showing a configuration of the reception apparatus 20a according to the embodiment. A difference from the reception apparatus 20 according to the seventh embodiment is that the second FFT interval extracting section 281 and the second FFT section 282 of the pilot symbol processing section 280 of the seventh embodiment are omitted, and an input to a pilot symbol processing section 280a according to the embodiment becomes a frequency domain signal output from the first FFT section 230.

The reception apparatus 20a receives a signal into which an information data symbol and a control symbol to which a normal GI is added and a scattered pilot symbol to which a long GI is added are multiplexed as shown in FIG. 32 as in the seventh embodiment. The reception apparatus 20a according to the eleventh embodiment only includes the first FFT interval extracting section 220 without including the second FFT interval extracting section 281. For the received signal, the first FFT interval extracting section 220 and the first FFT section 230 of the reception apparatus 20a perform the same processing as FFT interval extraction and FFT processing directed to the information data symbol and the control symbol to which the normal GI is added in the seventh embodiment.

In this case, because FFT processing is also performed for a scattered pilot symbol to which a long GI is added, that is, an effective symbol interval of long GI-OFDM (a second OFDM symbol of FIG. 32), a frequency domain signal generated by the FFT processing of the first FFT section 230 includes a reception signal of a symbol included in the normal GI-OFDM symbol and a reception signal of a symbol included in the long GI-OFDM symbol. The pilot extracting section 283 (a symbol extracting section) of the pilot symbol processing section 280 discards a reception signal part of a symbol included in the normal GI-OFDM symbol from the frequency domain signal, and extracts the reception signal of the symbol included in the long GI-OFDM symbol as a received pilot symbol. At this time, the pilot extracting section 283 extracts the reception signal of the symbol included in the long GI-OFDM symbol as a reception signal of a pilot symbol by extracting an effective symbol interval of the long GI-OFDM symbol (the third OFDM symbol of FIG. 32) and a signal of a subcarrier in which the pilot symbol is arranged.

As described above, reception is performed by only processing of extracting an FFT interval corresponding to a normal GI without processing of extracting an FFT interval corresponding to a long GI in a method of inserting a scattered pilot symbol into any subcarrier within the same OFDM symbol and setting a GI longer than the normal GI for only the scattered pilot symbol, so that a circuit scale can be reduced, the resistance to ISI can be significantly improved, and propagation channel estimation can be implemented with high accuracy without substantially degrading the entire transmission efficiency.

The reception apparatus 20a according to the embodiment can also be applied to the reception apparatus of the seventh to tenth embodiments.

Twelfth Embodiment

Hereinafter, the twelfth embodiment of the present invention will be described with reference to the drawings. A wireless communication system according to the embodiment includes a transmission apparatus 10d and a reception apparatus 20d, which perform communication in an OFDM scheme. The transmission apparatus 10d and the reception apparatus 20d are almost the same as the transmission apparatus 10 (FIG. 29) and the reception apparatus 20 (FIG. 33) according to the seventh embodiment, but the number of blocks is different according to the number of antennas because the embodiment is a MIMO system using a plurality of transmission antennas and a plurality of reception antennas. The following description will focus on blocks having functions different from those described in the seventh embodiment. The blocks whose description is omitted have the same functions as those of the seventh embodiment.

Figure 47:
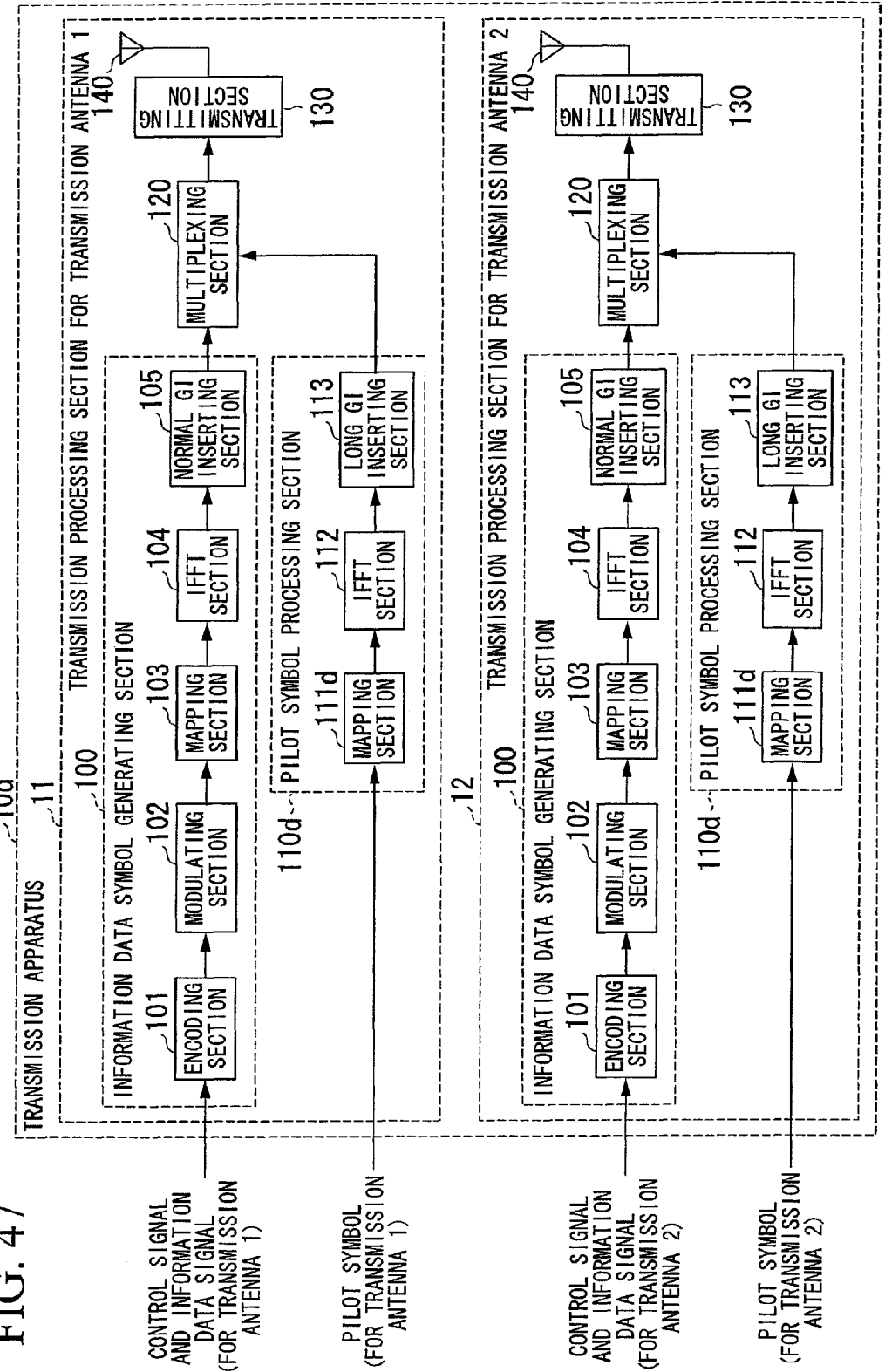
FIG. 47 is a schematic block diagram showing a configuration of a transmission apparatus 10d according to a twelfth embodiment of the present invention.

FIG. 47 is a schematic block diagram showing a configuration of the transmission apparatus 10d according to the embodiment. The transmission apparatus 10d includes a transmission processing section 11 for a transmission antenna 1 and a transmission processing section 12 for a transmission antenna 2. Each transmission processing section includes an information data symbol generating section 100, a pilot symbol processing section 110d, a multiplexing section 120, a transmitting section 130, and a transmission antenna 140. An information data signal and a control signal (for the transmission antenna 1), a pilot symbol (for the transmission antenna 1), an information data signal and a control signal (for the transmission antenna 2), and a pilot symbol (for the transmission antenna 2) are respectively input to the transmission processing sections.

Figure 48:
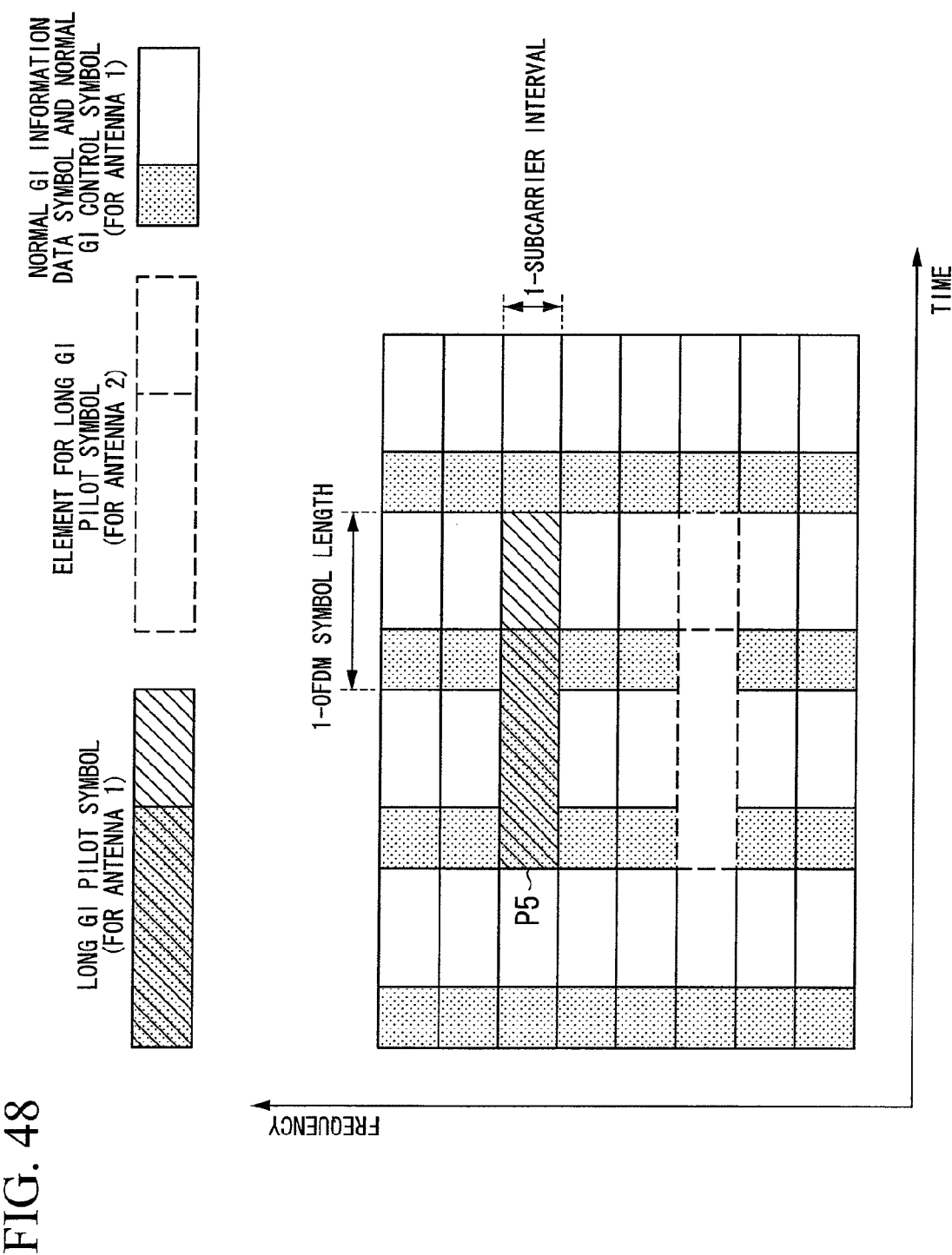
FIG. 48 is a diagram showing a frame constituted by an information data signal symbol, a control signal symbol, and a pilot symbol generated by a transmission processing section 11 for a transmission antenna 1 according to the same embodiment.

FIG. 48 is a diagram showing a frame constituted by a normal GI information data symbol and a normal GI control symbol (for the antenna 1) and a long GI pilot symbol (for the antenna 1) generated by the transmission processing section 11 for the transmission antenna 1. The example of FIG. 48 shows a frame constituted by four OFDM symbols and eight subcarriers. The transmission processing section 11 for the transmission antenna 1 arranges an effective symbol of a long GI pilot symbol P5 for the transmission antenna 1 in one resource element (sixth subcarrier) within two resource elements (a third OFDM symbol of third and sixth subcarriers) for arranging a scattered pilot symbol in the frame, and the resource element (third subcarrier) of another scattered pilot symbol becomes zero (null). Thereby, the pilot symbol for the transmission antenna 1 does not overlap (or does not interfere with) the pilot symbol for the transmission antenna 2 arranged by the transmission processing section 12 for the transmission antenna 2.

Figure 49:
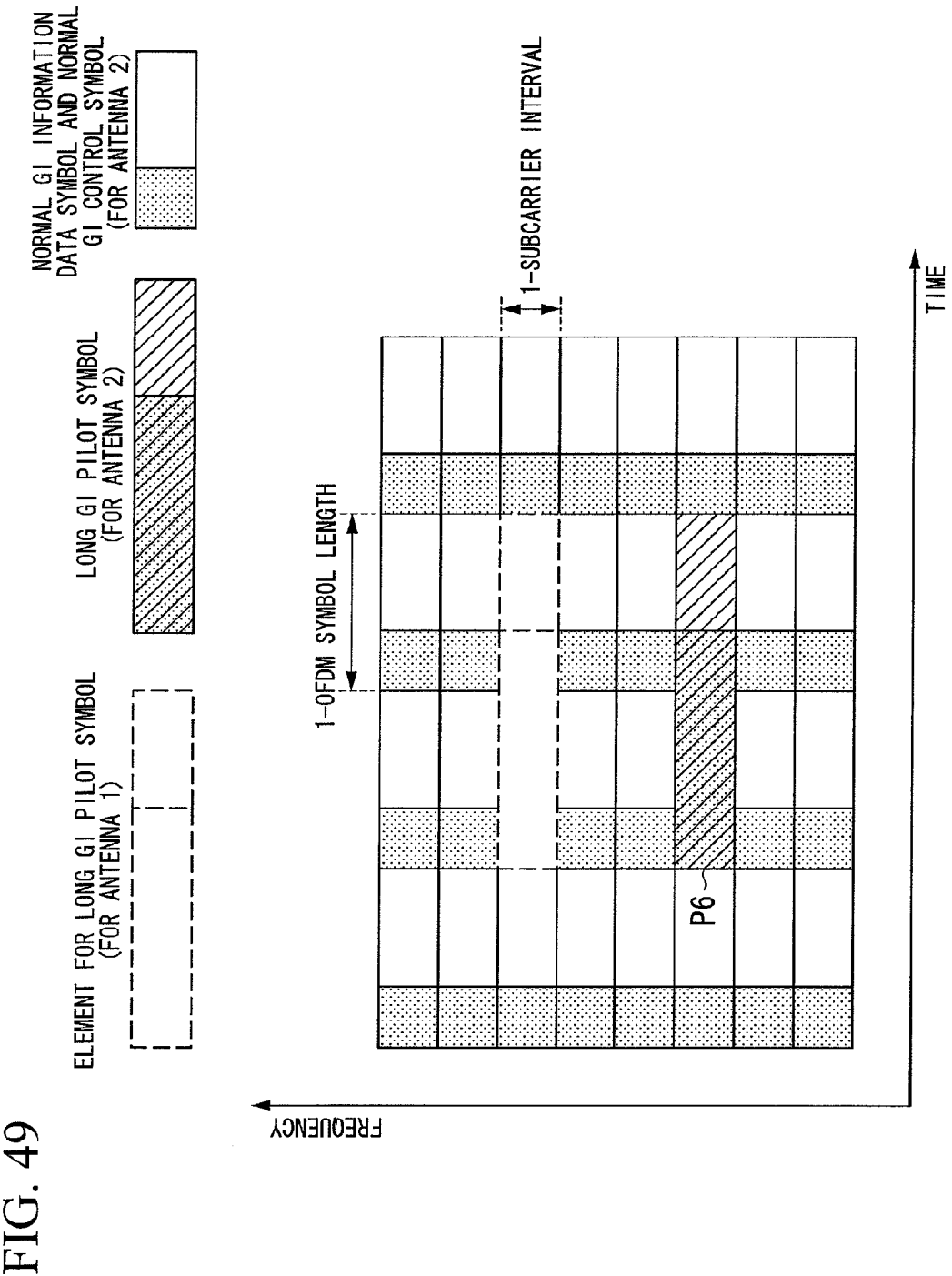
FIG. 49 is a diagram showing a frame constituted by an information data signal symbol, a control signal symbol, and a pilot symbol generated by a transmission processing section 12 for a transmission antenna 2 according to the same embodiment.

FIG. 49 is a diagram showing a frame constituted by a normal GI information data symbol and a normal GI control symbol (for the antenna 2) and a long GI pilot symbol (for the antenna 2) generated by the transmission processing section 12 for the transmission antenna 2. The example of FIG. 49 shows a frame constituted by four OFDM symbols and eight subcarriers. The transmission processing section 12 for the transmission antenna 2 arranges an effective symbol of a pilot symbol P6 for the transmission antenna 2 in one resource element (third subcarrier) within two scattered pilot symbols for arranging a scattered pilot symbol in the frame, and the resource element (sixth subcarrier) of another scattered pilot symbol becomes zero (null). Thereby, the pilot symbol for the transmission antenna 2 does not overlap (or does not interfere with) the pilot symbol for the transmission antenna 1 arranged by the transmission processing section 11 for the transmission antenna 1.

As described above, the scattered pilot symbols are allocated to be independent of each other for each transmission antenna, so that the reception apparatus 20d receives an information data symbol to which the normal GI is added in a spatially multiplexed state, but can receive a scattered pilot symbol to which the long GI is added without being spatially multiplexed.

The respective transmission processing sections simultaneously transmit transmission frames as illustrated in FIGS. 48 and 49.

Figure 50:
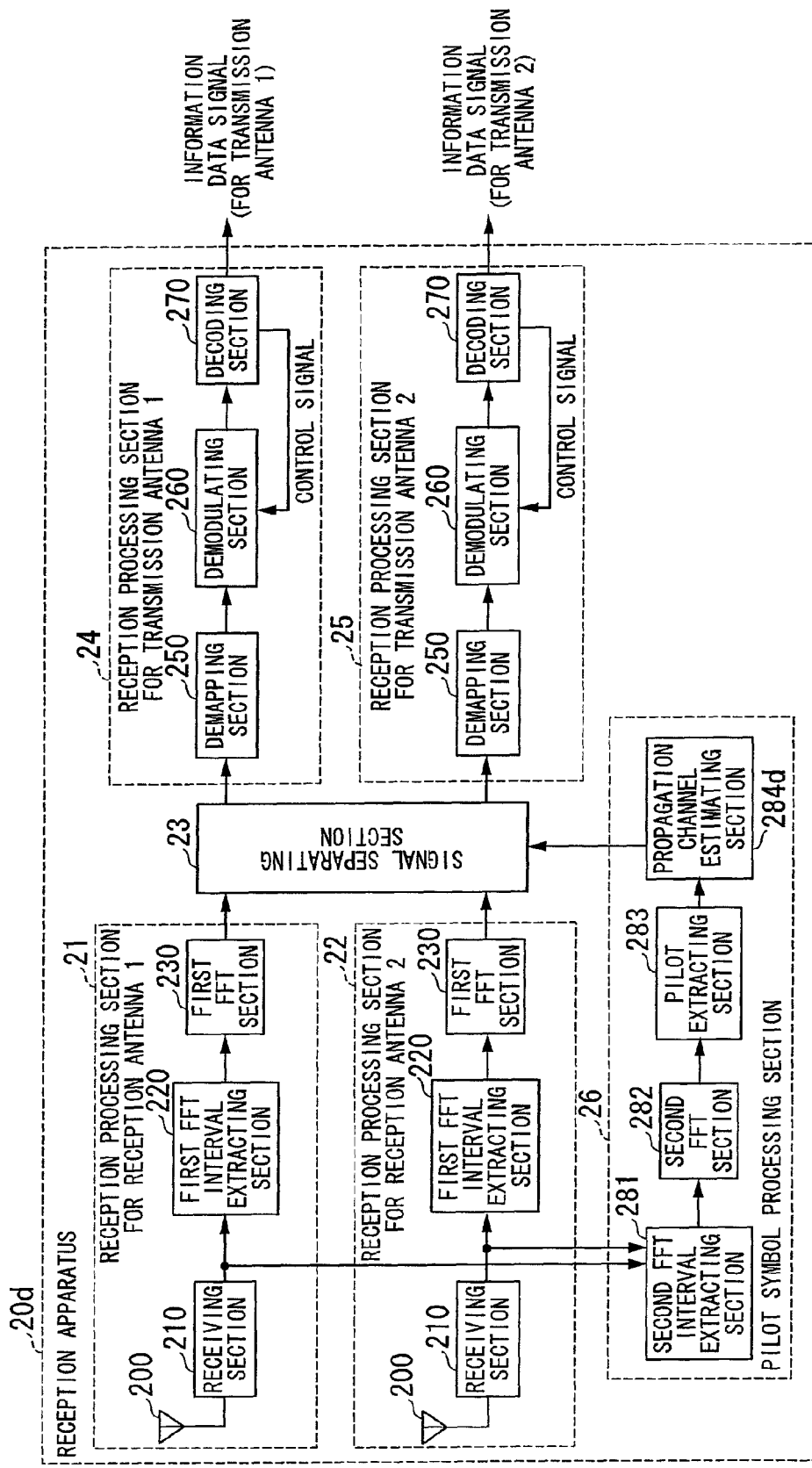
FIG. 50 is a schematic block diagram showing a configuration of a reception apparatus 20d according to the same embodiment.

FIG. 50 is a schematic block diagram showing a configuration of the reception apparatus 20d according to the embodiment. The reception apparatus 20d includes a reception processing section 21 for a reception antenna 1, a reception processing section 22 for a reception antenna 2, a signal separating section 23, a reception processing section 24 for a transmission antenna 1, a reception processing section 25 for a transmission antenna 2, and a pilot symbol processing section 26. Each of the reception processing section 21 for the reception antenna 1 and the reception processing section 22 for the reception antenna 2 includes a reception antenna 200, a receiving section 210, a first FFT interval extracting section 220, and a first FFT section 230. Each of the reception processing section 24 for the transmission antenna 1 and the reception processing section 25 for the transmission antenna 2 includes a demapping section 250, a demodulating section 260, and a decoding section 270. In the same drawing, parts corresponding to the sections of FIG. 33 are denoted by the same reference numerals 200 to 283.

In the reception processing section 21 for the reception antenna 1 and the reception processing section 22 for the reception antenna 2, the receiving section 210, the first FFT interval extracting section 220, and the first FFT section 230 respectively perform the same processing as the receiving section 210, the first FFT interval extracting section 220, and the first FFT section 230 of FIG. 33 for a reception signal of each reception antenna 200, and output a processing result to the signal separating section 23.

In the pilot symbol processing section 26, the second FFT interval extracting section 281, the second FFT section 282, and the pilot extracting section 283 respectively perform the same processing as the second FFT interval extracting section 281, the second FFT section 282, and the pilot extracting section 283 of FIG. 33 for a reception signal of each reception antenna, and the propagation channel estimating section 284d performs propagation channel estimation for each combination of the transmission antenna 130 and the reception antenna 200 using a pilot symbol extracted by the pilot extracting section 283, and outputs a propagation channel estimation result to the signal separating section 23.

The signal separating section 23 separates spatially multiplexed information data symbols of the respective transmission antennas 140 based on the signals of the respective reception antennas 200 received from the reception processing section 21 for the reception antenna 1 and the reception processing section 22 for the reception antenna 2 and the propagation channel estimation result received from the pilot symbol processing section 26. At this time, various methods can be applied as a signal separation method for a spatially multiplexed signal. For example, it is possible to apply a signal separation method of a ZF criterion, an MMSE criterion, an ML criterion, or the like, but the present invention is not limited thereto.

In the reception processing section 24 for the transmission antenna 1 and the reception processing section 25 for the transmission antenna 2, the demapping section 250, the demodulating section 260, and the decoding section 270 respectively perform the same processing as the demapping section 250, the demodulating section 260, and the decoding section 270 of FIG. 33 for signals of the respective transmission antennas 140 separated by the signal separating section 23.

Figure 51:
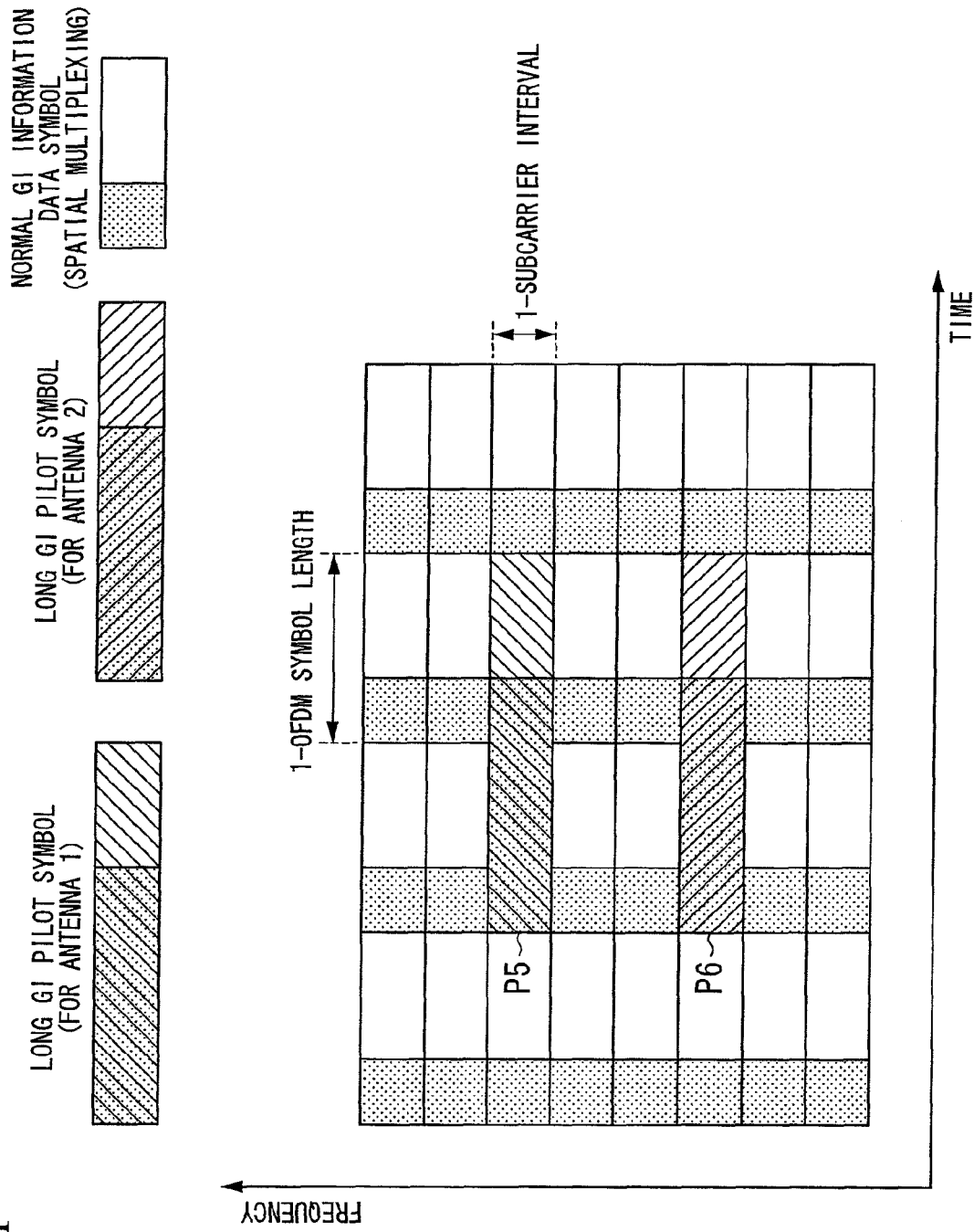
FIG. 51 is a diagram showing a frame constituted by an information data signal symbol, a control signal symbol, and a pilot symbol received by the reception apparatus 20d according to the same embodiment.
Figure 52:
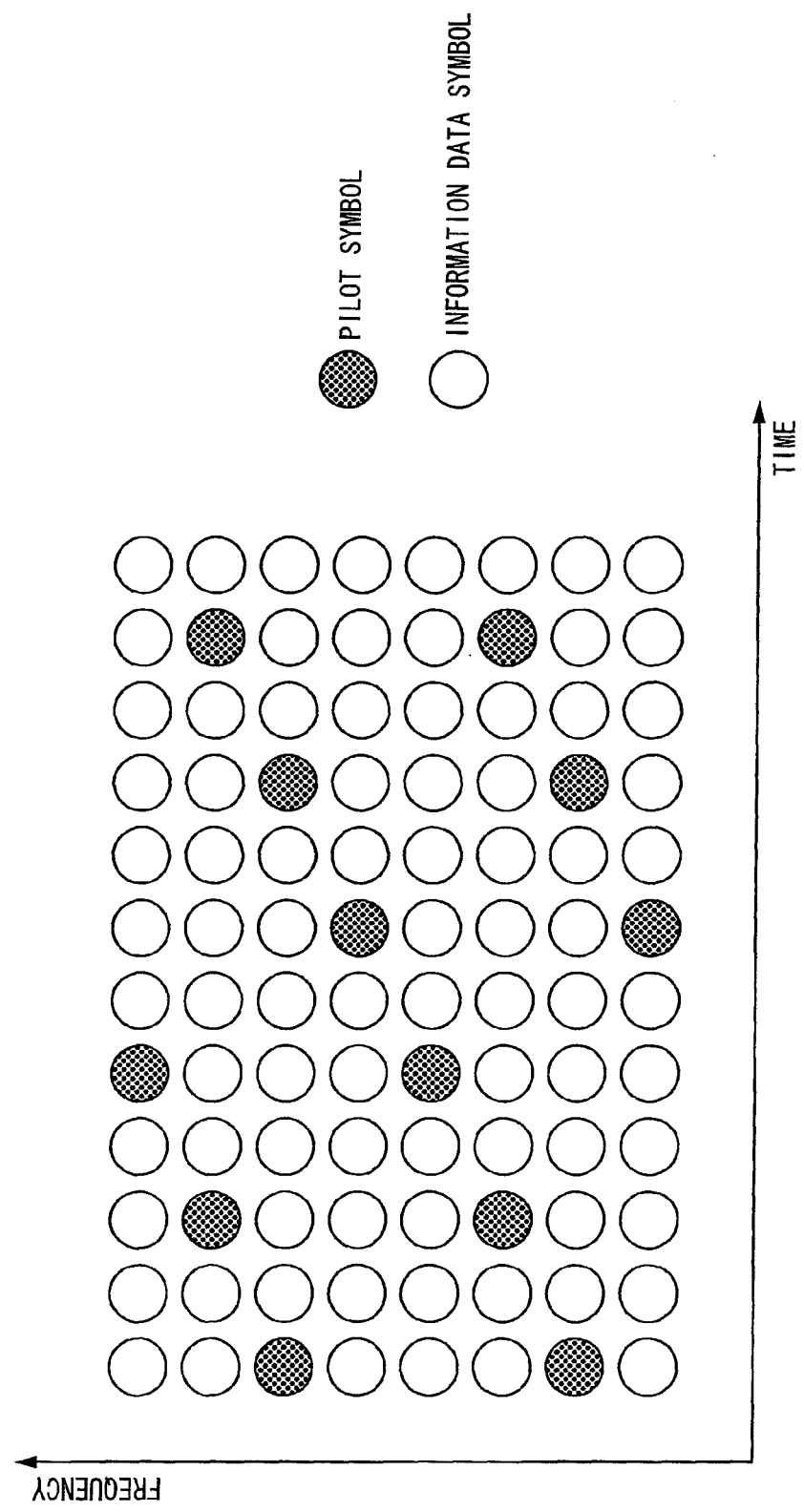
FIG. 52 is a diagram showing an example of a frame using scattered pilot symbols of the related art.
Figure 53:
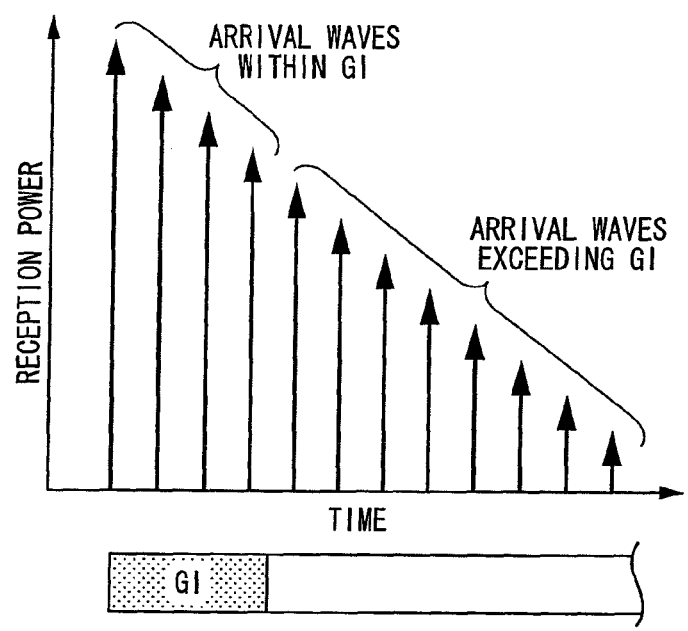
FIG. 53 is a diagram showing an example in which communication quality is degraded by an arrival wave exceeding a GI in multicarrier transmission of the related art.
Figure 54:
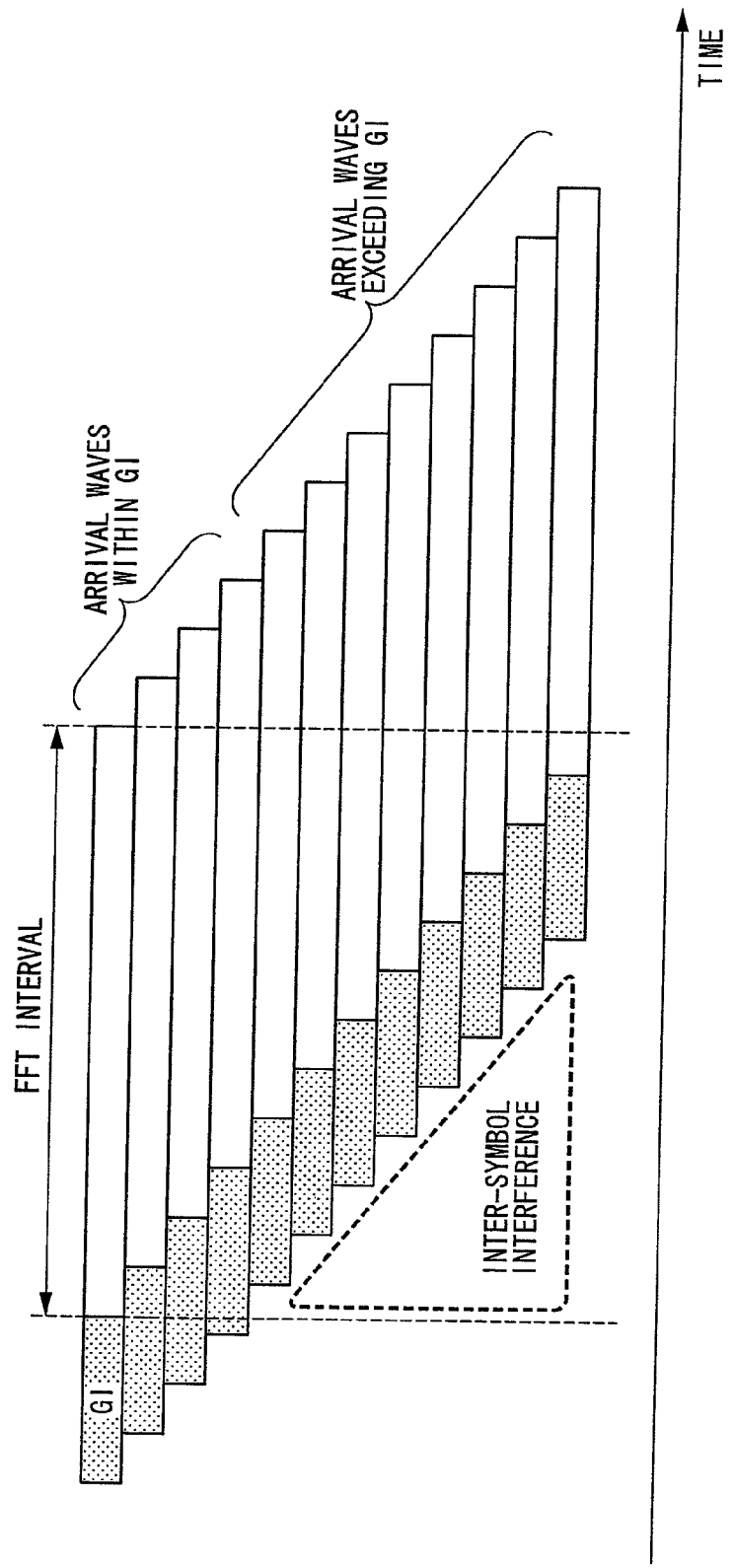
FIG. 54 is a diagram showing an example in which ISI is caused by an arrival wave exceeding a GI in multicarrier transmission of the related art.

FIG. 51 is a diagram showing a frame constituted by an information data symbol, a control symbol, and a pilot symbol received by the reception apparatus 20d. The example of FIG. 51 shows a frame constituted by four OFDM symbols and eight subcarriers. As shown in FIGS. 48 and 49, scattered pilot symbols are allocated to be independent of each other, so that the reception apparatus 20d receives a frame as shown in FIG. 51. Because an information data symbol to which a normal GI is added is spatially multiplexed, processing by the signal separating section 23, which separates spatially multiplexed signals, is necessary.

However, the respective transmission processing sections of the transmission apparatus 10d insert scattered pilot symbols to be independent of each other for the respective transmission antennas. In other words, another transmission processing section does not arrange a symbol in a resource element in which a scattered pilot symbol to which a long GI is added is arranged. For example, among scattered pilot symbols to which the long GI is added in FIG. 51, a long GI pilot symbol P5 for the transmission antenna 1 is arranged in second and third OFDM symbols of sixth subcarriers and a long GI pilot symbol P6 for the transmission antenna 2 is arranged in the second and third OFDM symbols of third subcarriers. Thus, because each pilot symbol is not spatially multiplexed with another pilot symbol and an information data symbol, the processing of the signal separating section 23 for the pilot symbol is unnecessary. The propagation channel estimating section 284*d* of the reception apparatus 20*d* can perform highly accurate propagation channel estimation without being affected by spatial multiplexing.

In a communication system using MIMO by use of the embodiment, a scattered pilot symbol of any subcarrier within the same OFDM symbol is inserted to be mutually independent for each transmission apparatus in an environment where an arrival wave exceeding a normal GI arrives and a GI longer than the normal GI is set for only the scattered pilot symbol, so that the resistance to ISI can be significantly improved and propagation channel estimation can be implemented without substantially degrading the entire transmission efficiency.

The case where two transmission antennas and two reception antennas are provided has been described above, but the present invention is not limited thereto. The case where the number of transmission antennas and the number of reception antennas are respectively greater than or equal to two can also be applied. The case where the number of transmission antennas and the number of reception antennas are different from each other can also be applied.

An example in which modulation processing and decoding processing are respectively mutually performed for an information data symbol for each transmission antenna has been described above, but the present invention is not limited thereto. For example, a signal for which the demodulation processing or the decoding processing is performed may be allocated to a transmission processing section of each transmission antenna.

The transmission apparatus 10 and the reception apparatus 20*d* according to the embodiment can also be applied to the transmission apparatus and the reception apparatus of the seventh to eleventh embodiments.

The case where the long GI is added to all input pilot symbols has been described above, but the present invention is not limited thereto. For example, the long GI may be added to some pilot symbols and the normal GI may be added to other pilot symbols. The long GI may be added to pilot symbols for some transmission antennas and the normal GI may be added to pilot symbols for the other transmission antennas. In this case, it is preferable to add the long GI to pilot symbols for transmission antennas that transmit an information data signal and a control signal having high importance.

The present invention can be used in a field of fixed communication as well as mobile communication. When the present invention is used in two-way communication, a transmission apparatus of the invention is used in a transmitting part of one transceiver and a reception apparatus of the invention is used in a receiving part of the other transceiver. When the present invention is used in mobile communication, for example, the transmission apparatus of the invention is used in a transmitting part of a base station apparatus and the reception apparatus of the invention is used in a receiving part of a mobile station apparatus of the invention.

Functions of parts of the transmission apparatus and the reception apparatus of the above-described embodiment, for example, each part excluding a transmission antenna and a transmitting section and each part excluding a reception antenna and a receiving section, may be implemented by a computer. In this case, a program for implementing a control function may be recorded on a computer readable recording medium and it may be implemented by enabling a computer system to read and execute the program recorded on the recording medium. The "computer system" used herein includes an OS and hardware, such as peripheral devices.

The "computer readable recording medium" is a portable medium such as a flexible disk, magneto-optical disc, ROM and CD-ROM, and a storage device, such as a hard disk, built in the computer system. In addition, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described with reference to the drawings, but specific configurations are not limited to the above-described embodiments. Various changes may be included within the scope of the present invention.

| | Reference Symbols |
|---|---|
| a1, a2, a3, a4, a5: | Transmission apparatus |
| a10: | Information data symbol generating section (first symbol generating section) |
| a20: | Pilot symbol processing section (second symbol generating section) |
| a30, a32, a33, a34: | Multiplexing section |
| a40: | IFFT section (frequency-time conversion section) |
| a50: | GI inserting section |
| a60: | Transmitting section |
| a70: | Pilot symbol storage section (symbol storage section) |
| a80: | Control symbol processing section |
| a90: | Information data/control symbol generating section |
| a11, a91: | Encoding section |
| a12, a92: | Modulating section |
| a13, a93: | Mapping section |
| a21, a81: | Mapping section |
| a22, a82: | Phase control section |
| a1-1: | Transmission processing section for transmission antenna 1 |
| a1-2: | Transmission processing section for transmission antenna 2 |
| a100: | Transmission antenna |
| b1, b2, b3: | Reception apparatus |
| b10: | Receiving section |
| b20: | Normal GI-FFT interval extracting section (first GI removing section) |
| b30: | FFT section (time-frequency conversion section) |
| b40, b42: | Filter section |
| b50: | Demapping section |
| b60: | Demodulating section |
| b70: | Decoding section |
| b80, b90, b800: | Pilot symbol processing section |
| b81, b801: | Long GI-FFT interval extracting section (second GI removing section) |
| b82, b802: | FFT section |
| b83, b93, b803: | Pilot extraction section (symbol extracting section) |
| b84, b94, b804: | Propagation channel estimating section |
| b100-1: | Reception processing section for reception antenna 1 |

-continued

| | Reference Symbols |
|---|---|
| b100-2: | Reception processing section for reception antenna 2 |
| b200: | Signal separating section |
| b300-1: | Reception processing section for transmission antenna 1 |
| b300-2: | Reception processing section for transmission antenna 2 |
| b500: | Reception antenna |
| 10, 10a, 10b, 10c, 10d: | Transmission apparatus |
| 11: | Transmission processing section for transmission antenna 1 |
| 12: | Transmission processing section for transmission antenna 2 |
| 20, 20a, 20d: | Reception apparatus |
| 21: | Reception processing section for reception antenna 1 |
| 22: | Reception processing section for reception antenna 2 |
| 23: | Signal separating section |
| 24: | Reception processing section for transmission antenna 1 |
| 25: | Reception processing section for transmission antenna 2 |
| 26: | Pilot symbol processing section |
| 100, 100c: | Information data symbol generating section |
| 101: | Encoding section |
| 102: | Modulating section |
| 103, 103c: | Mapping section |
| 104: | IFFT section |
| 105: | Normal GI inserting section |
| 110, 110d: | Pilot symbol processing section |
| 111, 111d: | Mapping section |
| 112: | IFFT section |
| 113: | Long GI inserting section |
| 120: | Multiplexing section |
| 130: | Transmitting section |
| 140: | Transmission antenna |
| 150: | Pilot symbol storage section |
| 160: | Control symbol processing section |
| 161: | Mapping section |
| 162: | IFFT section |
| 163: | Long GI inserting section |
| 200: | Reception antenna |
| 210: | Receiving section |
| 220: | First FFT interval extracting section |
| 230: | First FFT section |
| 240: | Filter section |
| 250: | Demapping section |
| 260: | Demodulating section |
| 270: | Decoding section |
| 280, 280a: | Pilot symbol processing section |
| 281: | Second FFT interval extracting section |
| 282: | Second FFT section |
| 283: | Pilot extracting section |
| 284, 284d: | Propagation channel estimating section |

The invention claimed is:

1. A transmission apparatus which multicarrier-modulates and transmits symbols, the symbols being basic units of digital signals, wherein a multicarrier signal in which a first subcarrier in which a first symbol is arranged in a first multicarrier symbol having a first guard interval and a second subcarrier in which a second symbol is arranged in a second multicarrier symbol having a second guard interval longer than the first guard interval are mixed at the same time, the length of the second multicarrier symbol being an integer multiple of the length of the first multicarrier symbol is generated, and wherein the transmission apparatus comprising:
an antenna;
a phase control circuit configured to phase-rotate some symbols to which the second guard interval is added, and generate a third symbol that is arranged one before in a time direction of the same subcarriers as those of the some symbols and constitutes part of the second guard interval added to the some symbols;
a multiplexing circuit configured to multiplex a fourth symbol to which the first guard interval is added, a fifth symbol to which the second guard interval is added, and the third symbol generated by the phase control circuit;
an inverse Fourier transform circuit configured to perform transformation into a time domain signal by inverse-Fourier-transforming the third to fifth symbols multiplexed by the multiplexing circuit;
a guard interval inserting circuit configured to add a third guard interval having the same length that of the first guard interval to the time domain signal into which the transformation was performed by the inverse Fourier transform circuit; and
a transmitting circuit configured to transmit, via the antenna, the time domain signal to which the third guard interval was added by the guard interval inserting circuit.

2. The transmission apparatus according to claim 1, wherein the phase control circuit is configured to control a phase rotation amount when a phase rotation is performed based on a length of the first guard interval.

3. The transmission apparatus according to claim 1, further comprising:
a symbol storage circuit which stores the second multicarrier symbol.

4. The transmission apparatus according to claim 1, further comprising:
a plurality of transmission processing circuits each comprising the phase control circuit, the multiplexing circuit, the inverse Fourier transform circuit, and the guard interval inserting circuit,
wherein the second multicarrier symbol within one transmission processing circuit is mutually spatially independent of another transmission processing circuit.

5. The transmission apparatus according to claim 1, further comprising:
a first multicarrier symbol generating circuit configured to generate the first multicarrier symbol by adding the first guard interval to some symbols; and
a second multicarrier symbol generating section configured to generate the second multicarrier symbol by adding the second guard interval to other symbols, wherein the multiplexing circuit is configured to multiplex the first multicarrier symbol and the second multicarrier symbol in a time domain.

6. The transmission apparatus according to claim 5, wherein the second multicarrier signal generating circuit is configured to use the second multicarrier symbol, an effective symbol interval of the second multicarrier symbol being consistent with any effective symbol interval of the first multicarrier symbol in a time direction.

7. The transmission apparatus according to claim 5, wherein the second multicarrier signal generating circuit is configured to use the second multicarrier symbol, the second multicarrier symbol being a pilot symbol comprising a pilot signal known between the transmission apparatus and a reception apparatus that communicates therewith.

8. The transmission apparatus according to claim 5, wherein the second multicarrier signal generating circuit is configured to use the second multicarrier symbol, the second multicarrier symbol being a control data symbol comprising a control signal for a reception apparatus that communicates with the transmission apparatus.

9. The transmission apparatus according to claim 5, wherein the first multicarrier signal generating circuit is configured to use the first multicarrier symbol, the first multicarrier symbol being an information data symbol comprising information data for a reception apparatus that communicates with the transmission apparatus.

10. The transmission apparatus according to claim 5, wherein the first multicarrier signal generating circuit is configured to use the first multicarrier symbol, the first multicarrier symbol being an information data symbol comprising information data for a reception apparatus that communicates with the transmission apparatus and a control data symbol comprising a control signal for the reception apparatus that communicates with the transmission apparatus.

11. The transmission apparatus according to claim 10, wherein the first multicarrier signal generating circuit is configured to use the first multicarrier symbol, the first multicarrier symbol, which is the control data symbol, being arranged in a subcarrier adjacent to a subcarrier in which the second multicarrier symbol is arranged.

12. The transmission apparatus according to claim 5, wherein:
the first multicarrier symbol generating circuit is configured to arrange each of the some symbols in any one of regions comprising a time and a frequency having predetermined widths and generate a time domain signal of the first multicarrier symbol to which the first guard interval is added, and
the second multicarrier symbol generating circuit is configured to arrange each of the other symbols in any one of regions, excluding regions where the some symbols are arranged, that comprises a time and a frequency having predetermined widths, and generate a time domain signal of the second multicarrier symbol to which the second guard interval is added.

13. A communication system comprising:
a transmission apparatus which multicarrier-modulates and transmits symbols, which are basic units of digital signals; and
a reception apparatus,
wherein a multicarrier signal in which a first subcarrier in which a first symbol is arranged in a first multicarrier symbol having a first guard interval and a second subcarrier in which a second symbol is arranged in a second multicarrier symbol having a second guard interval longer than the first guard interval are mixed at the same time, the length of the second multicarrier symbol being an integer multiple of the length of the first multicarrier symbol is generated, wherein
the transmission apparatus comprises:
an antenna;
a phase control circuit configured to phase-rotate some symbols to which the second guard interval is added, and generate a third symbol that is arranged one before in a time direction of the same subcarriers as those of the some symbols and constitutes part of the second guard interval added to the some symbols;
a multiplexing circuit configured to multiplex a fourth symbol to which the first guard interval is added, a fifth symbol to which the second guard interval is added, and the third symbol generated by the phase control circuit;
an inverse Fourier transform circuit configured to perform transformation into a time domain signal by inverse-Fourier-transforming the third to fifth symbols multiplexed by the multiplexing circuit;
a guard interval inserting circuit configured to add a third guard interval having the same length that of the first guard interval to the time domain signal into which the transformation was performed by the inverse Fourier transform circuit; and a transmitting section configured to transmit, via the antenna, the time domain signal to which the third guard interval was added by the guard interval inserting circuit, wherein
the reception apparatus is configured to separate the part of subcarriers by multicarrier-demodulating the time domain signal transmitted by the transmission circuit, and extract the first multicarrier symbol and the second multicarrier symbol.

14. The communication system according to claim 13, wherein the reception apparatus comprises:
a first guard interval removing circuit configured to remove the first guard interval comprised in the received multicarrier signal; and
a second guard interval removing circuit configured to remove the second guard interval comprised in the received multicarrier signal.

15. The communication system according to claim 13, wherein the reception apparatus comprises:
a first guard interval removing circuit configured to remove the first guard interval comprised in the received multicarrier signal; and
a symbol extracting circuit configured to extract the second multicarrier symbol comprised in the multicarrier signal from the multicarrier signal from which the first guard interval removing circuit removes the first guard interval.

16. The communication system according to claim 15, wherein an effective symbol interval extracted by the symbol extracting circuit is an effective symbol interval of the second multicarrier symbol.

17. A transmission method of a transmission apparatus which multicarrier-modulates and transmits symbols, the symbols being basic units of digital signals, the transmission method comprising:
generating a multicarrier signal in which a first subcarrier in which a first symbol is arranged in a first multicarrier symbol having a first guard interval and a second subcarrier in which a second symbol is arranged in a second multicarrier symbol having a second guard interval longer than the first guard interval are mixed at the same time, the length of the second multicarrier symbol being an integer multiple of the length of the first multicarrier symbol;
phase-rotating some symbols to which the second guard interval is added, and generating a third symbol that is arranged one before in a time direction of the same subcarriers as those of the some symbols and constitutes part of the second guard interval added to the some symbols;
multiplexing a fourth symbol to which the first guard interval is added, a fifth symbol to which the second guard interval is added, and the generated third symbol;
performing transformation into a time domain signal by inverse-Fourier-transforming the multiplexed third to fifth symbols;
adding a third guard interval having the same length that of the first guard interval to the time domain signal into which the transformation was performed; and
transmitting the time domain signal to which the third guard interval was added.

18. The transmission method according to claim 17, the transmission method further comprising:
generating, by the transmission apparatus, the first multicarrier symbol by adding the first guard interval to some symbols;

generating, by the transmission apparatus, the second multicarrier symbol by adding the second guard interval to other symbols; and multiplexing, by the transmission apparatus, the first multicarrier symbol and the second multicarrier symbol in a time domain.

* * * * *